US010550327B2

(12) United States Patent
Engel et al.

(10) Patent No.: US 10,550,327 B2
(45) Date of Patent: Feb. 4, 2020

(54) POLYMERISABLE COMPOUNDS AND THE USE THEREOF IN LIQUID-CRYSTAL DISPLAYS

(71) Applicant: Merck Patent GmbH, Darmstadt (DE)

(72) Inventors: Martin Engel, Darmstadt (DE); Andreas Taugerbeck, Darmstadt (DE); Constanze Brocke, Gross-Gerau (DE); Helmut Haensel, Muehltal (DE); Stephan Derow, Griesheim (DE); Julian Vogt, Griesheim (DE)

(73) Assignee: Merck Patent GmbH, Darmstadt (DE)

( * ) Notice: Subject to any disclaimer, the term of this patent is extended or adjusted under 35 U.S.C. 154(b) by 1042 days.

(21) Appl. No.: 13/861,851

(22) Filed: Apr. 12, 2013

(65) Prior Publication Data
US 2014/0139786 A1 May 22, 2014

(30) Foreign Application Priority Data

Nov. 21, 2012 (EP) ..................................... 12007858

(51) Int. Cl.
*C09K 19/56* (2006.01)
(52) U.S. Cl.
CPC ..................... *C09K 19/56* (2013.01)
(58) Field of Classification Search
CPC ...................................................... C09K 19/56
See application file for complete search history.

(56) References Cited

U.S. PATENT DOCUMENTS

| | | | |
|---|---|---|---|
| 3,043,838 A | 7/1962 | Cavallini | |
| 5,064,569 A | 11/1991 | Geelhaar et al. | |
| 5,180,521 A | 1/1993 | Eidenschink et al. | |
| 6,420,427 B1 | 7/2002 | Takahashi | |
| 6,861,107 B2 | 3/2005 | Klasen-Memmer et al. | |
| 7,060,200 B1 * | 6/2006 | Farrand | C09K 19/0403 252/299.01 |
| 7,125,500 B2 * | 10/2006 | Farrand | C09K 19/0403 252/299.01 |
| 7,169,449 B2 | 1/2007 | Nakanishi et al. | |
| 7,527,746 B2 | 5/2009 | Syundo | |
| 7,534,474 B2 | 5/2009 | Farrand et al. | |
| 8,663,497 B2 | 3/2014 | Matsumoto et al. | |
| 2004/0011996 A1 | 1/2004 | Klasen-Memmer et al. | |
| 2005/0116200 A1 | 6/2005 | Nakanishi et al. | |
| 2005/0133760 A1 * | 6/2005 | Farrand et al. | 252/299.01 |
| 2006/0172090 A1 | 8/2006 | Syundo | |
| 2007/0009675 A1 | 1/2007 | Farrand et al. | |
| 2011/0051049 A1 * | 3/2011 | Goetz et al. | 349/86 |
| 2011/0071126 A1 | 3/2011 | Cacatian et al. | |
| 2011/0261311 A1 * | 10/2011 | Jansen et al. | 349/182 |
| 2012/0200794 A1 | 8/2012 | Matsumoto et al. | |
| 2013/0183460 A1 * | 7/2013 | Klasen-Memmer et al. | 428/1.4 |
| 2015/0203758 A1 | 7/2015 | Klasen-Memmer et al. | |

FOREIGN PATENT DOCUMENTS

| | | | |
|---|---|---|---|
| CN | 102911052 A * | 2/2013 | |
| CN | 103215046 A | 7/2013 | |
| EP | 1378557 A1 | 1/2004 | |
| GB | 912011 C | 12/1962 | |
| JP | S63-502506 A | 9/1988 | |
| JP | H1075447 A | 3/1989 | |
| JP | H5170704 A | 7/1993 | |
| JP | 2001172245 A | 6/2001 | |
| JP | 2004359546 A | 12/2004 | |
| JP | 2006232809 A | 9/2006 | |
| JP | WO 2008105515 A1 * | 9/2008 | C07D 215/14 |
| WO | 2010105179 A2 | 9/2010 | |

OTHER PUBLICATIONS

English Translation of CN102911052, Feb. 2013.*
English Translation of WO2008105515, Sep. 2008.*
Masashi Kawasaki et al. "The effect of vinyl esters on the enantioselectivity of the lipase-catalysed transesterification of alcohols" Pergamon, Tetrahedron: Asymmetry 12 (2001) 585-596.
International Search Report related to the related to corresponding PCT/EP2013/001137 dated Jun. 17, 2013.
Japanese Office Action dated Jan. 13, 2017, issued in corresponding JP 2015-543330, 2 pages.
Jian-Feng, L. et al., "Dendrimeric Liquid Crystals: Isotropic—Nematic Pretransitional Behavior", Macromolecules, vol. 29, No. 24, 1996, pp. 7813-7819.
English translation Abstract of JPS63-502506A published Sep. 22, 1988 (2 pages).
Espacenet Bibliographic data: English Abstract of CN103215046()—Jul. 24, 2013—Liquid crystalline medium)—Merck Patent GmbH.
Third Office Action corresponding to Chinese Patent Application No. 20130060237.2—dated Oct. 16, 2017.
Office Action issued in corresponding JP2015-543330 dated Aug. 14, 2017.
English Machine translation of JP5170704A published Jul. 9, 1993 to Kawaguchi Toshio of Tokuyama Soda KK.
English Machine translation of JP1075447A published Mar. 22, 1989 to Sugiura Michio of Nippon Steel Chemical Co.
Office Action issued in corresponding JP2017-116021 dated Jun. 26, 2018.

* cited by examiner

*Primary Examiner* — Cynthia H Kelly
*Assistant Examiner* — Anna Malloy
(74) *Attorney, Agent, or Firm* — Millen White Zelano and Branigan, PC; John Sopp

(57) ABSTRACT

Polymerisable compounds and processes and intermediates for the preparation thereof. Also liquid-crystal (LC) media comprising the polymerisable compounds, and the use of the polymerisable compounds and LC media for optical, electro-optical and electronic purposes, in particular in LC displays, especially in LC displays of the PSA ("polymer sustained alignment") type.

32 Claims, No Drawings

POLYMERISABLE COMPOUNDS AND THE USE THEREOF IN LIQUID-CRYSTAL DISPLAYS

The present invention relates to polymerisable compounds, to processes and intermediates for the preparation thereof, to liquid-crystal (LC) media comprising them, and to the use of the polymerisable compounds and LC media for optical, electro-optical and electronic purposes, in particular in LC displays, especially in LC displays of the PSA ("polymer sustained alignment") type.

BACKGROUND OF THE INVENTION

The liquid-crystal displays (LC displays) used at present are usually those of the TN ("twisted nematic") type. However, these have the disadvantage of a strong viewing-angle dependence of the contrast.

In addition, so-called VA ("vertically aligned") displays are known which have a broader viewing angle. The LC cell of a VA display contains a layer of an LC medium between two transparent electrodes, where the LC medium usually has a negative value of the dielectric (DC) anisotropy. In the switched-off state, the molecules of the LC layer are aligned perpendicular to the electrode surfaces (homeotropically) or have a tilted homeotropic alignment. On application of an electrical voltage to the two electrodes, a realignment of the LC molecules parallel to the electrode surfaces takes place.

Furthermore, OCB ("optically compensated bend") displays are known which are based on a birefringence effect and have an LC layer with a so-called "bend" alignment and usually positive (DC) anisotropy. On application of an electrical voltage, a realignment of the LC molecules perpendicular to the electrode surfaces takes place. In addition, OCB displays normally contain one or more birefringent optical retardation films in order to prevent undesired transparency to light of the bend cell in the dark state. OCB displays have a broader viewing angle and shorter response times compared with TN displays.

Also known are so-called IPS ("in-plane switching") displays, which contain an LC layer between two substrates, where the two electrodes are arranged on only one of the two substrates and preferably have intermeshed, comb-shaped structures. On application of a voltage to the electrodes, an electric field which has a significant component parallel to the LC layer is thereby generated between them. This causes realignment of the LC molecules in the layer plane.

Furthermore, so-called FFS ("fringe-field switching") displays have been proposed (see, inter alia, S. H. Jung et al., Jpn. J. Appl. Phys., Volume 43, No. 3, 2004, 1028), which likewise contain two electrodes on the same substrate, but, in contrast to IPS displays, only one of these is in the form of an electrode which is structured in a comb-shaped manner, and the other electrode is unstructured. A strong, so-called "fringe field" is thereby generated, i.e. a strong electric field close to the edge of the electrodes, and, throughout the cell, an electric field which has both a strong vertical component and also a strong horizontal component. Both IPS displays and also FFS displays have a low viewing-angle dependence of the contrast.

In VA displays of the more recent type, uniform alignment of the LC molecules is restricted to a plurality of relatively small domains within the LC cell. Disclinations may exist between these domains, also known as tilt domains. VA displays having tilt domains have, compared with conventional VA displays, a greater viewing-angle independence of the contrast and the grey shades. In addition, displays of this type are simpler to produce since additional treatment of the electrode surface for uniform alignment of the molecules in the switched-on state, such as, for example, by rubbing, is no longer necessary. Instead, the preferential direction of the tilt or pretilt angle is controlled by a special design of the electrodes.

In so-called MVA ("multidomain vertical alignment") displays, this is usually achieved by the electrodes having protrusions which cause a local pretilt. As a consequence, the LC molecules are aligned parallel to the electrode surfaces in different directions in different, defined regions of the cell on application of a voltage. "Controlled" switching is thereby achieved, and the formation of interfering disclination lines is prevented. Although this arrangement improves the viewing angle of the display, it results, however, in a reduction in its transparency to light. A further development of MVA uses protrusions on only one electrode side, while the opposite electrode has slits, which improves the transparency to light. The slitted electrodes generate an inhomogeneous electric field in the LC cell on application of a voltage, meaning that controlled switching is still achieved. For further improvement of the transparency to light, the separations between the slits and protrusions can be increased, but this in turn results in a lengthening of the response times. In so-called PVA ("patterned VA") displays, protrusions are rendered completely superfluous in that both electrodes are structured by means of slits on the opposite sides, which results in increased contrast and improved transparency to light, but is technologically difficult and makes the display more sensitive to mechanical influences ("tapping", etc.). For many applications, such as, for example, monitors and especially TV screens, however, a shortening of the response times and an improvement in the contrast and luminance (transmission) of the display are demanded.

A further development are the so-called PS ("polymer sustained") or PSA ("polymer sustained alignment") displays, for which the term "polymer stabilised" is also occasionally used. In these, a small amount (for example 0.3% by weight, typically <1% by weight) of one or more polymerisable, compound(s), preferably polymerisable monomeric compound(s), is added to the LC medium and, after introduction into the LC cell, is polymerised or cross-linked in situ, usually by UV photopolymerisation, between the electrodes with or without an applied electrical voltage. The polymerisation is carried out at a temperature where the LC medium exhibits a liquid crystal phase, usually at room temperature. The addition of polymerisable mesogenic or liquid-crystalline compounds, also known as reactive mesogens or "RMs", to the LC mixture has proven particularly suitable.

Unless indicated otherwise, the term "PSA" is used below as representative of PS displays and PSA displays.

In the meantime, the PS(A) principle is being used in diverse classical LC displays. Thus, for example, PSA-VA, PSA-OCB, PSA-IPS, PSA-FFS and PSA-TN displays are known. The polymerisation of the polymerisable compound(s) preferably takes place with an applied electrical voltage in the case of PSA-VA and PSA-OCB displays, and with or without, preferably without, an applied electrical voltage in the case of PSA-IPS displays. As can be demonstrated in test cells, the PS(A) method results in a pretilt in the cell. In the case of PSA-OCB displays, for example, it is possible for the bend structure to be stabilised so that an offset voltage is unnecessary or can be reduced. In the case of PSA-VA displays, the pretilt has a positive effect on response times. For PSA-VA displays, a standard MVA or PVA pixel and electrode layout can be used. In addition, however, it is also possible, for example, to manage with only one structured electrode side and no protrusions, which significantly simplifies production and at the same time results in very good contrast at the same time as very good transparency to light.

Furthermore, the so-called posi-VA displays ("positive VA") have proven to be a particularly suitable mode Like in classical VA displays, the initial orientation of the LC molecules in posi-VA displays is homeotropic, i.e. substantially perpendicular to the substrates, in the initial state when no voltage is applied. However, in contrast to classical VA displays, in posi-VA displays LC media with positive dielectric anisotropy are used. Like in the usually used IPS displays, the two electrodes in posi-VA displays are arranged on only one of the two substrates, and preferably exhibit intermeshed and comb-shaped (interdigital) structures. By application of a voltage to the interdigital electrodes, which create an electrical field that is substantially parallel to the layer of the LC medium, the LC molecules are transferred into an orientation that is substantially parallel to the substrates. In posi-VA displays, too, it a polymer stabilisation (PSA) has proven to be advantageous, i.e. the addition of RMs to the LC medium, which are polymerised in the cell, whereby a significant reduction of the switching times could be realised.

PSA-VA displays are described, for example, in JP 10-036847 A, EP 1 170 626 A2, U.S. Pat. Nos. 6,861,107, 7,169,449, US 2004/0191428 A1, US 2006/0066793 A1 and US 2006/0103804 A1. PSA-OCB displays are described, for example, in T.-J-Chen et al., Jpn. J. Appl. Phys. 45, 2006, 2702-2704 and S. H. Kim, L.-C-Chien, Jpn. J. Appl. Phys. 43, 2004, 7643-7647. PSA-IPS displays are described, for example, in U.S. Pat. No. 6,177,972 and Appl. Phys. Lett. 1999, 75(21), 3264. PSA-TN displays are described, for example, in Optics Express 2004, 12(7), 1221.

Like the conventional LC displays described above, PSA displays can be operated as active-matrix or passive-matrix displays. In the case of active-matrix displays, individual pixels are usually addressed by integrated, non-linear active elements, such as, for example, transistors (for example thin-film transistors ("TFTs")), while in the case of passive-matrix displays, individual pixels are usually addressed by the multiplex method, as known from the prior art.

The PSA display may also comprise an alignment layer on one or both of the substrates forming the display cell, wherein said alignment layer is in contact with the LC medium and induces initial alignment of the LC molecules, and wherein said alignment layer is obtained by photoalignment.

In particular for monitor and especially TV applications, optimisation of the response times, but also of the contrast and luminance (thus also transmission) of the LC display continues to be demanded. The PSA method can provide crucial advantages here. In particular in the case of PSA-VA, PSA-IPS, PSA-FFS and PSA-posi-VA displays, a shortening of the response times, which correlate with a measurable pretilt in test cells, can be achieved without significant adverse effects on other parameters.

In the prior art, use is made, for example, of polymerisable compounds of the following formula:

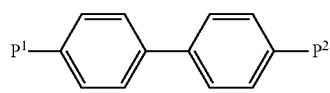

in which P denotes a polymerisable group, usually an acrylate or methacrylate group, as described, for example, in U.S. Pat. No. 7,169,449.

However, the problem arises that not all combinations consisting of LC mixture (also referred to as "LC host mixture" below)+polymerisable component (typically RMs) are suitable for PSA displays since, for example, an inadequate tilt or none at all becomes established or since, for example, the so-called "voltage holding ratio" (VHR or HR) is inadequate for TFT display applications. In addition, it has been found that, on use in PSA displays, the LC mixtures and RMs known from the prior art still have some disadvantages. Thus, not every known RM which is soluble in LC mixtures is suitable for use in PSA displays. In addition, it is often difficult to find a suitable selection criterion for the RM besides direct measurement of the pretilt in the PSA display. The choice of suitable RMs becomes even smaller if polymerisation by means of UV light without the addition of photoinitiators is desired, which may be advantageous for certain applications.

In addition, the selected combination of LC host mixture/RM should have the lowest possible rotational viscosity and the best possible electrical properties. In particular, it should have the highest possible VHR. In PSA displays, a high VHR after irradiation with UV light is particularly necessary since UV exposure is a requisite part of the display production process, but also occurs as normal exposure during operation of the finished display.

In particular, it would be desirable to have available novel materials for PSA displays which produce a particularly small pretilt angle. Preferred materials here are those which produce a lower pretilt angle during polymerisation for the same exposure time than the materials known to date, and/or through the use of which the (higher) pretilt angle that can be achieved with known materials can already be achieved after a shorter exposure time. The production time ("tact time") of the display could thus be shortened and the costs of the production process reduced.

A further problem in the production of PSA displays is the presence or removal of residual amounts of unpolymerised RMs, in particular after the polymerisation step for production of the pretilt angle in the display. For example, unreacted RMs of this type may adversely affect the properties of the display by, for example, polymerising in an uncontrolled manner during operation after finishing of the display.

Thus, the PSA displays known from the prior art often exhibit the undesired effect of so-called "image sticking" or "image burn", i.e. the image produced in the LC display by temporary addressing of individual pixels still remains visible even after the electric field in these pixels has been switched off or after other pixels have been addressed.

This "image sticking" can occur on the one hand if LC host mixtures having a low VHR are used. The UV component of daylight or the backlighting can cause undesired decomposition reactions of the LC molecules therein and thus initiate the production of ionic or free-radical impurities. These may accumulate, in particular, at the electrodes or the alignment layers, where they may reduce the effective applied voltage. This effect can also be observed in conventional LC displays without a polymer component.

In addition, an additional "image sticking" effect caused by the presence of unpolymerised RMs is often observed in PSA displays. Uncontrolled polymerisation of the residual RMs is initiated here by UV light from the environment or by the backlighting. In the switched display areas, this changes the tilt angle after a number of addressing cycles. As a result, a change in transmission in the switched areas may occur, while it remains unchanged in the unswitched areas.

It is therefore desirable for the polymerisation of the RMs to proceed as completely as possible during production of the PSA display and for the presence of unpolymerised RMs in the display to be excluded as far as possible or reduced to a minimum. To this end, materials are required which enable highly effective and complete polymerisation. In addition, controlled reaction of these residual amounts would be desirable. This would be simpler if the RM polymerised more rapidly and effectively than the materials known to date.

Another problem to be solved is that the RMs of prior art do often have high melting points, and do only show limited solubility in many currently common LC mixtures, and therefore frequently tend to spontaneously crystallise out of the mixture. In addition, the risk of spontaneous polymerisation prevents the LC host mixture being warmed in order to dissolve the polymerisable component, meaning that the best possible solubility even at room temperature is necessary. In addition, there is a risk of separation, for example on introduction of the LC medium into the LC display (chromatography effect), which may greatly impair the homogeneity of the display. This is further increased by the fact that the LC media are usually introduced at low temperatures in order to reduce the risk of spontaneous polymerisation (see above), which in turn has an adverse effect on the solubility.

Another problem observed in prior art is that LC media for use in PSA displays, including but not limited to displays of the PSA type, do often exhibit high viscosities and, as a consequence, high switching times. In order to reduce the viscosity and switching time of the LC medium, it has been suggested in prior art to add LC compounds with an alkenyl group. However, it was observed that LC media containing alkenyl compounds often show a decrease of the reliability and stability, and a decrease of the VHR especially after exposure to UV radiation. Especially for use in PSA displays this is a considerable disadvantage, because the photopolymerisation of the RMs in the PSA display is usually carried out by exposure to UV radiation, which will then cause a VHR drop in the LC medium.

There is thus still a great demand for PSA displays, in particular of the VA and OCB type, and LC media and polymerisable compounds for use in such displays, which do not exhibit the disadvantages described above or only do so to a small extent and have improved properties. In particular, there is a great demand for PSA displays, and materials for use in PSA displays, which enable a high specific resistance at the same time as a large working-temperature range, short response times, even at low temperatures, and a low threshold voltage, a low pretilt angle, a multiplicity of grey shades, high contrast and a broad viewing angle, have high values for the "voltage holding ratio" (VHR) after UV exposure, and have low melting points and a high solubility in the LC host mixtures.

The invention is based on the object of providing novel suitable materials, in particular RMs and LC media comprising same, for use in PSA displays, which do not have the disadvantages indicated above or do so to a reduced extent, polymerise as rapidly and completely as possible, enable a low pretilt angle to be established as quickly as possible, reduce or prevent the occurrence of "image sticking" in the display, and preferably at the same time enable very high specific resistance values, high VHR values, low threshold voltages and short response times, and have a high solubility in the LC media which are typically used as host mixtures in PSA displays.

A further object of the invention is the provision of novel RMs, in particular for optical, electro-optical and electronic applications, and of suitable processes and intermediates for the preparation thereof.

In particular, the invention is based on the object of providing polymerisable compounds which produce a greater maximum pretilt after photopolymerisation, which results in the desired pretilt being achieved more quickly and thus in significantly shortened times for production of the LC display, and which are easily processable in an LC mixture.

This object has been achieved in accordance with the present invention by materials and processes as described in the present application. In particular, it has been found, surprisingly, that the use of multireactive polymerisable compounds of formula I as described hereinafter, which contain at least three polymerisable groups, and contain at least one branched polymerisable group, in PSA displays facilitates particularly low pretilt angles and fast establishment of the desired tilt angles.

This has been demonstrated in connection with an LC medium by means of pretilt measurements. In particular, a pretilt has been achieved without the addition of photoinitiator. In addition, the polymerisable compounds according to the present invention exhibit significantly faster generation of the pretilt angle compared with the materials known from the prior art, as has been demonstrated by exposure time-dependent measurements of the pretilt angle.

It has also been demonstrated that the polymerisable compounds according to the present invention are especially suitable for use in LC host mixtures containing mesogenic or LC compounds with an alkenyl group. The use of the polymerisable compounds according to the present invention in such LC host mixtures enables high VHR values.

In addition, the polymerisable compounds according to the invention exhibit a high polymerisation rate, causing smaller unreacted residual amounts to remain in the cell. The electro-optical properties of the cell are thus improved, and in addition controlled reaction of these residual amounts becomes simpler. The polymerisable compounds are therefore suitable for creating a high pretilt in PSA type displays.

Also, the polymerisable compounds according to the invention show a low tendency towards crystallisation and high solubility in typical commercially available LC host mixtures.

U.S. Pat. No. 7,060,200 B1 and US 2006/0172090 A1 disclose multireactive compounds with branched polymerisable groups for use in polymerisable LC materials and LC polymers, but do not disclose polymerisable compounds as disclosed or claimed hereinafter, or their use in LC media for PSA type LC displays.

SUMMARY OF THE INVENTION

The invention relates to the use of compounds of the formula I

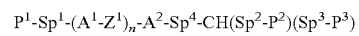    I in which the individual radicals have the following meanings:
$P^1$, $P^2$, $P^3$ independently of each other denote a polymerisable group,
$Sp^{1-4}$ independently of each other denote a spacer group or a single bond,
$A^1$, $A^2$ independently of each other, and on each occurrence identically or differently, denote an aromatic, heteroaromatic, alicyclic or heterocyclic group having 4 to 25 C atoms, which may also contain fused rings, and which is optionally mono- or polysubstituted by L, L denotes $P^1$—, $P^1$-$Sp^1$-, F, Cl, Br, I, —CN, —$NO_2$, —NCO, —NCS, —OCN, —SCN, —C(=O)N($R^x$)$_2$, —C(=O)$Y^1$, —C(=O)$R^x$, —N($R^x$)$_2$, optionally substituted silyl, optionally substituted aryl or heteroaryl having 5 to 20 ring atoms, or straight-chain or branched alkyl having 1 to 25, particularly preferably 1 to 10, C atoms, in which, in addition, one or more non-adjacent $CH_2$ groups may each be replaced, independently of one another, by —C($R^{00}$)=C($R^{000}$)—, —C≡C—, —N($R^{00}$)—, —O—, —S—, —CO—, —CO—O—, —O—CO—, —O—CO—O— in such a way that O and/or S atoms are not linked directly to one another, and in which, in addition, one or more H atoms may be replaced by F, Cl, CN, $P^1$ or $P^1$-$Sp^1$-, $R^{00}$ and $R^{000}$ each, independently of one another, denote H or alkyl having 1 to 12 C atoms, $Y^1$ is halogen, $R^x$ denotes $P^1$, $P^1$-$Sp^1$-, H, halogen, straight chain, branched or cyclic alkyl having 1 to 25 C atoms, wherein one or more non-adjacent $CH_2$-groups are optionally replaced by —O—, —S—, —CO—, —CO—O—, —O—CO—, —O—CO—O— in such a manner that O- and/or S-atoms are not directly connected with each other, and wherein one or more H atoms are optionally replaced by F, Cl, $P^1$— or $P^1$-$Sp^1$-, optionally substituted aryl, aryloxy, heteroaryl or heteroaryloxy having 5 to 20 ring atoms, n is 1, 2, 3 or 4, in liquid-crystal (LC) media or LC displays, especially in the LC medium, active layer or alignment layer of an LC display.

Preferably the compounds of formula I and the LC media containing them are used in LC displays of the PSA (polymer sustained alignment) type.

The invention further relates to novel compounds of formula I.

The invention further relates to novel methods for preparing compounds of formula I, and to novel intermediates used or obtained in these methods.

The invention furthermore relates to an LC medium comprising one or more polymerisable compounds of formula I and one or more additional compounds, which may also be mesogenic, liquid-crystalline and/or polymerisable.

The invention furthermore relates to an LC medium comprising
a polymerisable component A) comprising one or more polymerisable compounds of formula I, and
a liquid-crystalline component B), also referred to below as "LC host mixture", comprising one or more, preferably two or more, low-molecular-weight (monomeric and unpolymerisable) compounds as described above and below.

The invention furthermore relates to an LC medium as described above and below, wherein the LC host mixture, or component B, comprises at least one mesogenic or liquid crystalline compound comprising an alkenyl group.

The invention furthermore relates to an LC medium comprising a polymer obtained by polymerisation of one or more polymerisable compounds of formula I, or by polymerisation of a polymerisable component A) as described above, and further comprising one or more additional compounds, which may also be mesogenic, liquid-crystalline and/or polymerisable, or a component B) as described above.

The invention furthermore relates to an LC medium as described above and below, wherein the polymerisable compounds of formula I or the polymerisable component A) are polymerised.

The invention furthermore relates to a process for preparing an LC medium as described above and below, comprising the steps of mixing one or more low-molecular-weight liquid-crystalline compounds, or an LC host mixture or a liquid-crystalline component B) as described above and below, with one or more polymerisable compounds of formula I, and optionally with further liquid-crystalline compounds and/or additives.

The invention furthermore relates to the use of polymerisable compounds of formula I and LC media according to the invention in PSA displays, in particular the use in PSA displays containing an LC medium, for the production of a tilt angle in the LC medium by in-situ polymerisation of the compound(s) of the formula I in the PSA display, preferably in an electric or magnetic field.

The invention furthermore relates to an LC display comprising one or more polymerisable compounds of formula I or an LC medium according to the invention, in particular a PSA display, particularly preferably a PSA-VA, PSA-OCB, PSA-IPS, PS-FFS, PSA-posi-VA or PSA-TN display.

The invention furthermore relates to an LC display comprising a polymer obtainable by polymerisation of one or more polymerisable compounds of formula I or of a polymerisable component A) as described above, or comprising an LC medium according to the invention, in particular a PSA display, particularly preferably a PSA-VA, PSA-OCB, PSA-IPS, PS-FFS, PSA-posi-VA or PSA-TN display.

The invention furthermore relates to an LC display of the PSA type containing an LC cell having two substrates and two electrodes, where at least one substrate is transparent to light and at least one substrate has one or two electrodes, and a layer, located between the substrates, of an LC medium comprising a polymerised component and a low-molecular-weight component, where the polymerised component is obtainable by polymerisation of one or more polymerisable compounds between the substrates of the LC cell in the LC medium, preferably while applying an electrical voltage to the electrodes, where at least one of the polymerisable compounds is selected from polymerisable compounds of formula I as described above and below, and/or wherein the LC medium is an LC medium as described above and below.

The invention furthermore relates to a process for manufacturing an LC display as described above and below, comprising the steps of filling an LC medium, which comprises one or more low-molecular-weight liquid-crystalline compounds or an LC host mixture or a liquid-crystalline component B), as described above and below, and one or more polymerisable compounds of formula I or a polymerisable component A) as described above and below, into an LC cell having two substrates and two electrodes as described above and below, and polymerising the polymerisable compounds, preferably while applying an electrical voltage to the electrodes.

The PSA displays according to the invention have two electrodes, preferably in the form of transparent layers, which are applied to one or both of the substrates which form the LC cell. Either in each case one electrode is applied to each of the two substrates, as, for example, in PSA-VA, PSA-OCB or PSA-TN displays according to the invention, or both electrodes are applied to only one of the two substrates, while the other substrate has no electrode, as, for example, in PSA-posi-VA, PSA-IPS or PSA-FFS displays according to the invention.

Definitions of Terms

As used herein, the terms "tilt" and "tilt angle" mean a tilted alignment of the LC molecules of an LC medium relative to the surfaces of the cell in an LC display (here preferably a PSA display). The tilt angle here denotes the average angle (<) 90° between the longitudinal molecular axes of the LC molecules (LC director) and the surface of the plane-parallel outer plates which form the LC cell. A low value for the tilt angle (i.e. a large deviation from the 90° angle) corresponds to a large tilt here. A suitable method for measurement of the tilt angle is given in the examples. Unless indicated otherwise, tilt angle values disclosed above and below relate to this measurement method.

The term "mesogenic group" as used herein is known to the person skilled in the art and described in the literature, and means a group which, due to the anisotropy of its attracting and repelling interactions, essentially contributes to causing a liquid-crystal (LC) phase in low-molecular-weight or polymeric substances. Compounds containing mesogenic groups (mesogenic compounds) do not necessarily have to have an LC phase themselves. It is also possible for mesogenic compounds to exhibit LC phase behaviour only after mixing with other compounds and/or after polymerisation. Typical mesogenic groups are, for example, rigid rod- or disc-shaped units. An overview of the terms and definitions used in connection with mesogenic or LC compounds is given in Pure Appl. Chem. 73(5), 888 (2001) and C. Tschierske, G. Pelzl, S. Diele, Angew. Chem. 2004, 116, 6340-6368.

The term "spacer group", hereinafter also referred to as "Sp", is known to the person skilled in the art and is described in the literature, see, for example, Pure Appl. Chem. 73(5), 888 (2001) and C. Tschierske, G. Pelzl, S. Diele, Angew. Chem. 2004, 116, 6340-6368. As used herein, the terms "spacer group" or "spacer" mean a flexible group, for example an alkylene group, which connects the mesogenic group and the polymerisable group(s) in a polymerisable mesogenic compound.

As used herein, the terms "reactive mesogen" and "RM" mean a compound containing one mesogenic group and one or more functional groups which are suitable for polymerisation, the latter also being referred to as "polymerisable group" or "P".

The term "polymerisable compound" as used hereinafter, unless stated otherwise, means a polymerisable monomeric compound.

As used herein, the terms "low-molecular-weight compound" and "unpolymerisable compound" mean compounds, usually monomeric, which contain no functional group that is suitable for polymerisation under the usual conditions known to the person skilled in the art, in particular under the conditions used for the polymerisation of RMs.

As used herein, the terms "active layer" and "switchable layer" mean a layer in an electrooptical display, for example an LC display, that comprises one or more molecules having structural and optical anisotropy, like for example LC molecules, which change their orientation upon an external stimulus like an electric or magnetic field, resulting in a change of the transmission of the layer for polarized or unpolarized light.

DETAILED DESCRIPTION OF THE INVENTION

Unless stated otherwise, the compounds of formula I are selected from achiral compounds.

Above and below "organic group" denotes a carbon or hydrocarbon group.

"Carbon group" denotes a mono- or polyvalent organic group containing at least one carbon atom, where this either contains no further atoms (such as, for example, —C≡C—) or optionally contains one or more further atoms, such as, for example, N, O, S, P, Si, Se, As, Te or Ge (for example carbonyl, etc.). The term "hydrocarbon group" denotes a carbon group which additionally contains one or more H atoms and optionally one or more heteroatoms, such as, for example, N, O, S, P, Si, Se, As, Te or Ge.

"Halogen" denotes F, Cl, Br or I.

—CO—, —C(=O)— and —C(O)— denote a carbonyl group, i.e.

"Conjugated radical" or "conjugated group" denotes a radical or group which contains principally $sp^2$-hybridised (or possibly also sp-hybridised) carbon atoms, which may also be replaced by corresponding heteroatoms. In the simplest case, this means the alternating presence of double and single bonds. "Principally" in this connection means that naturally (non-randomly) occurring defects which result in conjugation interruptions do not devalue the term "conjugated". Furthermore, the term "conjugated" is likewise used in this application text if, for example, arylamine units or certain heterocycles (i.e. conjugation via N, O, P or S atoms) are located in the radical or group.

A carbon or hydrocarbon group can be a saturated or unsaturated group. Unsaturated groups are, for example, aryl, alkenyl or alkynyl groups. A carbon or hydrocarbon radical having more than 3 C atoms can be straight-chain, branched and/or cyclic and may also contain spiro links or condensed rings.

The terms "alkyl", "aryl", "heteroaryl", etc., also encompass polyvalent groups, for example alkylene, arylene, heteroarylene, etc.

The term "aryl" denotes an aromatic carbon group or a group derived therefrom. The term "heteroaryl" denotes "aryl" as defined above, containing one or more heteroatoms.

Preferred carbon and hydrocarbon groups are optionally substituted alkyl, alkenyl, alkynyl, alkoxy, alkylcarbonyl, alkoxycarbonyl, alkylcarbonyloxy and alkoxycarbonyloxy having 1 to 40, preferably 1 to 25, particularly preferably 1 to 18, C atoms, optionally substituted aryl or aryloxy having 6 to 40, preferably 6 to 25, C atoms, or optionally substituted alkylaryl, arylalkyl, alkylaryloxy, arylalkyloxy, arylcarbonyl, aryloxycarbonyl, arylcarbonyloxy and aryloxycarbonyloxy having 6 to 40, preferably 6 to 25, C atoms.

Further preferred carbon and hydrocarbon groups are $C_1$-$C_{40}$ alkyl, $C_2$-$C_{40}$ alkenyl, $C_2$-$C_{40}$ alkynyl, $C_3$-$C_{40}$ allyl, $C_4$-$C_{40}$ alkyldienyl, $C_4$-$C_{40}$ polyenyl, $C_6$-$C_{40}$ aryl, $C_6$-$C_{40}$ alkylaryl, $C_6$-$C_{40}$ arylalkyl, $C_6$-$C_{40}$ alkylaryloxy, $C_6$-$C_{40}$ arylalkyloxy, $C_2$-$C_{40}$ heteroaryl, $C_4$-$C_{40}$ cycloalkyl, $C_4$-$C_{40}$ cycloalkenyl, etc. Particular preference is given to $C_1$-$C_{22}$ alkyl, $C_2$-$C_{22}$ alkenyl, $C_2$-$C_{22}$ alkynyl, $C_3$-$C_{22}$ allyl, $C_4$-$C_{22}$ alkyldienyl, $C_6$-$C_{12}$ aryl, $C_6$-$C_{20}$ arylalkyl and $C_2$-$C_{20}$ heteroaryl.

Further preferred carbon and hydrocarbon groups are straight-chain, branched or cyclic alkyl radicals having 1 to 40, preferably 1 to 25, C atoms, which are unsubstituted or mono- or polysubstituted by F, Cl, Br, I or CN and in which one or more non-adjacent $CH_2$ groups may each be replaced, independently of one another, by —C($R^x$)=C($R^x$)—, —C≡C—, —N($R^x$)—, —O—, —S—, —CO—, —CO—O—, —O—CO—, —O—CO—O— in such a way that O and/or S atoms are not linked directly to one another.

$R^x$ preferably denotes H, halogen, a straight-chain, branched or cyclic alkyl chain having 1 to 25 C atoms, in which, in addition, one or more non-adjacent C atoms may be replaced by —O—, —S—, —CO—, —CO—O—, —O—CO—, —O—CO—O— and in which one or more H atoms may be replaced by fluorine, an optionally substituted aryl or aryloxy group having 6 to 40 C atoms, or an optionally substituted heteroaryl or heteroaryloxy group having 2 to 40 C atoms.

Preferred alkoxy groups are, for example, methoxy, ethoxy, 2-methoxyethoxy, n-propoxy, i-propoxy, n-butoxy, i-butoxy, s-butoxy, t-butoxy, 2-methylbutoxy, n-pentoxy, n-hexoxy, n-heptoxy, n-octoxy, n-nonoxy, n-decoxy, n-undecoxy, n-dodecoxy, etc.

Preferred alkyl groups are, for example, methyl, ethyl, n-propyl, isopropyl, n-butyl, isobutyl, s-butyl, t-butyl, 2-methylbutyl, n-pentyl, s-pentyl, cyclopentyl, n-hexyl, cyclohexyl, 2-ethylhexyl, n-heptyl, cycloheptyl, n-octyl, cyclooctyl, n-nonyl, n-decyl, n-undecyl, n-dodecyl, dodecanyl, trifluoromethyl, perfluoro-n-butyl, 2,2,2-trifluoroethyl, perfluorooctyl, perfluorohexyl, etc.

Preferred alkenyl groups are, for example, ethenyl, propenyl, butenyl, pentenyl, cyclopentenyl, hexenyl, cyclohexenyl, heptenyl, cycloheptenyl, octenyl, cyclooctenyl, etc.

Preferred alkynyl groups are, for example, ethynyl, propynyl, butynyl, pentynyl, hexynyl, octynyl, etc.

Preferred alkoxy groups are, for example, methoxy, ethoxy, 2-methoxyethoxy, n-propoxy, i-propoxy, n-butoxy, i-butoxy, s-butoxy, t-butoxy, 2-methylbutoxy, n-pentoxy, n-hexoxy, n-heptoxy, n-octoxy, n-nonoxy, n-decoxy, n-undecoxy, n-dodecoxy, etc.

Preferred amino groups are, for example, dimethylamino, methylamino, methylphenylamino, phenylamino, etc.

Aryl and heteroaryl groups can be monocyclic or polycyclic, i.e. they can contain one ring (such as, for example, phenyl) or two or more rings, which may also be fused (such as, for example, naphthyl) or covalently bonded (such as, for example, biphenyl), or contain a combination of fused and linked rings. Heteroaryl groups contain one or more heteroatoms, preferably selected from O, N, S and Se.

Particular preference is given to mono-, bi- or tricyclic aryl groups having 6 to 25 C atoms and mono-, bi- or tricyclic heteroaryl groups having 5 to 25 ring atoms, which optionally contain fused rings and are optionally substituted. Preference is furthermore given to 5-, 6- or 7-membered aryl and heteroaryl groups, in which, in addition, one or more CH groups may be replaced by N, S or O in such a way that O atoms and/or S atoms are not linked directly to one another.

Preferred aryl groups are, for example, phenyl, biphenyl, terphenyl, [1,1':3',1"]-terphenyl-2'-yl, naphthyl, anthracene, binaphthyl, phenanthrene, 9,10-dihydro-phenanthrene, pyrene, dihydropyrene, chrysene, perylene, tetracene, pentacene, benzopyrene, fluorene, indene, indenofluorene, spirobifluorene, etc.

Preferred heteroaryl groups are, for example, 5-membered rings, such as pyrrole, pyrazole, imidazole, 1,2,3-triazole, 1,2,4-triazole, tetrazole, furan, thiophene, selenophene, oxazole, isoxazole, 1,2-thiazole, 1,3-thiazole, 1,2,3-oxadiazole, 1,2,4-oxadiazole, 1,2,5-oxadiazole, 1,3,4-oxadiazole, 1,2,3-thiadiazole, 1,2,4-thiadiazole, 1,2,5-thiadiazole, 1,3,4-thiadiazole, 6-membered rings, such as pyridine, pyridazine, pyrimidine, pyrazine, 1,3,5-triazine, 1,2,4-triazine, 1,2,3-triazine, 1,2,4,5-tetrazine, 1,2,3,4-tetrazine, 1,2,3,5-tetrazine, or condensed groups, such as indole, isoindole, indolizine, indazole, benzimidazole, benzotriazole, purine, naphthimidazole, phenanthrimidazole, pyridimidazole, pyrazinimidazole, quinoxalinimidazole, benzoxazole, naphthoxazole, anthroxazole, phenanthroxazole, isoxazole, benzothiazole, benzofuran, isobenzofuran, dibenzofuran, quinoline, isoquinoline, pteridine, benzo-5,6-quinoline, benzo-6,7-quinoline, benzo-7,8-quinoline, benzoisoquinoline, acridine, phenothiazine, phenoxazine, benzopyridazine, benzopyrimidine, quinoxaline, phenazine, naphthyridine, azacarbazole, benzocarboline, phenanthridine, phenanthroline, thieno[2,3b]thiophene, thieno[3,2b]thiophene, dithienothiophene, isobenzothiophene, dibenzothiophene, benzothiadiazothiophene, or combinations of these groups.

The aryl and heteroaryl groups mentioned above and below may also be substituted by alkyl, alkoxy, thioalkyl, fluorine, fluoroalkyl or further aryl or heteroaryl groups.

The (non-aromatic) alicyclic and heterocyclic groups encompass both saturated rings, i.e. those containing exclusively single bonds, and also partially unsaturated rings, i.e. those which may also contain multiple bonds. Heterocyclic rings contain one or more heteroatoms, preferably selected from Si, O, N, S and Se.

The (non-aromatic) alicyclic and heterocyclic groups can be monocyclic, i.e. contain only one ring (such as, for example, cyclohexane), or polycyclic, i.e. contain a plurality of rings (such as, for example, decahydronaphthalene or bicyclooctane). Particular preference is given to saturated groups. Preference is furthermore given to mono-, bi- or tricyclic groups having 5 to 25 ring atoms, which optionally contain fused rings and are optionally substituted. Preference is furthermore given to 5-, 6-, 7- or 8-membered carbocyclic groups, in which, in addition, one or more C atoms may be replaced by Si and/or one or more CH groups may be replaced by N and/or one or more non-adjacent $CH_2$ groups may be replaced by —O— and/or —S—.

Preferred alicyclic and heterocyclic groups are, for example, 5-membered groups, such as cyclopentane, tetrahydrofuran, tetrahydrothiofuran, pyrrolidine, 6-membered groups, such as cyclohexane, silinane, cyclohexene, tetrahydropyran, tetrahydrothiopyran, 1,3-dioxane, 1,3-dithiane, piperidine, 7-membered groups, such as cycloheptane, and fused groups, such as tetrahydronaphthalene, decahydronaphthalene, indane, bicyclo[1.1.1]pentane-1,3-diyl, bicyclo[2.2.2]octane-1,4-diyl, spiro[3.3]heptane-2,6-diyl, octahydro-4,7-methanoindane-2,5-diyl.

Preferred substituents are, for example, solubility-promoting groups, such as alkyl or alkoxy, electron-withdrawing groups, such as fluorine, nitro or nitrile, or substituents for increasing the glass transition temperature (Tg) in the polymer, in particular bulky groups, such as, for example, t-butyl or optionally substituted aryl groups.

Preferred substituents, also referred to as "L" above and below, are, for example, F, Cl, Br, I, —CN, —$NO_2$, —NCO, —NCS, —OCN, —SCN, —C(=O)N($R^x$)$_2$, —C(=O)$Y^1$, —C(=O)$R^x$, —N($R^x$)$_2$, in which IV has the meaning indicated above, and $Y^1$ denotes halogen, optionally substituted silyl or aryl having 6 to 40, preferably 6 to 20, C atoms, and straight-chain or branched alkyl, alkoxy, alkylcarbonyl, alkoxycarbonyl, alkylcarbonyloxy or alkoxycarbonyloxy having 1 to 25 C atoms, in which one or more H atoms may optionally be replaced by F or Cl.

"Substituted silyl or aryl" preferably means substituted by halogen, —CN, $R^0$, —$OR^0$, —CO—$R^0$, —CO—O—$R^0$, —O—CO—$R^0$ or —O—CO—O—$R^0$, in which $R^0$ has the meaning indicated above.

Particularly preferred substituents L are, for example, F, Cl, CN, $NO_2$, $CH_3$, $C_2H_5$, $OCH_3$, $OC_2H_5$, $COCH_3$, $COC_2H_5$, $COOCH_3$, $COOC_2H_5$, $CF_3$, $OCF_3$, $OCHF_2$, $OC_2F_5$, furthermore phenyl.

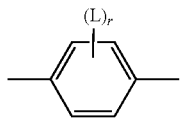

is preferably

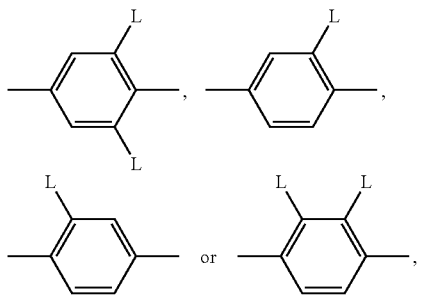

in which L has one of the meanings indicated above.

The polymerisable group $P^{1-3}$ is a group which is suitable for a polymerisation reaction, such as, for example, free-radical or ionic chain polymerisation, polyaddition or polycondensation, or for a polymer-analogous reaction, for example addition or condensation onto a main polymer chain. Particular preference is given to groups for chain polymerisation, in particular those containing a C=C double bond or —C≡C— triple bond, and groups which are suitable for polymerisation with ring opening, such as, for example, oxetane or epoxide groups.

Preferred groups $P^{1-3}$ are selected from the group consisting of $CH_2$=$CW^1$—CO—O—, $CH_2$=$CW^1$—CO—,

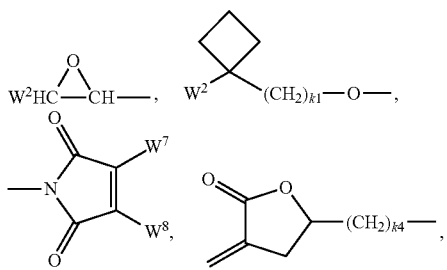

$CH_2$=$CW^2$—$(O)_{k3}$—, $CW^1$=CH—CO—$(O)_{k3}$—, $CW^1$=CH—CO—NH—, $CH_2$=$CW^1$—CO—$(O)_{k3}$—, $CH_3$—CH=CH—O—, $(CH_2$=CH$)_2$CH—OCO—, $(CH_2$=CH—$CH_2)_2$CH—OCO—, $(CH_2$=CH$)_2$CH—O—, $(CH_2$=CH—$CH_2)_2$N—, $(CH_2$=CH—$CH_2)_2$N—CO—, HO—$CW^2W^3$—, HS—$CW^2W^3$—, $HW^2$N—, HO—$CW^2W^3$—NH—, $CH_2$=$CW^1$—CO—NH—, $CH_2$=CH—$(COO)_{k1}$-Phe-$(O)_{k2}$—, $CH_2$=CH—$(CO)_{k1}$-Phe-$(O)_{k2}$—, Phe-CH=CH—, HOOC—, OCN— and $W^4W^5W^6$Si—, in which $W^1$ denotes H, F, Cl, CN, $CF_3$, phenyl or alkyl having 1 to 5 C atoms, in particular H, F, Cl or $CH_3$, $W^2$ and $W^3$ each, independently of one another, denote H or alkyl having 1 to 5 C atoms, in particular H, methyl, ethyl or n-propyl, $W^4$, $W^5$ and $W^6$ each, independently of one another, denote Cl, oxaalkyl or oxacarbonylalkyl having 1 to 5 C atoms, $W^7$ and $W^8$ each, independently of one another, denote H, Cl or alkyl having 1 to 5 C atoms, Phe denotes 1,4-phenylene, which is optionally substituted by one or more radicals L as defined above which are other than P-Sp-, $k_1$, $k_2$ and $k_3$ each, independently of one another, denote 0 or 1, $k_3$ preferably denotes 1, and $k_4$ denotes an integer from 1 to 10.

Particularly preferred groups $P^{1-3}$ are selected from the group consisting of $CH_2$=$CW^1$—CO—O—, $CH_2$=$CW^1$—CO—,

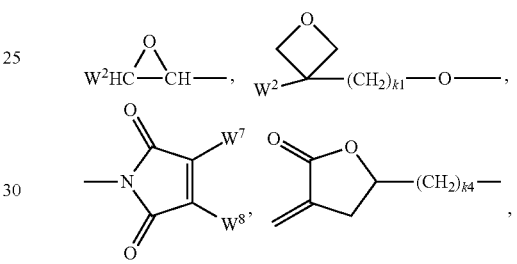

$CH_2$=$CW^2$—O—, $CH_2$=$CW^2$—, $CW^1$=CH—CO—$(O)_{k3}$—, $CW^1$=CH—CO—NH—, $CH_2$=$CW^1$—CO—NH—, $(CH_2$=CH$)_2$CH—OCO—, $(CH_2$=CH—$CH_2)_2$CH—OCO—, $(CH_2$=CH$)_2$CH—O—, $(CH_2$=CH—$CH_2)_2$N—, $(CH_2$=CH—$CH_2)_2$N—CO—, $CH_2$=$CW^1$—CO—NH—, $CH_2$=CH—$(COO)_{k1}$-Phe-$(O)_{k2}$—, $CH_2$=CH—$(CO)_{k1}$-Phe-$(O)_{k2}$—, Phe-CH=CH— and $W^4W^5W^6$Si—, in which $W^1$ denotes H, F, Cl, CN, $CF_3$, phenyl or alkyl having 1 to 5 C atoms, in particular H, F, Cl or $CH_3$, $W^2$ and $W^3$ each, independently of one another, denote H or alkyl having 1 to 5 C atoms, in particular H, methyl, ethyl or n-propyl, $W^4$, $W^5$ and $W^6$ each, independently of one another, denote Cl, oxaalkyl or oxacarbonylalkyl having 1 to 5 C atoms, $W^7$ and $W^8$ each, independently of one another, denote H, Cl or alkyl having 1 to 5 C atoms, Phe denotes 1,4-phenylene, $k_1$, $k_2$ and $k_3$ each, independently of one another, denote 0 or 1, $k_3$ preferably denotes 1, and $k_4$ denotes an integer from 1 to 10.

Very particularly preferred groups $P^{1-3}$ are selected from the group consisting of $CH_2$=$CW^1$—CO—O—, in particular $CH_2$=CH—CO—O—, $CH_2$=C($CH_3$)—CO—O— and $CH_2$=CF—CO—O—, furthermore $CH_2$=CH—O—, $(CH_2$=CH$)_2$CH—O—CO—, $(CH_2$=CH$)_2$CH—O—,

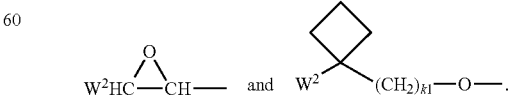

Further very particularly preferred groups $P^{1-3}$ are selected from the group consisting of vinyl, vinyloxy, acrylate, methacrylate, fluoroacrylate, chloroacrylate, oxetane and epoxide groups, and particularly preferably denote an acrylate, methacrylate or oxetane group.

If the spacer groups $Sp^{1-3}$ are different from a single bond, they are preferably of the formula Sp"—X", so that the respective radical $P^i$-$Sp^i$-, like for example $P^1$-$Sp^1$-, conforms to the formula P-Sp"—X"—, where Sp" and X" have the meanings given below.

If the spacer group $Sp^4$ is different from a single bond, it is preferably of the formula X"-Sp", so that the respective radical -$A^2$-$Sp^4$- conforms to the formula -$A^2$-X"-Sp"-, where Sp" and X" have the meanings given below.

Sp" denotes alkylene having 1 to 20, preferably 1 to 12, C atoms, which is optionally mono- or polysubstituted by F, Cl, Br, I or CN and in which, in addition, one or more non-adjacent $CH_2$ groups may each be replaced, independently of one another, by —O—, —S—, —NH—, —N($R^0$)—, —Si($R^{00}R^{000}$)—, —CO—, —CO—O—, —O—CO—, —O—CO—O—, —S—CO—, —CO—S—, —N($R^{00}$)—CO—O—, —O—CO—N($R^{00}$)—, —N($R^{00}$)—CO—N($R^{00}$)—, —CH=CH— or —C≡C— in such a way that O and/or S atoms are not linked directly to one another, X" denotes —O—, —S—, —CO—, —CO—O—, —O—CO—, —O—CO—O—, —CO—N($R^{00}$)—, —N($R^{00}$)—CO—, —N($R^{00}$)—CO—N($R^{00}$)—, —OCH$_2$—, —CH$_2$O—, —SCH$_2$—, —CH$_2$S—, —CF$_2$O—, —OCF$_2$—, —CF$_2$S—, —SCF$_2$—, —CF$_2$CH$_2$—, —CH$_2$CF$_2$—, —CF$_2$CF$_2$—, —CH=N—, —N=CH—, —N=N—, —CH=CR$^0$—, —CY$^2$=CY$^3$—, —C≡C—, —CH=CH—CO—O—, —O—CO—CH=CH— or a single bond, $R^{00}$ and $R^{000}$ each, independently of one another, denote H or alkyl having 1 to 12 C atoms, and $Y^2$ and $Y^3$ each, independently of one another, denote H, F, Cl or CN.

X" is preferably —O—, —S—, —CO—, —COO—, —COO—, —O—COO—, —CO—NR$^0$—, —NR$^0$—CO—, —NR$^0$—CO—NR$^0$— or a single bond.

Typical spacer groups -Sp"-X"— are, for example, —(CH$_2$)$_{p1}$—, —(CH$_2$CH$_2$O)$_{q1}$—CH$_2$CH$_2$—, —CH$_2$CH$_2$—S—CH$_2$CH$_2$—, —CH$_2$CH$_2$—NH—CH$_2$CH$_2$— or —(SiR$^{00}$R$^{000}$—O)$_{p1}$—, in which p1 is an integer from 1 to 12, q1 is an integer from 1 to 3, and $R^{00}$ and $R^{000}$ have the meanings indicated above.

Particularly preferred groups -Sp"-X"— are —(CH$_2$)$_{p1}$—, —(CH$_2$)$_{p1}$—O—, —(CH$_2$)$_{p1}$—O—CO—, —(CH$_2$)$_{p1}$—O—CO—O—, in which p1 and q1 have the meanings indicated above.

Particularly preferred groups —X"-Sp"— are —(CH$_2$)$_{p1}$—, —O—(CH$_2$)$_{p1}$—, —CO—O—(CH$_2$)$_{p1}$—, —O—CO—O—(CH$_2$)$_{p1}$—, in which p1 and q1 have the meanings indicated above.

Particularly preferred groups Sp" are, for example, in each case straight-chain ethylene, propylene, butylene, pentylene, hexylene, heptylene, octylene, nonylene, decylene, undecylene, dodecylene, octadecylene, ethyleneoxyethylene, methyleneoxybutylene, ethylenethioethylene, ethylene-N-methyliminoethylene, 1-methylalkylene, ethenylene, propenylene and butenylene.

Preferred compounds of formula I are those in which $A^1$, $A^2$ each, independently of one another, denote 1,4-phenylene, naphthalene-1,4-diyl or naphthalene-2,6-diyl, where one or more CH groups in these groups are optionally replaced by N, cyclohexane-1,4-diyl, in which, in addition, one or more non-adjacent $CH_2$ groups are optionally replaced by O and/or S, 1,4-cyclohexenylene, bicyclo[1.1.1]pentane-1,3-diyl, bicyclo[2.2.2]octane-1,4-diyl, spiro[3.3]heptane-2,6-diyl, piperidine-1,4-diyl, decahydronaphthalene-2,6-diyl, 1,2,3,4-tetrahydronaphthalene-2,6-diyl, indane-2,5-diyl, octahydro-4,7-methanoindane-2,5-diyl, anthracene-2,7-diyl, fluorene-2,7-diyl, phenanthrene-2,7-diyl or 9,10-dihydro-phenanthrene-2,7-diyl, where all these groups are unsubstituted or mono- or polysubstituted by L.

Further preferred compounds of formula I are those in which $P^1$, $P^2$ and $P^3$ are selected from the group consisting of acrylate, methacrylate and oxetane, $Sp^1$ is a single bond, $Sp^1$ is —(CH$_2$)$_{p2}$— or —(CH$_2$)$_{p1}$—O—, in which p1 is an integer from 1 to 6, preferably 1, 2 or 3, $Sp^2$ and $Sp^3$ denote —(CH$_2$)$_{p2}$—, in which p2 is an integer from 1 to 6, preferably 1, 2 or 3, very preferably methylene, $Sp^4$ is —(CH$_2$)$_{p4}$—, in which p4 is an integer from 1 to 6, preferably 1, 2 or 3, very preferably methylene, $Sp^1$ is a single bond, and $Sp^2$, $Sp^3$ and $Sp^4$ are methylene, $Sp^1$ and $Sp^4$ are a single bond, and $Sp^2$ and $Sp^3$ are methylene, $Sp^1$, $Sp^2$ and $Sp^3$ are a single bond, and $Sp^4$ is ethylene, L does not denote or contain a polymerisable group, $A^1$ and $A^2$ are selected from the group consisting of 1,4-phenylene, naphthalene-2,6-diyl, phenanthrene-2,7-diyl and 9,10-dihydro-phenanthrene-2,7-diyl, where, in addition, one or two CH groups in these rings are optionally replaced by N, and where these rings are optionally mono- or polysubstituted by L, as described above and below, $Z^1$ is selected from the group consisting of —O—, —CO—O—, —OCO—, —OCH$_2$—, —CH$_2$O—, —CF$_2$O—, —OCF$_2$—, —CH$_2$CH$_2$—, —CH=CH—, —CF=CF—, —CH=CF, —CF=CH—, —C≡C—, and a single bond, $Z^1$ is a single bond, n is 1 or 2, L is an unpolymerisable group, preferably selected from F, Cl, —CN and straight-chain or branched alkyl having 1 to 25, particularly preferably 1 to 10, C atoms, in which, in addition, one or more non-adjacent $CH_2$ groups may each be replaced, independently of one another, by —C($R^{00}$)=C($R^{000}$)—, —C≡C—, —N($R^{00}$)—, —O—, —S—, —CO—, —CO—O—, —O—CO—, —O—CO—O— in such a way that O and/or S atoms are not linked directly to one another, and in which, in addition, one or more H atoms may be replaced by F, Cl, Br, I or CN.

Very preferred compounds of formula I are selected from the following subformulae

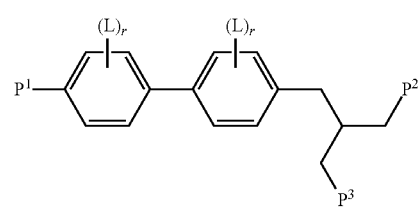

-continued

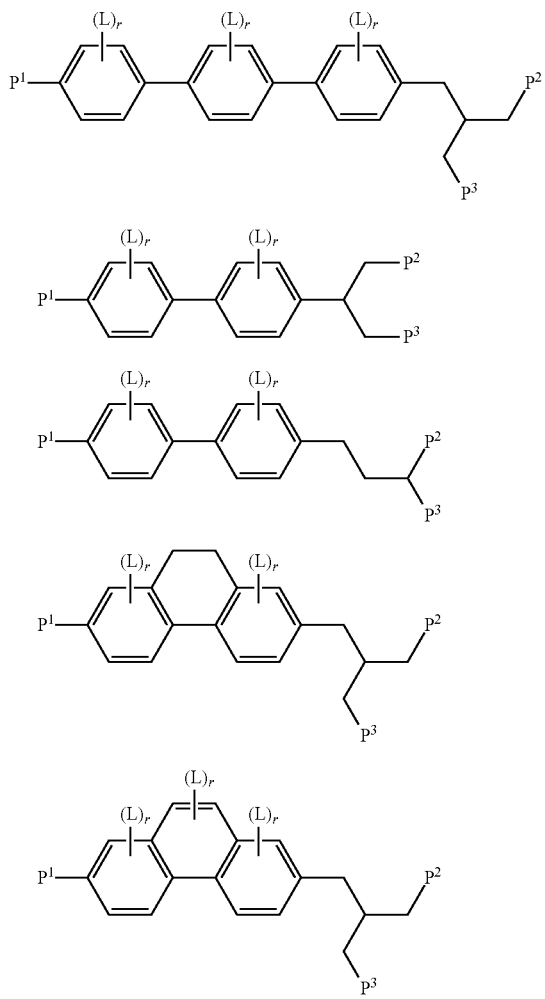

wherein $P^1$, $P^2$, $P^3$ and L are as defined in formula I and r is 0, 1, 2, 3 or 4.

The invention furthermore relates to novel compounds of the formulae I and I1 to I6.

The invention furthermore relates to novel compounds of formula II, which are suitable, and preferably used as, intermediates for the preparation of compounds of the formula I and its subformulae, $$Pg^1\text{-}Sp^1\text{-}(A^1\text{-}Z^1)_n\text{-}A^2\text{-}Sp^4\text{-}CH(Sp^2\text{-}Pg^2)(Sp^3\text{-}Pg^3) \quad \text{II}$$

in which $Sp^1$, $Sp^2$, $Sp^3$, $Sp^4$, $A^1$, $A^2$, $Z^1$ and n have the meaning indicated in formula I or above and below, and $Pg^1$, $Pg^2$ and $Pg^3$ denote independently of each other OH or a protected hydroxyl group or a masked hydroxyl group.

Suitable protected hydroxyl groups $Pg^{1-3}$ are known to the person skilled in the art. Preferred protecting groups for hydroxyl groups are alkyl, alkoxyalkyl, acyl, alkylsilyl, arylsilyl and arylmethyl groups, especially 2-tetrahydropyranyl, methoxymethyl, methoxyethoxymethyl, acetyl, triisopropylsilyl, tert-butyldimethylsilyl or benzyl.

The term "masked hydroxyl group" is understood to mean any functional group that can be chemically converted into a hydroxyl group. Suitable masked hydroxyl groups $Pg^{1-3}$ are known to the person skilled in the art. A preferred masking group for —CH(CH$_2$-Pg$^2$)(CH$_2$-Pg$^3$) is a malonate group —CH(CO$_2$Et)$_2$.

Especially preferred compounds of formula II are selected from the following subformulae

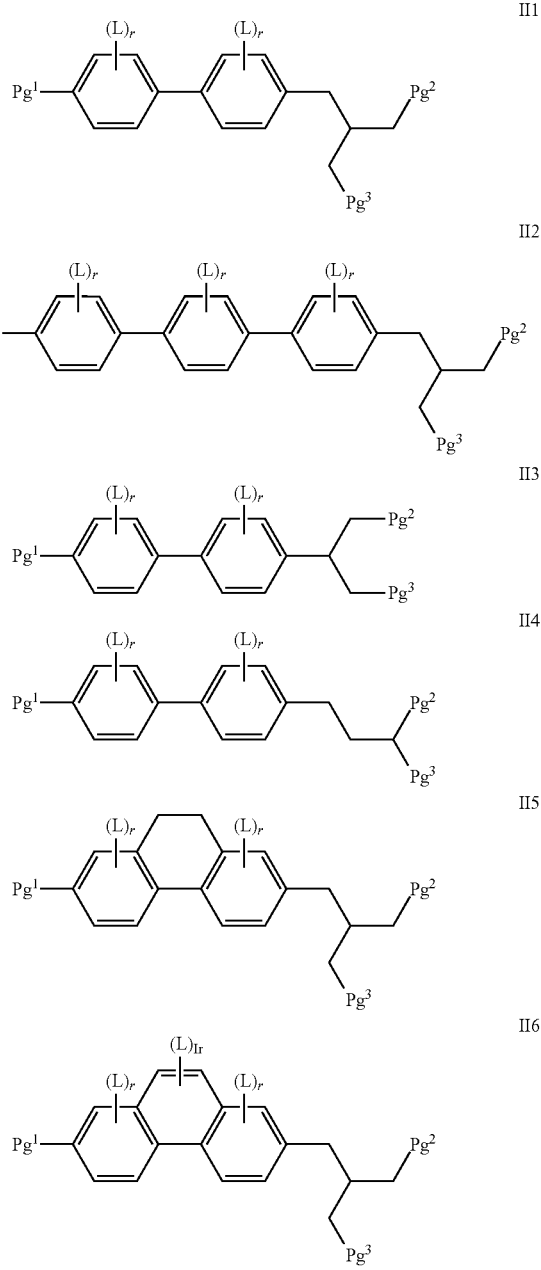

wherein $Pg^1$, $Pg^2$ and $Pg^3$ are as defined in formula II, and L and r are as defined in formula I1.

The compounds and intermediates of the formulae I and II and sub-formulae thereof can be prepared analogously to processes known to the person skilled in the art and described in standard works of organic chemistry, such as, for example, in Houben-Weyl, Methoden der organischen Chemie [Methods of Organic Chemistry], Thieme-Verlag, Stuttgart.

Particularly suitable and preferred processes for the preparation of compounds and intermediates of the formulae I and II are depicted by way of example in the following schemes and preferably comprise one or more of the steps described below.

For example, compounds of formula I can be synthesised by esterification or etherification of the intermediates of formula II, wherein $Pg^{1-3}$ denote OH, using corresponding acids, acid derivatives, or halogenated compounds containing a polymerisable group $P^1$.

As exemplarily shown in Scheme 1, acrylic or methacrylic esters (wherein $Sp^{1-4}$, $A^{1-2}$, $Z^1$ and n have the meanings given above, and "Acr" denotes an acrylate or methacrylate group) can be prepared by esterification of the corresponding alcohols with acid derivatives like, for example, (meth)acryloyl chloride or (meth)acrylic anhydride in the presence of a base like pyridine or triethyl amine, and 4-(N,N-dimethylamino)pyridine (DMAP). Alternatively the esters can be prepared by esterification of the alcohols with (meth)acrylic acid in the presence of a dehydrating reagent, for example according to Steglich with dicyclohexylcarbodiimide (DCC), N-(3-dimethylaminopropyl)-N'-ethylcarbodiimide (EDC) or N-(3-dimethylaminopropyl)-N'-ethylcarbodiimide hydrochloride and DMAP.

Scheme 1

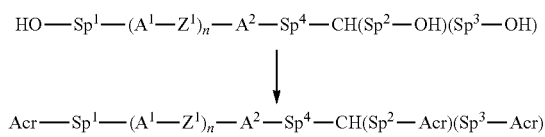

The intermediates of formula II can be synthesized according to or in analogy to known methods that are described in the literature. The synthesis of an intermediate of formula II1, like compound (7), is exemplarily shown in Scheme 2.

Scheme 2

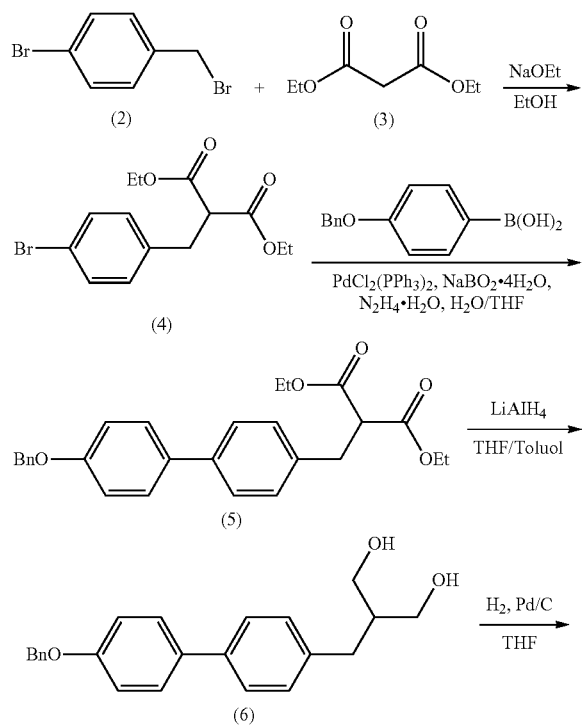

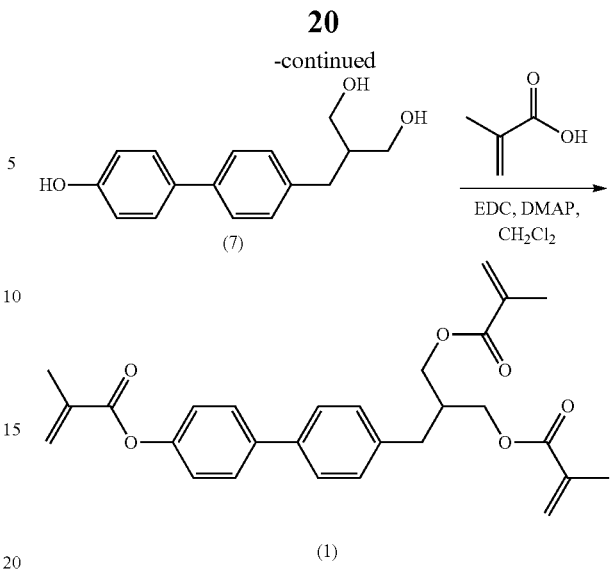

2-[(4-Bromophenyl)methyl]-propanedioic acid 1,3-diethyl ester (4) is prepared according to the literature (WO 2010/105179; *Tetrahedron: Asymmetry* 2001, 12(4), 585) from commercially available 1-bromo-4-(bromomethyl)-benzene (2) and diethyl malonate (3). Aryl-aryl coupling with [4-(Benzyloxy)phenyl]-boronic acid gives compound (5), which is reduced to the diol (6). Removal of the benzyl protecting group gives compound (7). Esterification of (7) with acrylic acid gives monomer (1).

For the production of PSA displays, the polymerisable compounds are polymerised or crosslinked (if one compound contains two or more polymerisable groups) by in-situ polymerisation in the LC medium between the substrates of the LC display with application of a voltage. The polymerisation can be carried out in one step. It is also possible firstly to carry out the polymerisation with application of a voltage in a first step in order to produce a pretilt angle, and subsequently, in a second polymerisation step without an applied voltage, to polymerise or crosslink the compounds which have not reacted in the first step ("end curing").

Suitable and preferred polymerisation methods are, for example, thermal or photopolymerisation, preferably photopolymerisation, in particular UV photopolymerisation. One or more initiators can optionally also be added here. Suitable conditions for the polymerisation and suitable types and amounts of initiators are known to the person skilled in the art and are described in the literature. Suitable for free-radical polymerisation are, for example, the commercially available photoinitiators Irgacure651®, Irgacure184®, Irgacure907®, Irgacure369® or Darocure1173® (Ciba AG). If an initiator is employed, its proportion is preferably 0.001 to 5% by weight, particularly preferably 0.001 to 1% by weight.

The polymerisable compounds according to the invention are also suitable for polymerisation without an initiator, which is accompanied by considerable advantages, such, for example, lower material costs and in particular less contamination of the LC medium by possible residual amounts of the initiator or degradation products thereof. The polymerisation can thus also be carried out without the addition of an initiator. In a preferred embodiment, the LC medium thus comprises no polymerisation initiator.

The polymerisable component A) or the LC medium may also comprise one or more stabilisers in order to prevent undesired spontaneous polymerisation of the RMs, for example during storage or transport. Suitable types and amounts of stabilisers are known to the person skilled in the art and are described in the literature. Particularly suitable are, for example, the commercially available stabilisers from the Irganox® series (Ciba AG), such as, for example, Irganox® 1076. If stabilisers are employed, their proportion, based on the total amount of RMs or the polymerisable component A), is preferably 10-500,000 ppm, particularly preferably 50-50,000 ppm.

Preferably the LC medium according to the present invention does essentially consist of one or more polymerisable compounds of formula I and an LC host mixture as described above and below. However, the LC medium or LC host mixture may additionally comprise one or more further components or additives, preferably selected from the list including but not limited to co-monomers, chiral dopants, polymerisation initiators, inhibitors, stabilizers, surfactants, wetting agents, lubricating agents, dispersing agents, hydrophobing agents, adhesive agents, flow improvers, defoaming agents, deaerators, diluents, reactive diluents, auxiliaries, colourants, dyes, pigments and nanoparticles.

The LC media according to the invention for use in PSA displays preferably comprise from >0 to <5% by weight, particularly preferably from >0 to <1% by weight, very particularly preferably from 0.01 to 0.5% by weight, of polymerisable compounds, in particular polymerisable compounds of the formulae indicated above.

Particular preference is given to LC media comprising one, two or three polymerisable compounds according to the invention.

Preference is furthermore given to LC media in which the polymerisable component (component A) comprises exclusively polymerisable compounds according to the invention.

Preference is furthermore given to LC media in which component B) is an LC compound or an LC mixture which has a nematic liquid-crystal phase.

Preference is furthermore given to achiral polymerisable compounds according to the invention and LC media in which the compounds of component A) and/or B) are selected exclusively from the group consisting of achiral compounds.

Preference is furthermore given to LC media in which the polymerisable component or component A) comprises one or more polymerisable compounds according to the invention containing one polymerisable group (monoreactive) and one or more polymerisable compounds according to the invention containing two or more, preferably two, polymerisable groups (di- or multireactive).

Preference is furthermore given to PSA displays and LC media in which the polymerisable component or component A) comprises exclusively polymerisable compounds according to the invention containing two polymerisable groups (direactive).

The proportion of the polymerisable component or component A) in the LC media according to the invention is preferably from >0 to <5%, particularly preferably from >0 to <1%, very particularly preferably from 0.01 to 0.5%.

The proportion of the liquid-crystalline component or component B) in the LC media according to the invention is preferably from 95 to <100%, particularly preferably from 99 to <100%.

The polymerisable compounds according to the invention can be polymerised individually, but it is also possible to polymerise mixtures which comprise two or more polymerisable compounds according to the invention, or mixtures comprising one or more polymerisable compounds according to the invention and one or more further polymerisable compounds ("co-monomers"), which are preferably mesogenic or liquid-crystalline. In the case of polymerisation of such mixtures, copolymers are formed. The invention furthermore relates to the polymerisable mixtures mentioned above and below. The polymerisable compounds and comonomers are mesogenic or non-mesogenic, preferably mesogenic or liquid-crystalline.

Suitable and preferred mesogenic comonomers, particularly for use in PSA displays, are selected, for example, from the following formulae:

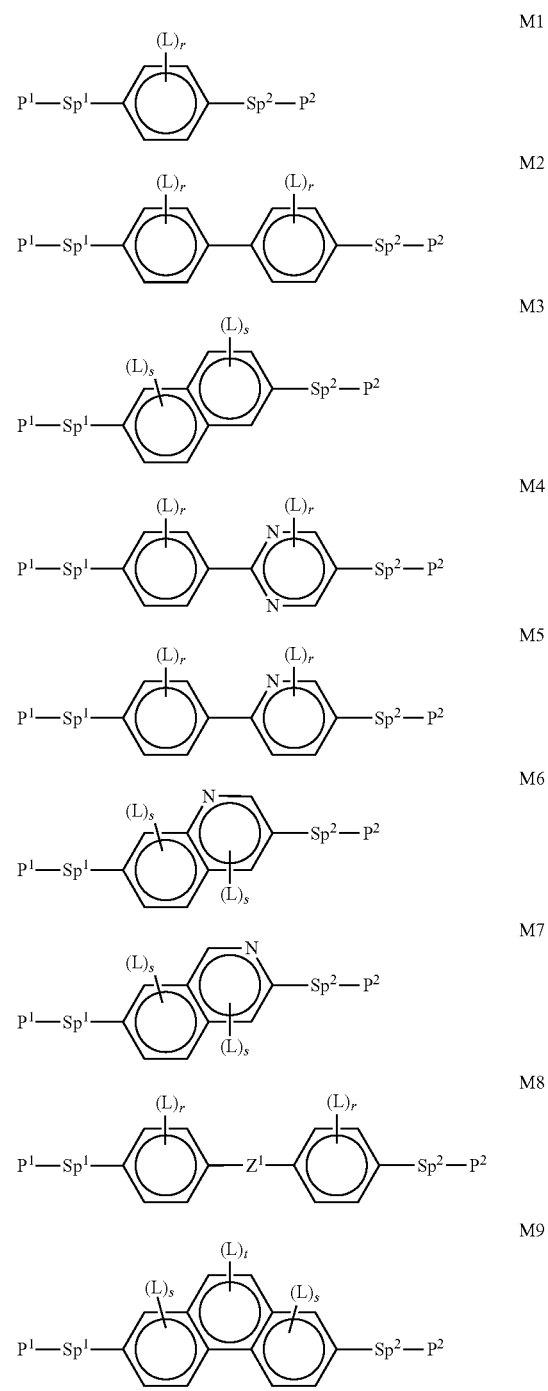

M10
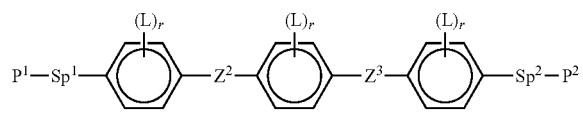
M11
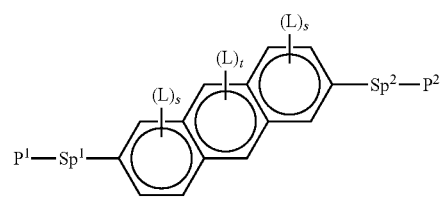
M12
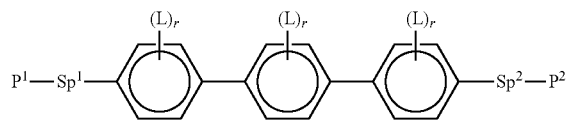
M13
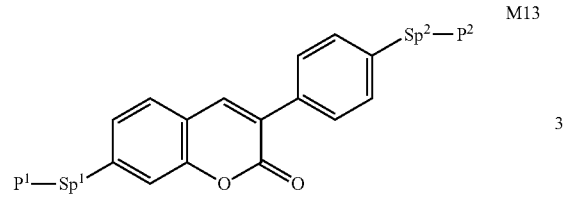
M14
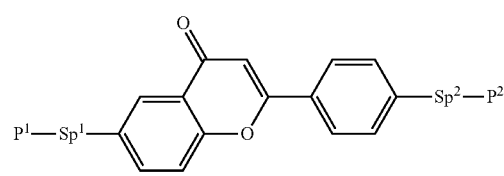
M15
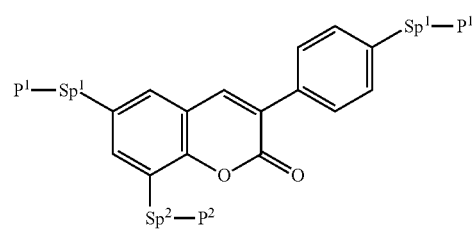
M16
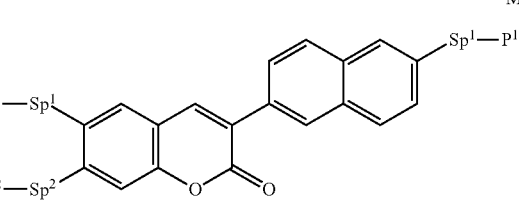
M17
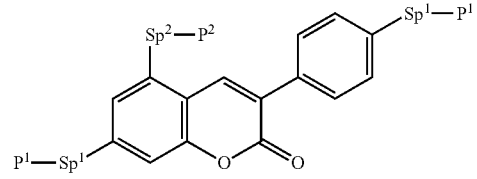
M18
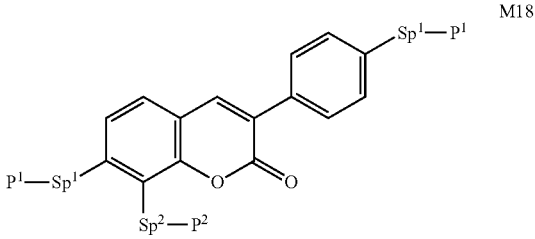
M19
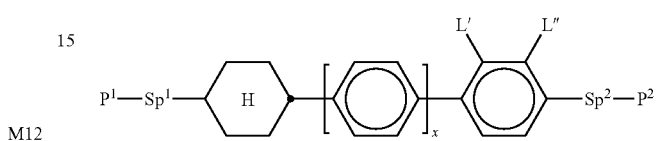
M20
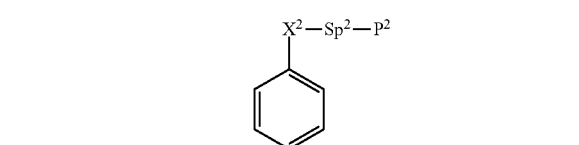
M21
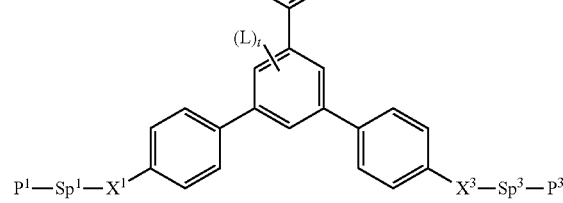
M22
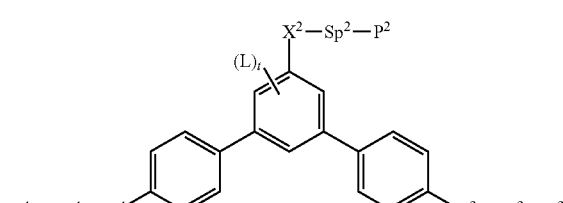
M23
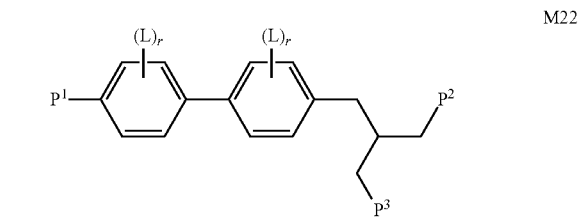
M24
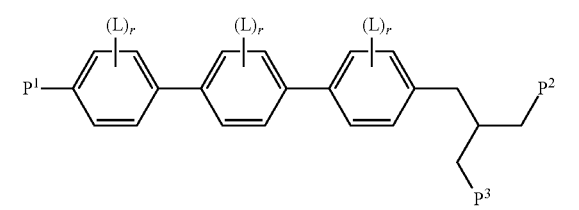
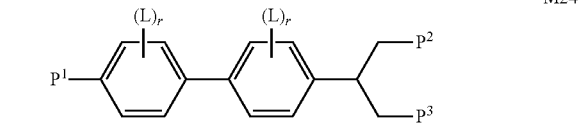

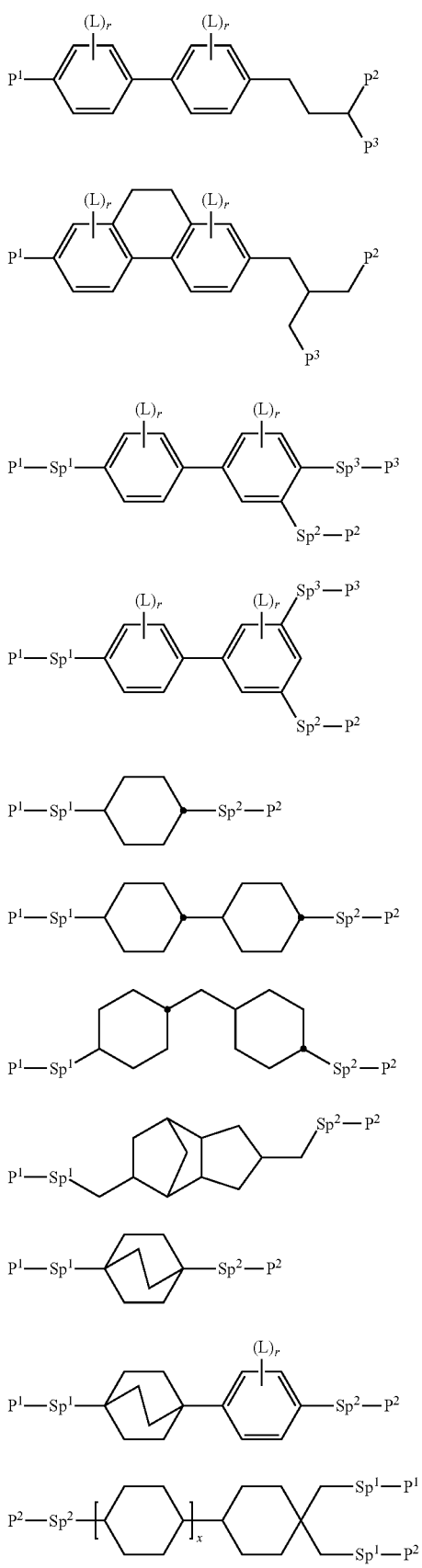

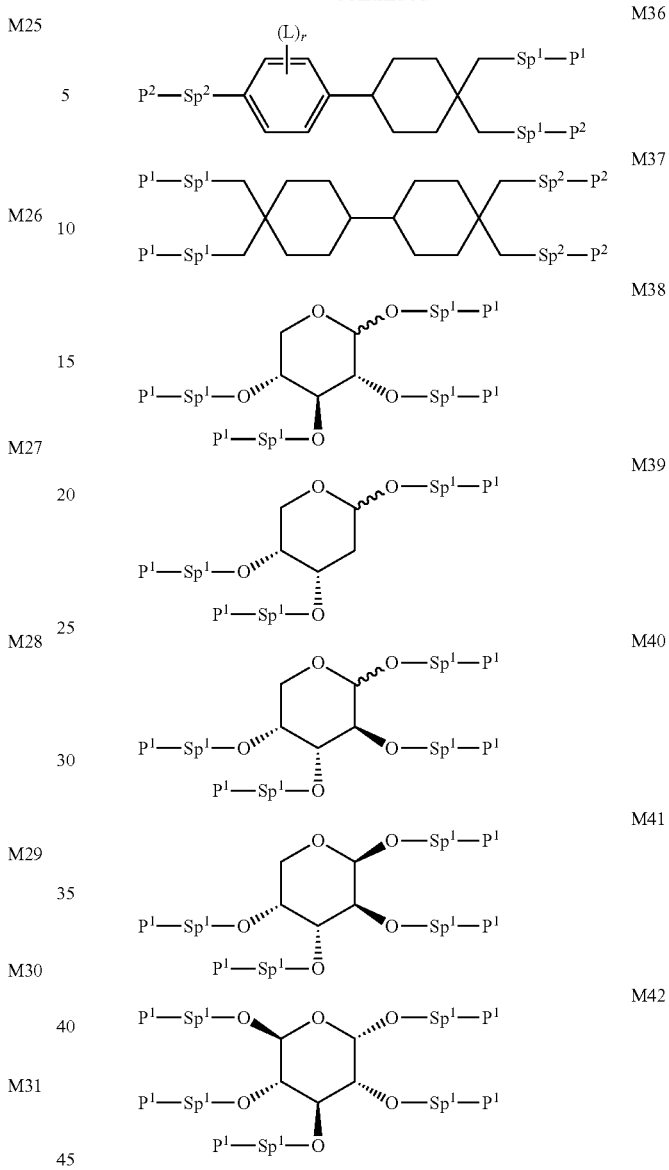

in which the individual radicals have the following meanings:

$P^1$, $P^2$ and $P^3$ each, independently of one another, denote a polymerisable group, preferably having one of the meanings indicated above and below for P, particularly preferably an acrylate, methacrylate, fluoroacrylate, oxetane, vinyl, vinyloxy or epoxide group, $Sp^1$, $Sp^2$ and $Sp^3$ each, independently of one another, denote a single bond or a spacer group, preferably having one of the meanings indicated above and below for Sp, and particularly preferably denote —$(CH_2)_{p1}$—, —$(CH_2)_{p1}$—O—, —$(CH_2)_{p1}$—CO—O— or —$(CH_2)_{p1}$—O—CO—O—, in which p1 is an integer from 1 to 12, and where the linking to the adjacent ring in the last-mentioned groups takes place via the O atom, where, in addition, one or more of the radicals $P^1$-$Sp^1$-, $P^1$-$Sp^2$- and $P^3$-$Sp^3$- may denote $R^{aa}$, with the proviso that at least one of the radicals $P^1$-$Sp^1$-, $P^2$-$Sp^2$ and $P^3$-$Sp^3$- present does not denote $R^{aa}$, $R^{aa}$ denotes H, F, Cl, CN or straight-chain or branched alkyl having 1 to 25 C atoms, in which, in addition, one or more non-adjacent CH$_2$ groups may each be replaced, independently of one another, by C(R$^0$)=C(R$^{00}$)—, —C≡C—, —N(R$^0$)—, —O—, —S—, —CO—, —CO—O—, —O—CO—, —O—CO—O— in such a way that O and/or S atoms are not linked directly to one another, and in which, in addition, one or more H atoms may be replaced by F, Cl, CN or P$^1$-Sp$^1$-, particularly preferably straight-chain or branched, optionally mono- or polyfluorinated alkyl, alkoxy, alkenyl, alkynyl, alkylcarbonyl, alkoxycarbonyl, alkylcarbonyloxy or alkoxycarbonyloxy having 1 to 12 C atoms (where the alkenyl and alkynyl radicals have at least two C atoms and the branched radicals have at least three C atoms), R$^0$, R$^{00}$ each, independently of one another and identically or differently on each occurrence, denote H or alkyl having 1 to 12 C atoms, R$^y$ and R$^z$ each, independently of one another, denote H, F, CH$_3$ or CF$_3$, X$^1$, X$^2$ and X$^3$ each, independently of one another, denote —CO—O—, —O—CO— or a single bond, Z$^1$ denotes —O—, —CO—, —C(R$^y$R$^z$)— or —CF$_2$CF$_2$—, Z$^2$ and Z$^3$ each, independently of one another, denote —CO—O—, —O—CO—, —CH$_2$O—, —OCH$_2$—, —CF$_2$O—, —OCF$_2$— or —(CH$_2$)$_n$—, where n is 2, 3 or 4, L on each occurrence, identically or differently, denotes F, Cl, CN or straight-chain or branched, optionally mono- or polyfluorinated alkyl, alkoxy, alkenyl, alkynyl, alkylcarbonyl, alkoxycarbonyl, alkylcarbonyloxy or alkoxycarbonyloxy having 1 to 12 C atoms, preferably F, L' and L" each, independently of one another, denote H, F or Cl, r denotes 0, 1, 2, 3 or 4, s denotes 0, 1, 2 or 3, t denotes 0, 1 or 2, x denotes 0 or 1.

Especially preferred are compounds of formulae M1 to M28.

In the compounds of formulae M1 to M42

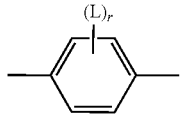

is preferably

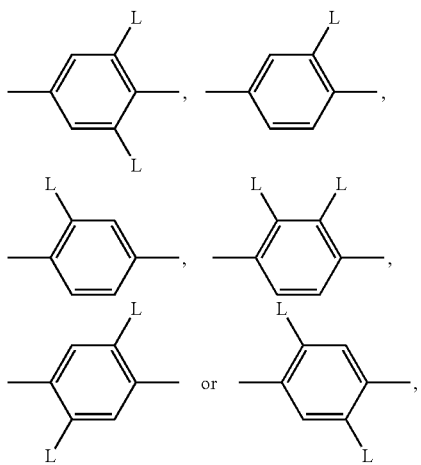

wherein L on each occurrence, identically or differently, has one of the meanings given above or below, and is preferably F, Cl, CN, NO$_2$, CH$_3$, C$_2$H$_5$, C(CH$_3$)$_3$, CH(CH$_3$)$_2$, CH$_2$CH (CH$_3$)C$_2$H$_5$, OCH$_3$, OC$_2$H$_5$, COCH$_3$, COC$_2$H$_5$, COOCH$_3$, COOC$_2$H$_5$, CF$_3$, OCF$_3$, OCHF$_2$, OC$_2$F$_5$ or P-Sp-, very preferably F, Cl, CN, CH$_3$, C$_2$H$_5$, OCH$_3$, COCH$_3$, OCF$_3$ or P-Sp-, more preferably F, Cl, CH$_3$, OCH$_3$, COCH$_3$ oder OCF$_3$, especially F or CH$_3$.

Besides the polymerisable compounds described above, the LC media for use in the LC displays according to the invention comprise an LC mixture ("host mixture") comprising one or more, preferably two or more, low-molecular-weight (i.e. monomeric or unpolymerised) compounds. The latter are stable or unreactive to a polymerisation reaction under the conditions used for polymerisation of the polymerisable compounds. In principle, any LC mixture which is suitable for use in conventional VA and OCB displays is suitable as host mixture. Suitable LC mixtures are known to the person skilled in the art and are described in the literature, for example mixtures in VA displays in EP 1 378 557 A1 and mixtures for OCB displays in EP 1 306 418 A1 and DE 102 24 046 A1.

The polymerisable compounds of formula I are especially suitable for use in an LC host mixture that comprises one or more compounds comprising an alkenyl group, ("alkenyl compound"), where this alkenyl group is stable to a polymerisation reaction under the conditions used for the polymerisation of the polymerisable compounds of formula I or of the other polymerisable compounds contained in the LC medium. Compared to reactive mesogens known from prior art the polymerisable compounds of formula I in such an LC host mixture shows improved properties, like solubility, reactivity or capability of generating a tilt angle.

The LC host mixture is preferably a nematic LC mixture.

The alkenyl groups in the alkenyl compounds are preferably selected from straight-chain, branched or cyclic alkenyl, in particular having 2 to 25 C atoms, particularly preferably having 2 to 12 C atoms, in which, in addition, one or more non-adjacent CH$_2$ groups may be replaced by —O—, —S—, —CO—, —CO—O—, —O—CO—, —O—CO—O— in such a way that O and/or S atoms are not linked directly to one another, and in which, in addition, one or more H atoms may be replaced by F and/or Cl.

Preferred alkenyl groups are straight-chain alkenyl having 2 to 7 C atoms and cyclohexenyl, in particular ethenyl, propenyl, butenyl, pentenyl, hexenyl, heptenyl, 1,4-cyclohexen-1-yl and 1,4-cyclohexen-3-yl.

The concentration of compounds containing an alkenyl group in the LC host mixture (i.e. without any polymerisable compounds) is preferably from 5% to 100%, very preferably from 20% to 60%.

Especially preferred are LC mixtures containing 1 to 5, preferably 1, 2 or 3 compounds having an alkenyl group.

The compounds containing an alkenyl group are preferably selected from the following formulae:

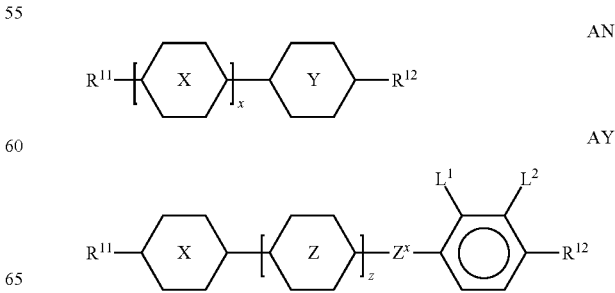

in which the individual radicals, on each occurrence identically or differently, each, independently of one another, have the following meaning:

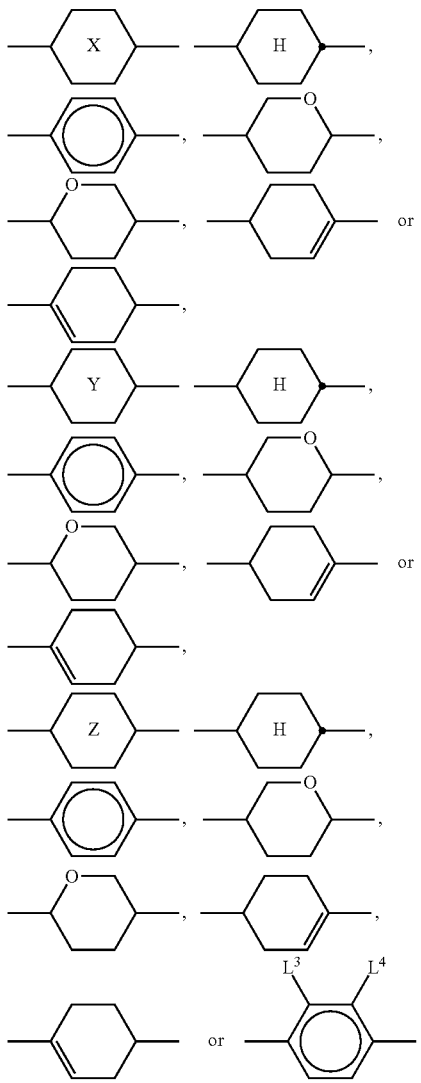

$R^{11}$ alkenyl having 2 to 9 C atoms or, if at least one of the rings X, Y and Z denotes cyclohexenyl, also one of the meanings of $R^d$,
$R^{12}$ alkyl having 1 to 12 C atoms, in which, in addition, one or two non-adjacent $CH_2$ groups may be replaced by —O—, —CH=CH—, —CO, —OCO— or —COO— in such a way that O atoms are not linked directly to one another,
$Z^x$ —$CH_2CH_2$—, —CH=CH—, —$CF_2O$—, —$OCF_2$—, —$CH_2O$—, —$OCH_2$—, —CO—O—, —O—CO—, —$C_2F_4$—, —CF=CF—, —CH=CH—$CH_2O$—, or a single bond, preferably a single bond,
$L^{1-4}$ each, independently of one another, H, F, Cl, $OCF_3$, $CF_3$, $CH_3$, $CH_2F$ or $CHF_2H$, preferably H, F or Cl,
x 1 or 2,
z 0 or 1.
$R^{22}$ is preferably straight-chain alkyl or alkoxy having 1 to 8 C atoms or straight-chain alkenyl having 2 to 7 C atoms.

The LC medium preferably comprises no compounds containing a terminal vinyloxy group (—O—CH=$CH_2$), in particular no compounds of the formula A or B in which $R^{11}$ or $R^{12}$ denotes or contains a terminal vinyloxy group (—O—CH=$CH_2$).

Preferably, $L^1$ and $L^2$ denote F, or one of $L^1$ and $L^2$ denotes F and the other denotes Cl, and $L^3$ and $L^4$ denote F, or one of $L^3$ and $L^4$ denotes F and the other denotes Cl.

The compounds of the formula AN are preferably selected from the following sub-formulae:

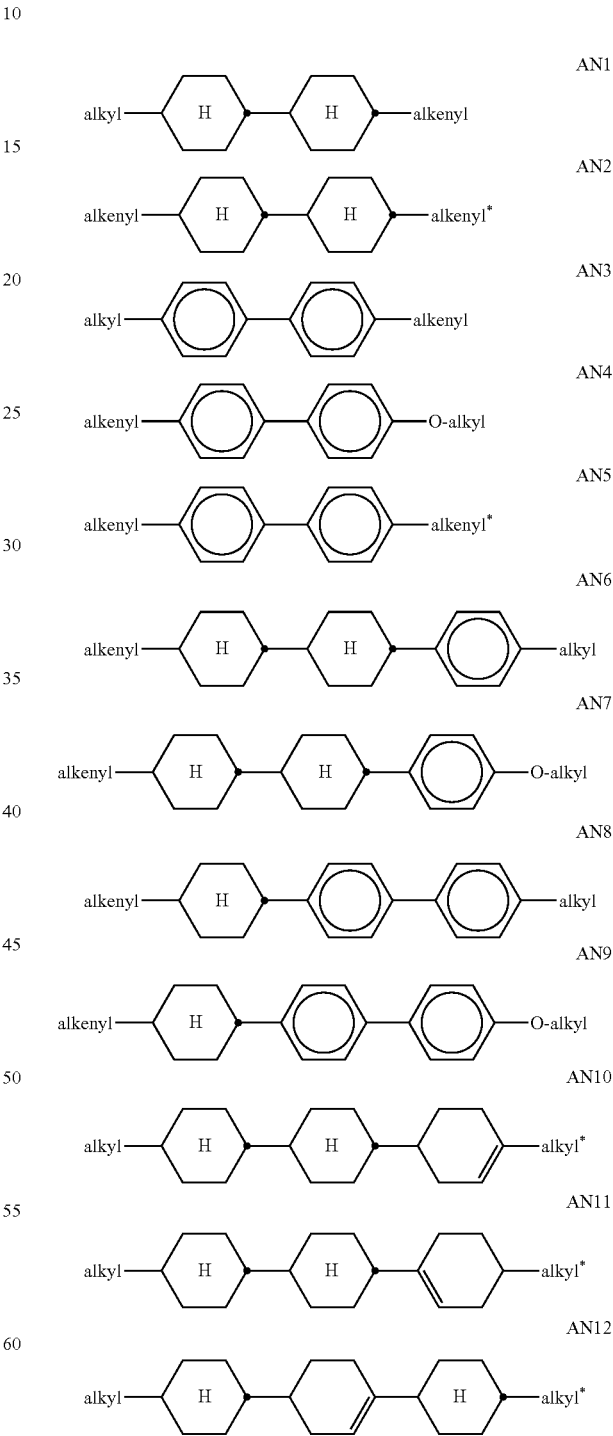

The compounds of the formula AY are preferably selected from the following sub-formulae:

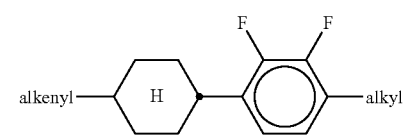
AY1
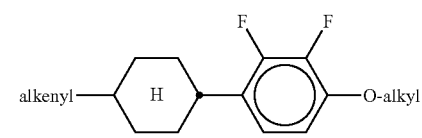
AY2
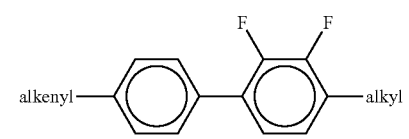
AY3
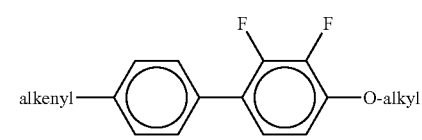
AY4
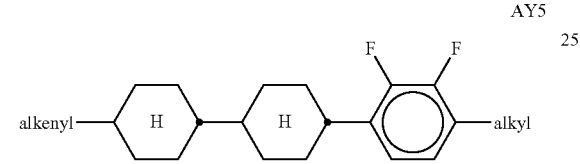
AY5
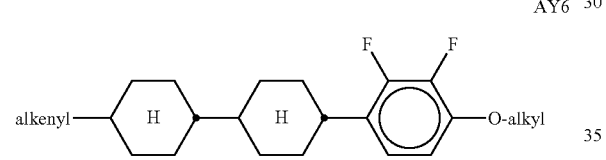
AY6
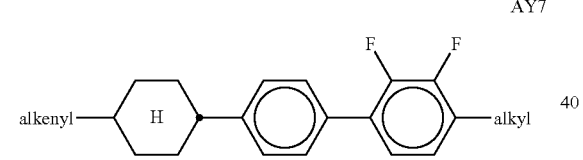
AY7
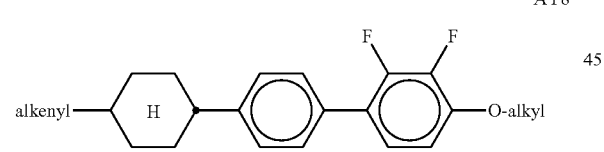
AY8
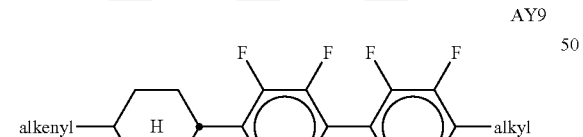
AY9
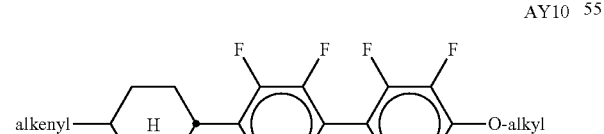
AY10
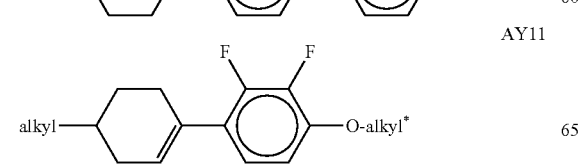
AY11
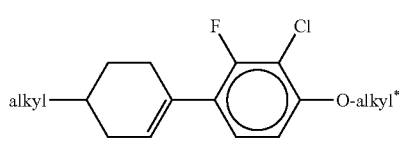
AY12
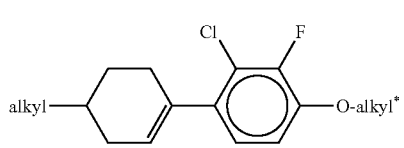
AY13
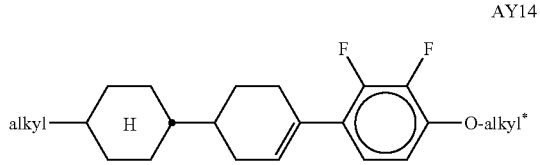
AY14
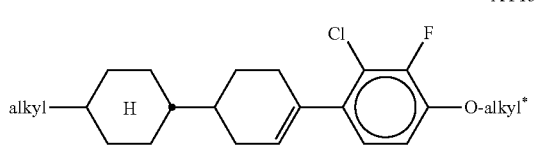
AY15
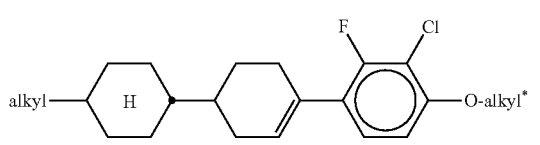
AY16
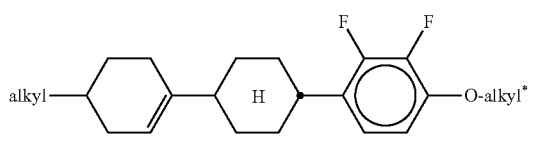
AY17
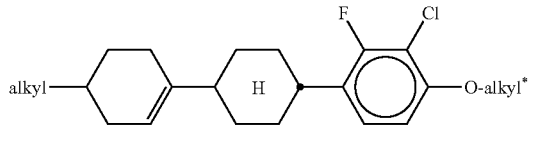
AY18
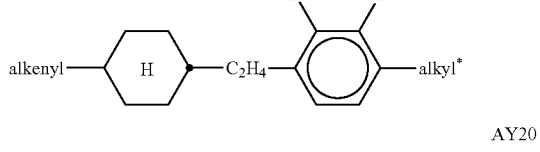
AY19
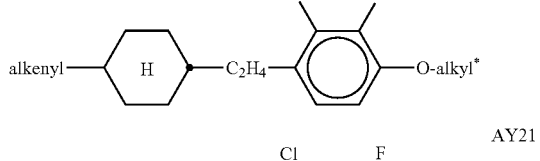
AY20
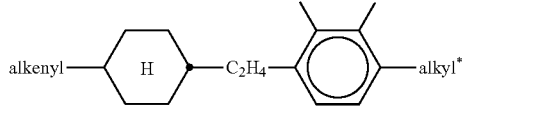
AY21

-continued

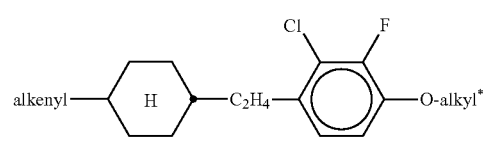
AY22

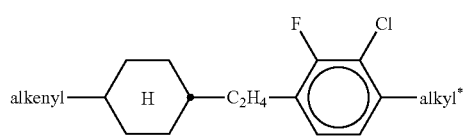
AY23

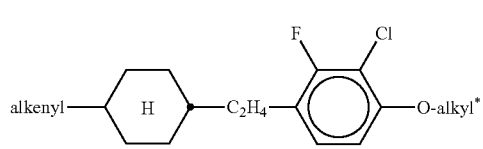
AY24

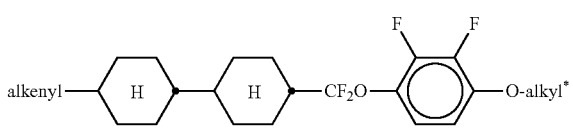
AY25

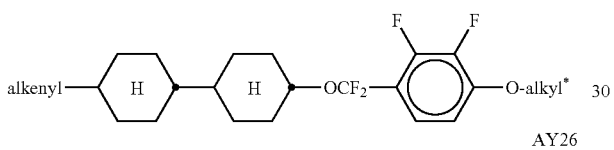
AY25

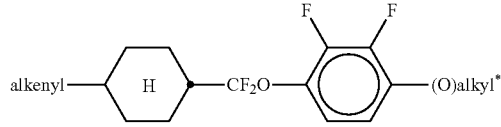
AY26

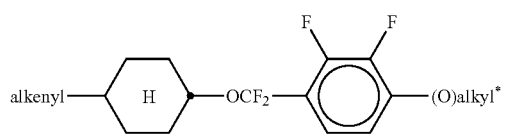
AY27

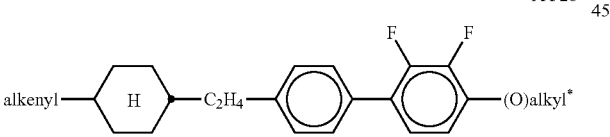
AY28

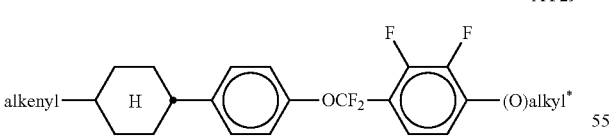
AY29

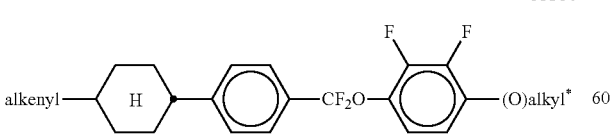
AY30

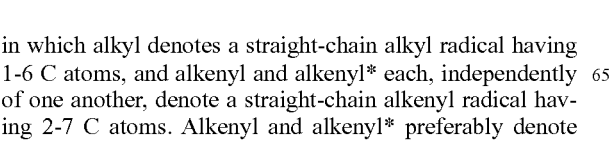

in which alkyl denotes a straight-chain alkyl radical having 1-6 C atoms, and alkenyl and alkenyl* each, independently of one another, denote a straight-chain alkenyl radical having 2-7 C atoms. Alkenyl and alkenyl* preferably denote $CH_2$=CH—, $CH_2$=CHCH$_2$CH$_2$—, $CH_3$—CH=CH—, $CH_3$—$CH_2$—CH=CH—, $CH_3$—$(CH_2)_2$—CH=CH—, $CH_3$—$(CH_2)_3$—CH=CH— or $CH_3$—CH=CH—$(CH_2)_2$—.

Very particularly preferred compounds of the formula A are selected from the following sub-formulae:

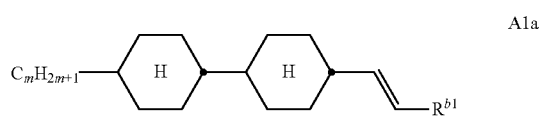
A1a

A3a

A6a

Very particularly preferred compounds of the formula AY are selected from the following sub-formulae:

AY5a

AY6a

AY9a

AY10a

AY11a

AY14a in which m and n each, independently of one another, denote 1, 2, 3, 4, 5 or 6, i denotes 0, 1, 2 or 3, $R^{b1}$ denotes H, $CH_3$ or $C_2H_5$, and alkenyl denotes $CH_2=CH-$, $CH_2=CHCH_2CH_2-$, $CH_3-CH=CH-$, $CH_3-CH_2-CH=CH-$, $CH_3-(CH_2)_2-CH=CH-$, $CH_3-(CH_2)_3-CH=CH-$ or $CH_3-CH=CH-(CH_2)_2-$.

In a first preferred embodiment the LC medium contains an LC host mixture based on compounds with negative dielectric anisotropy. Such LC media are especially suitable for use in PSA-VA displays. Particularly preferred embodiments of such an LC medium are those of sections a)-y) below:

a) LC medium which comprises one or more compounds of the formulae CY and/or PY:

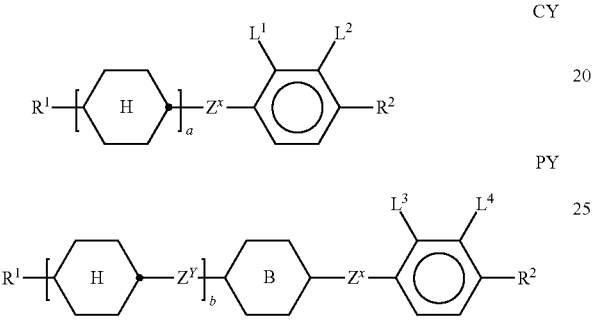

wherein
a denotes 1 or 2,
b denotes 0 or 1,

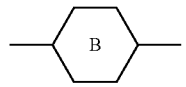

denotes

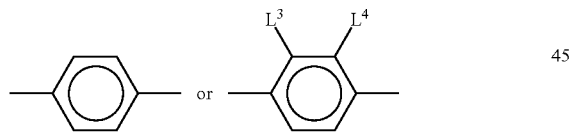

$R^1$ and $R^2$ each, independently of one another, denote alkyl having 1 to 12 C atoms, where, in addition, one or two non-adjacent $CH_2$ groups may be replaced by $-O-$, $-CH=CH-$, $-CO-$, $-OCO-$ or $-COO-$ in such a way that O atoms are not linked directly to one another, preferably alkyl or alkoxy having 1 to 6 C atoms, $Z^x$ and $Z^y$ each, independently of one another, denote $-CH_2CH_2-$, $-CH=CH-$, $-OCF_2-$, $-CH_2O-$, $-OCH_2-$, $-CO-O-$, $-O-CO-$, $-C_2F_4-$, $-CF=CF-$, $-CH=CH-CH_2O-$ or a single bond, preferably a single bond, $L^{1-4}$ each, independently of one another, denote F, Cl, $OCF_3$, $CF_3$, $CH_3$, $CH_2F$, $CHF_2$.

Preferably, both $L^1$ and $L^2$ denote F or one of $L^1$ and $L^2$ denotes F and the other denotes Cl, or both $L^3$ and $L^4$ denote F or one of $L^3$ and $L^4$ denotes F and the other denotes Cl.

The compounds of the formula CY are preferably selected from the group consisting of the following sub-formulae:

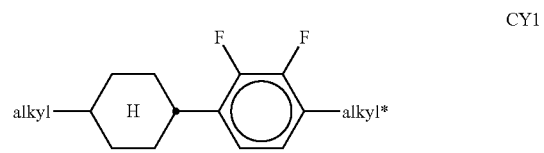

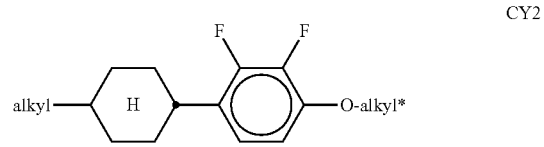

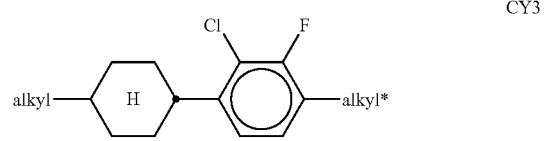

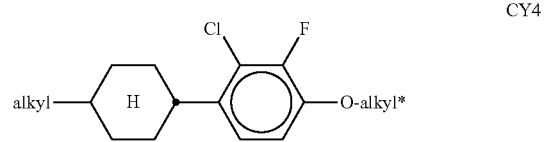

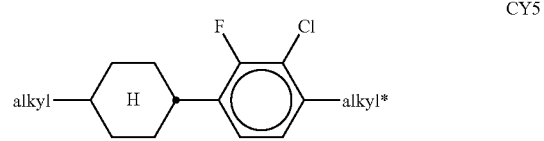

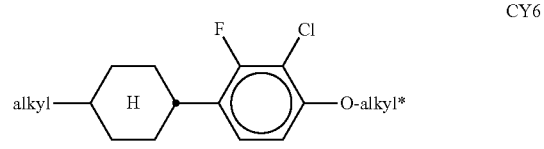

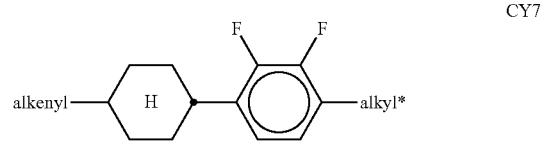

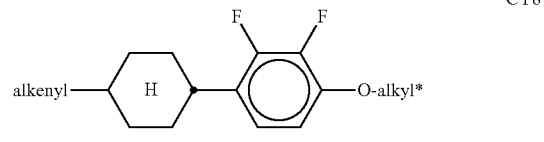

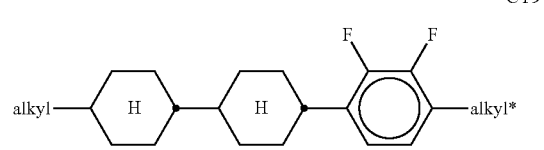

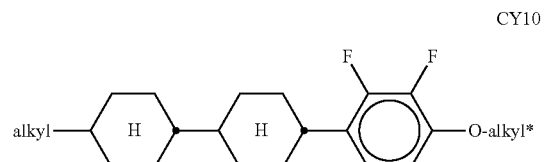

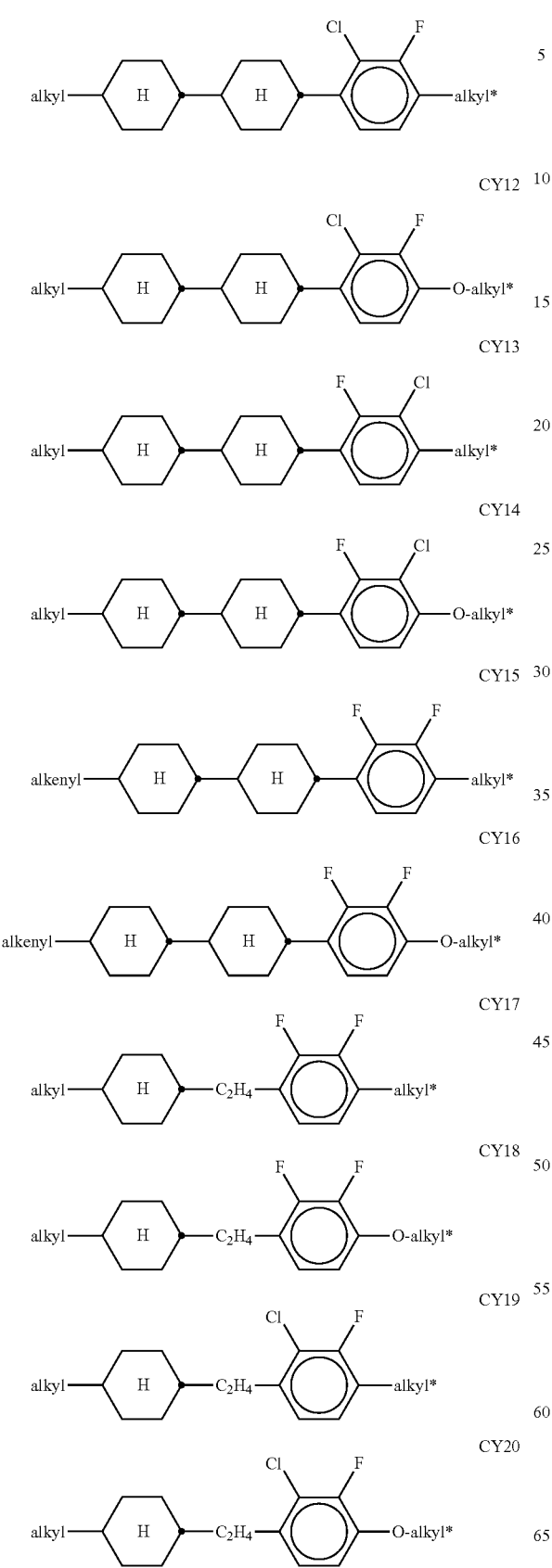
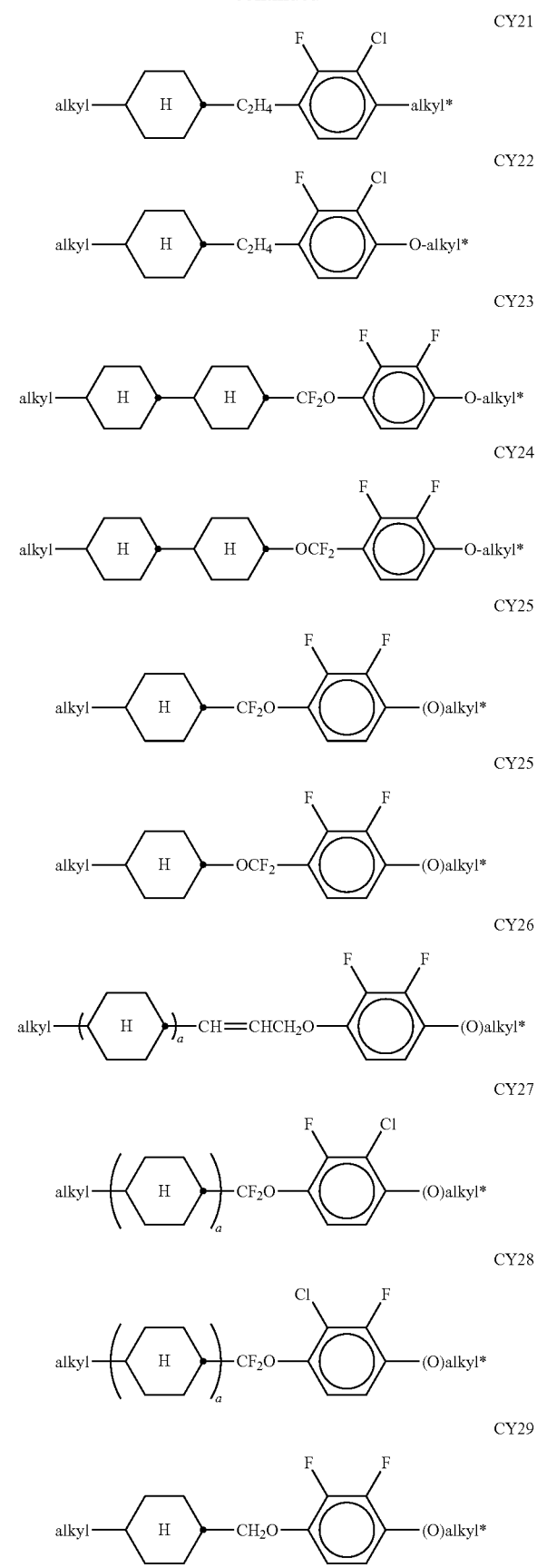

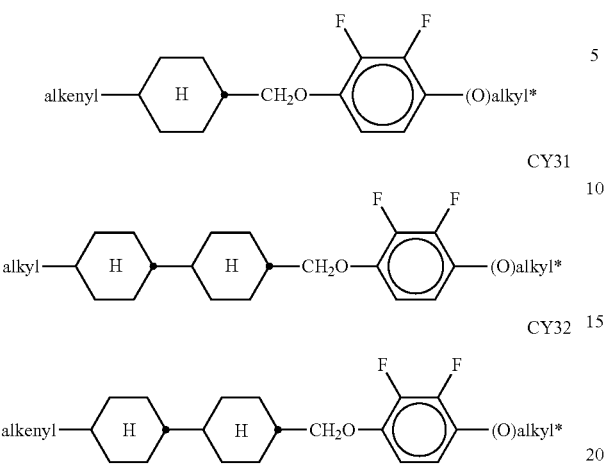

in which a denotes 1 or 2, alkyl and alkyl* each, independently of one another, denote a straight-chain alkyl radical having 1-6 C atoms, and alkenyl denotes a straight-chain alkenyl radical having 2-6 C atoms, and (O) denotes an oxygen atom or a single bond. Alkenyl preferably denotes $CH_2=CH-$, $CH_2=CHCH_2CH_2-$, $CH_3-CH=CH-$, $CH_3-CH_2-CH=CH-$, $CH_3-(CH_2)_2-CH=CH-$, $CH_3-(CH_2)_3-CH=CH-$ or $CH_3-CH=CH-(CH_2)_2-$.

The compounds of the formula PY are preferably selected from the group consisting of the following sub-formulae:

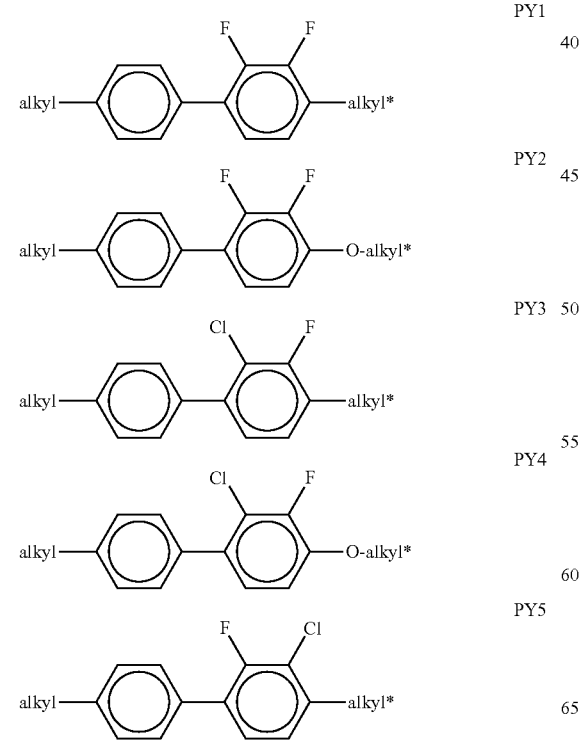

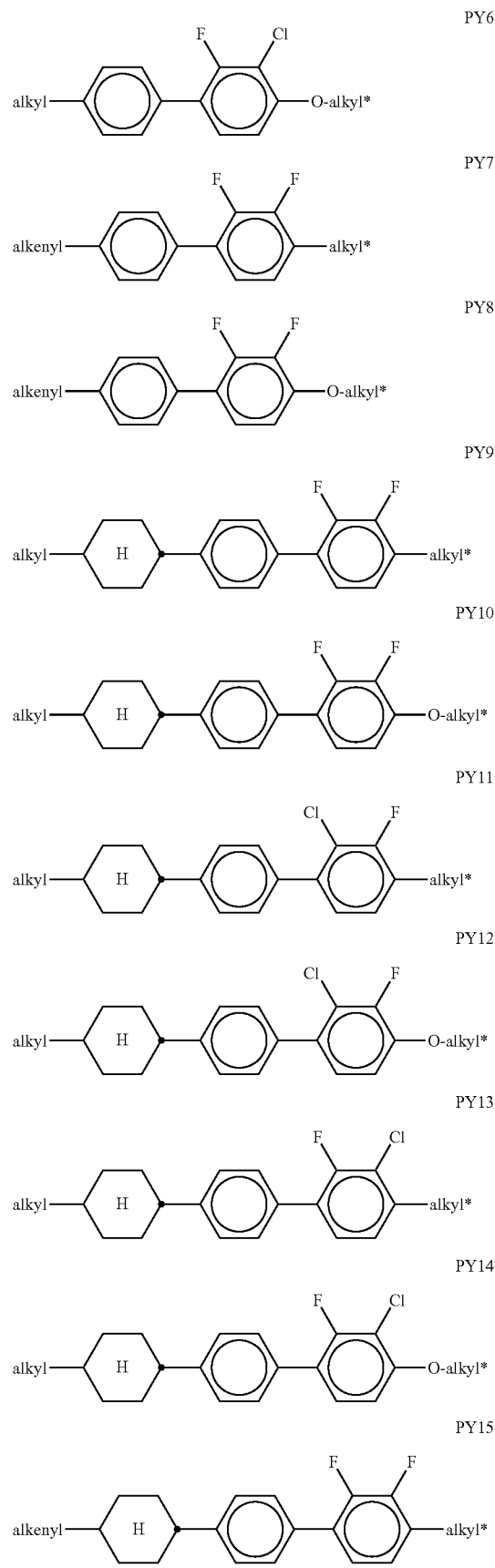

-continued

PY16
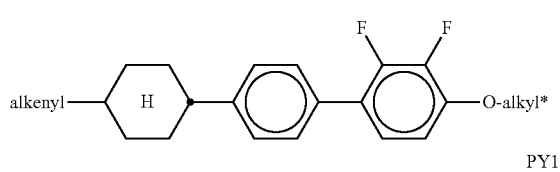

PY17
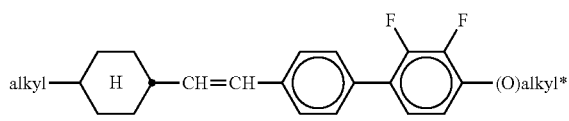

PY18
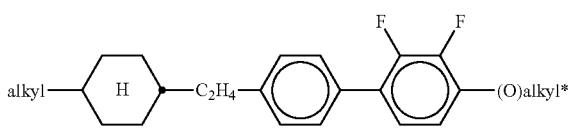

PY19
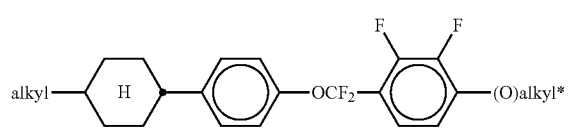

PY20
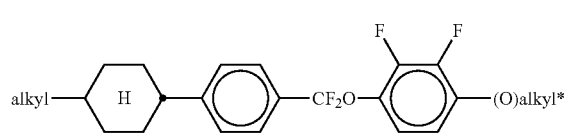

in which alkyl and alkyl* each, independently of one another, denote a straight-chain alkyl radical having 1-6 C atoms, and alkenyl denotes a straight-chain alkenyl radical having 2-6 C atoms, and (O) denotes an oxygen atom or a single bond. Alkenyl preferably denotes $CH_2=CH-$, $CH_2=CHCH_2CH_2-$, $CH_3-CH=CH-$, $CH_3-CH_2-CH=CH-$, $CH_3-(CH_2)_2-CH=CH-$, $CH_3-(CH_2)_3-CH=CH-$ or $CH_3-CH=CH-(CH_2)_2-$.

b) LC medium which additionally comprises one or more compounds of the following formula:

ZK
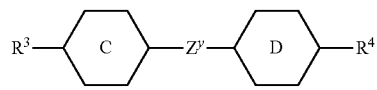

in which the individual radicals have the following meanings:

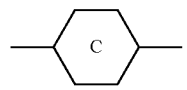

denotes

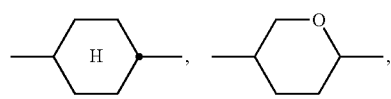

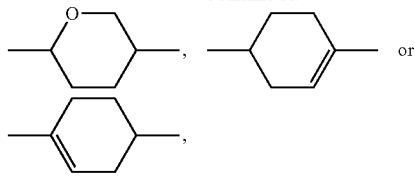, or

denotes

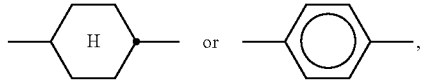

$R^3$ and $R^4$ each, independently of one another, denote alkyl having 1 to 12 C atoms, in which, in addition, one or two non-adjacent $CH_2$ groups may be replaced by —O—, —CH=CH—, —CO—, —O—CO— or —CO—O— in such a way that O atoms are not linked directly to one another, $Z^y$ denotes —$CH_2CH_2$—, —CH=CH—, —$CF_2O$—, —$OCF_2$—, —$CH_2O$—, —$OCH_2$—, —CO—O—, —O—CO—, —$C_2F_4$—, —CF=CF—, —CH=CH—$CH_2O$— or a single bond, preferably a single bond.

The compounds of the formula ZK are preferably selected from the group consisting of the following sub-formulae:

ZK1
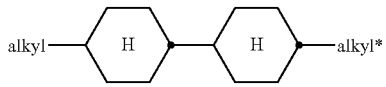

ZK2
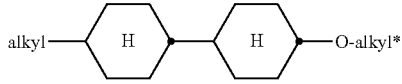

ZK3
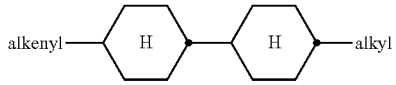

ZK4
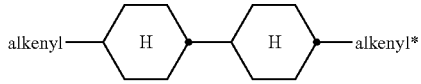

ZK5
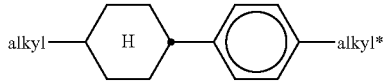

ZK6
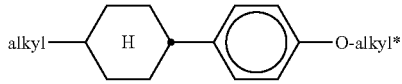

-continued

 ZK7

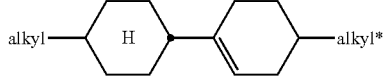 ZK8

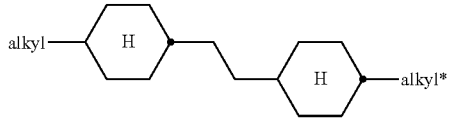 ZK9

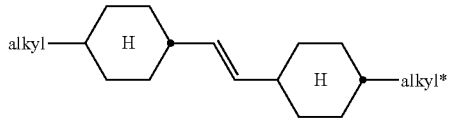 ZK10 in which alkyl and alkyl* each, independently of one another, denote a straight-chain alkyl radical having 1-6 C atoms, and alkenyl denotes a straight-chain alkenyl radical having 2-6 C atoms. Alkenyl preferably denotes $CH_2=CH-$, $CH_2=CHCH_2CH_2-$, $CH_3-CH=CH-$, $CH_3-CH_2-CH=CH-$, $CH_3-(CH_2)_2-CH=CH-$, $CH_3-(CH_2)_3-CH=CH-$ or $CH_3-CH=CH-(CH_2)_2-$.

c) LC medium which additionally comprises one or more compounds of the following formula:

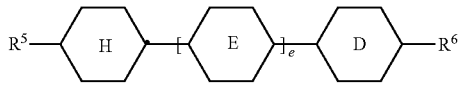 DK in which the individual radicals on each occurrence, identically or differently, have the following meanings:
$R^5$ and $R^6$ each, independently of one another, have one of the meanings indicated above for $R^1$,

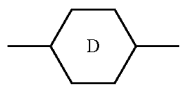

denotes

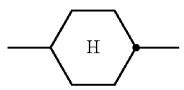 or ,

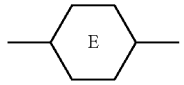

denotes

,  or

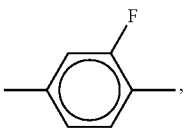, and
e denotes 1 or 2.

The compounds of the formula DK are preferably selected from the group consisting of the following sub-formulae:

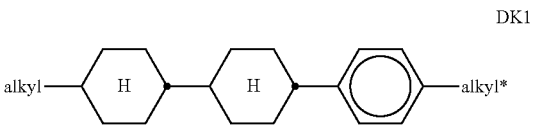 DK1

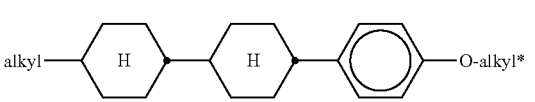 DK2

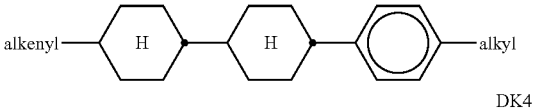 DK3

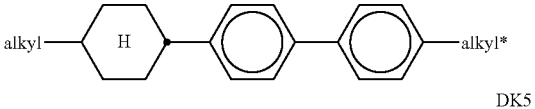 DK4

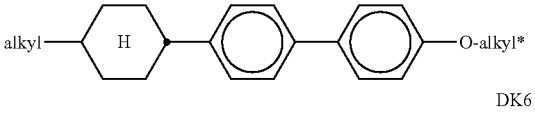 DK5

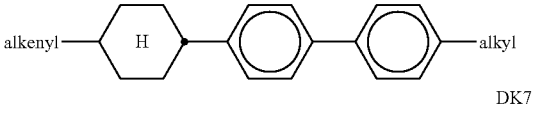 DK6

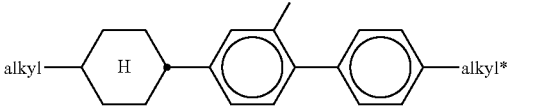 DK7

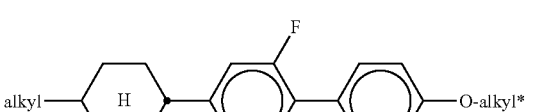 DK8

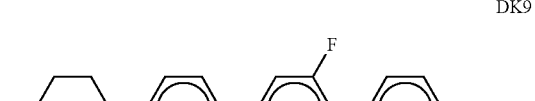 DK9

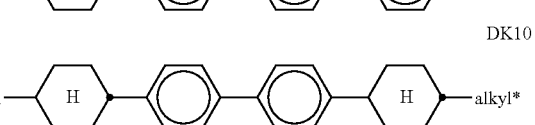 DK10

-continued

DK11

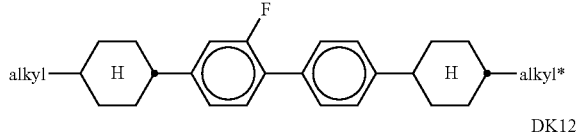

DK12

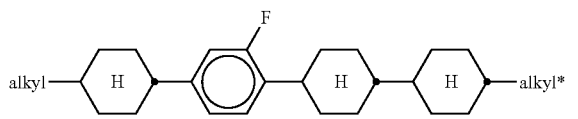

in which alkyl and alkyl* each, independently of one another, denote a straight-chain alkyl radical having 1-6 C atoms, and alkenyl and alkenyl* each, independently of one another, denote a straight-chain alkenyl radical having 2-6 C atoms. Alkenyl and alkenyl* preferably denote $CH_2$=CH—, $CH_2$=CHCH$_2$CH$_2$—, $CH_3$—CH=CH—, $CH_3$—CH$_2$—CH=CH—, $CH_3$—(CH$_2$)$_2$—CH=CH—, $CH_3$—(CH$_2$)$_3$—CH=CH— or $CH_3$—CH=CH—(CH$_2$)$_2$—.

d) LC medium which additionally comprises one or more compounds of the following formula:

LY

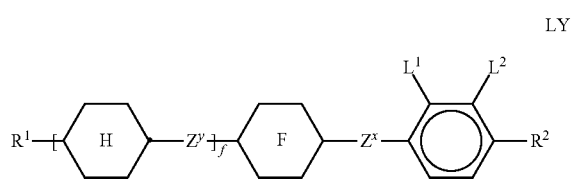

in which the individual radicals have the following meanings:

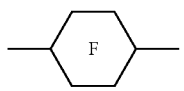

denotes

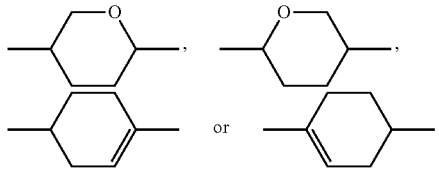

f denotes 0 or 1, $R^1$ and $R^2$ each, independently of one another, denote alkyl having 1 to 12 C atoms, where, in addition, one or two non-adjacent $CH_2$ groups may be replaced by —O—, —CH=CH—, —CO—, —OCO— or —COO— in such a way that O atoms are not linked directly to one another, $Z^x$ and $Z^y$ each, independently of one another, denote —CH$_2$CH$_2$—, —CH=CH—, —CF$_2$O—, —OCF$_2$—, —CH$_2$O—, —OCH$_2$—, —CO—O—, —O—CO—, —C$_2$F$_4$—, —CF=CF—, —CH=CH—CH$_2$O— or a single bond, preferably a single bond, $L^1$ and $L^2$ each, independently of one another, denote F, Cl, OCF$_3$, CF$_3$, CH$_3$, CH$_2$F, CHF$_2$.

Preferably, both radicals $L^1$ and $L^2$ denote F or one of the radicals $L^1$ and $L^2$ denotes F and the other denotes Cl.

The compounds of the formula LY are preferably selected from the group consisting of the following sub-formulae:

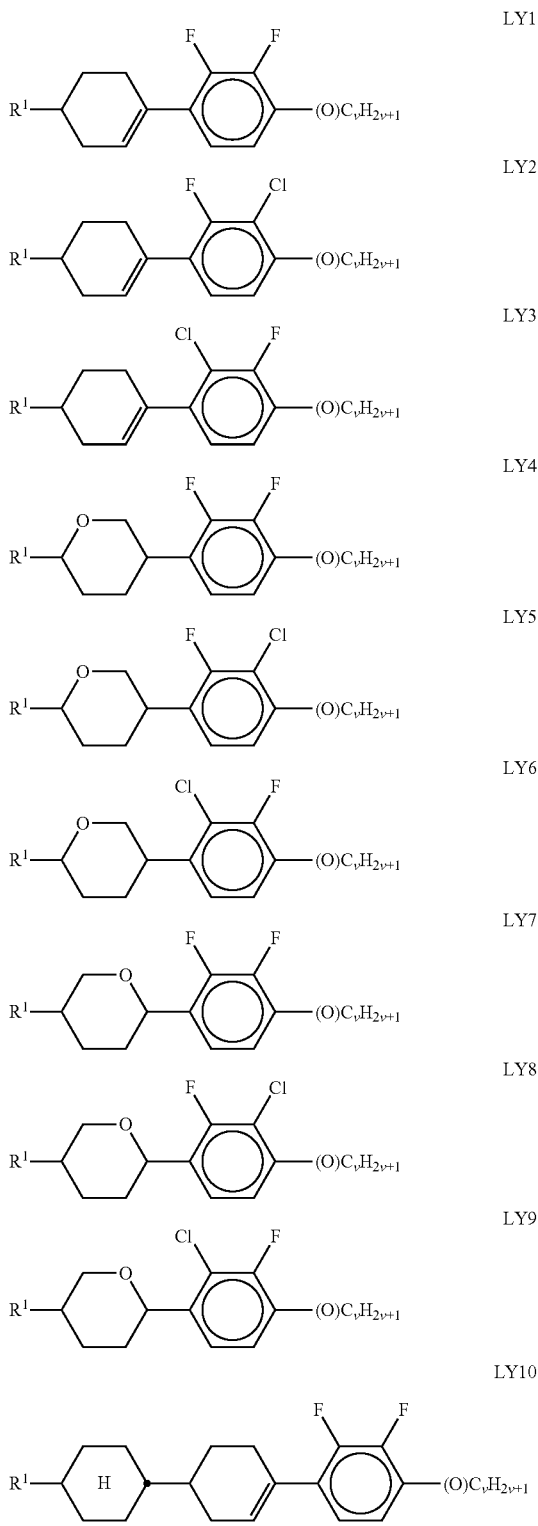

LY11
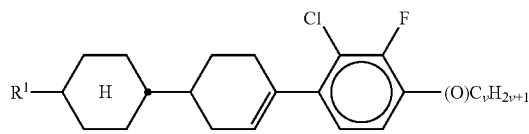

LY12
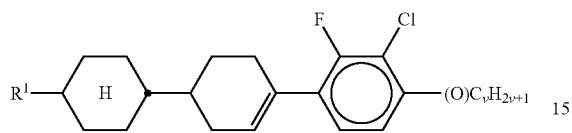

LY13
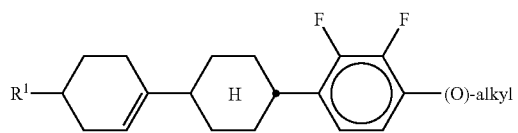

LY14
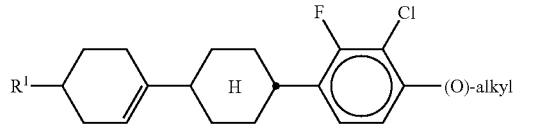

LY15
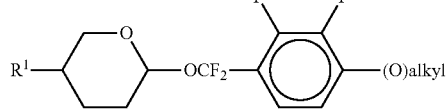

LY16
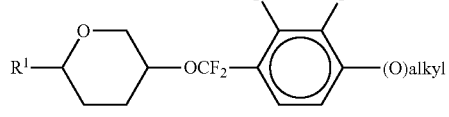

LY17
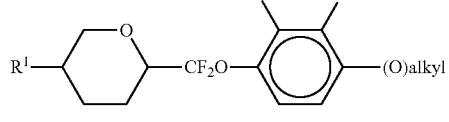

LY18
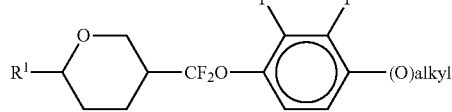

LY19
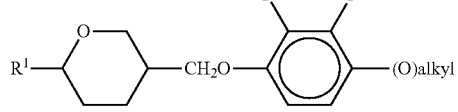

LY20
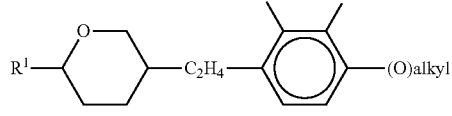

LY21
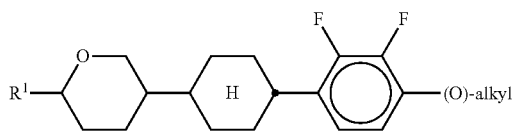

LY22

LY23

LY24 in which $R^1$ has the meaning indicated above, alkyl denotes a straight-chain alkyl radical having 1-6 C atoms, (O) denotes an oxygen atom or a single bond, and v denotes an integer from 1 to 6. $R^1$ preferably denotes straight-chain alkyl having 1 to 6 C atoms or straight-chain alkenyl having 2 to 6 C atoms, in particular $CH_3$, $C_2H_5$, n-$C_3H_7$, n-$C_4H_9$, n-$C_5H_{11}$, $CH_2$=CH—, $CH_2$=$CHCH_2CH_2$—, $CH_3$—CH=CH—, $CH_3$—$CH_2$—CH=CH—, $CH_3$—$(CH_2)_2$—CH=CH—, $CH_3$—$(CH_2)_3$—CH=CH— or $CH_3$—CH=CH—$(CH_2)_2$—.

e) LC medium which additionally comprises one or more compounds selected from the group consisting of the following formulae:

G1
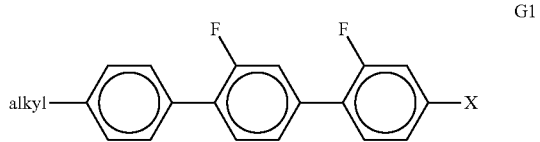

G2
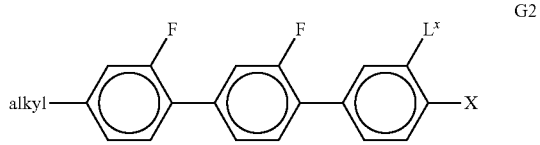

G3
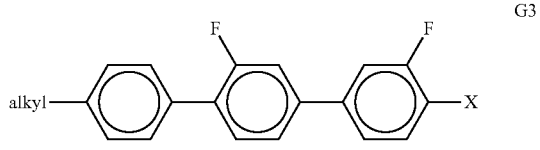

G4

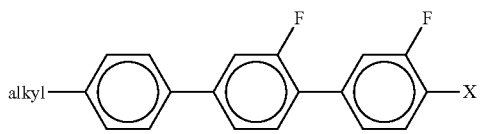

in which alkyl denotes $C_{1-6}$-alkyl, $L^x$ denotes H or F, and X denotes F, Cl, $OCF_3$, $OCHF_2$ or $OCH=CF_2$. Particular preference is given to compounds of the formula G1 in which X denotes F.

f) LC medium which additionally comprises one or more compounds selected from the group consisting of the following formulae:

Y1
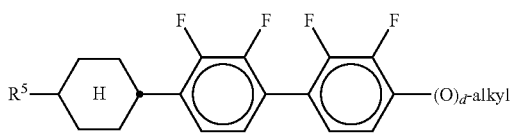

Y2
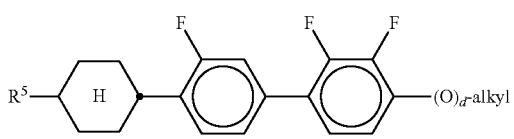

Y3
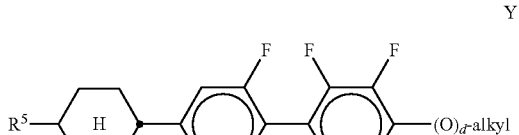

Y4
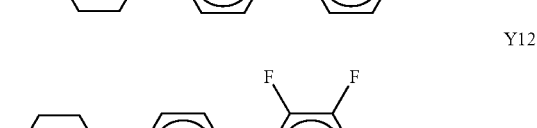

Y5
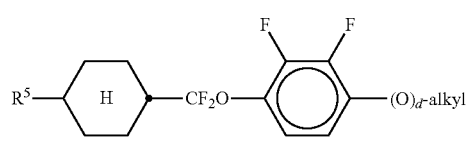

Y6
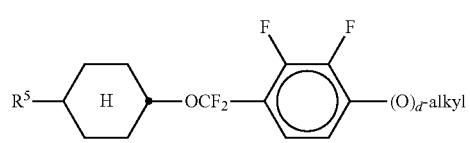

Y7
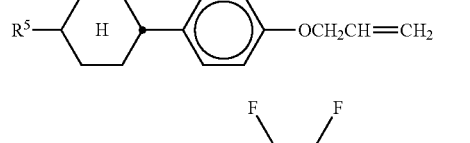

Y8
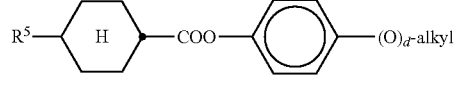

Y9
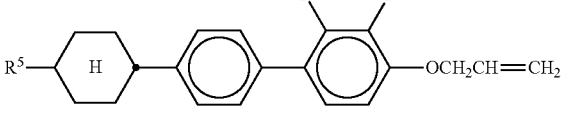

Y10
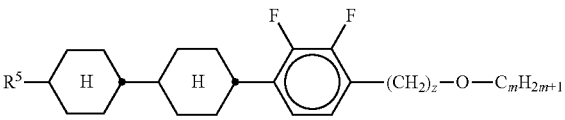

Y11
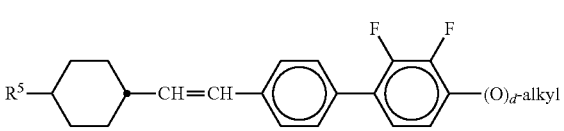

Y12

Y13
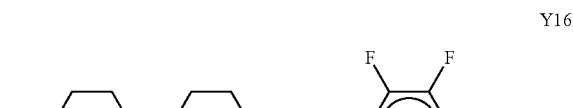

Y14
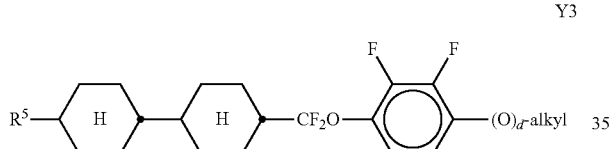

Y15

Y16
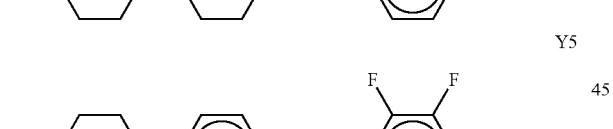

in which $R^5$ has one of the meanings indicated above for $R^1$, alkyl denotes $C_{1-6}$-alkyl, d denotes 0 or 1, and z and m each, independently of one another, denote an integer from 1 to 6. $R^5$ in these compounds is particularly preferably $C_{1-6}$-alkyl or -alkoxy or $C_{2-6}$-alkenyl, d is preferably 1. The LC medium according to the invention preferably comprises one or more compounds of the above-mentioned formulae in amounts of 5% by weight.

g) LC medium which additionally comprises one or more biphenyl compounds selected from the group consisting of the following formulae:

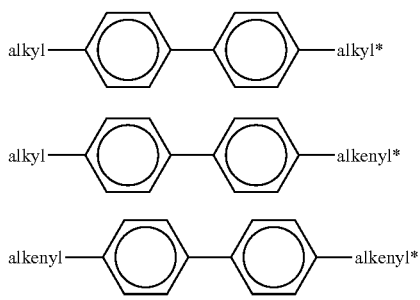

B1
B2
B3 in which alkyl and alkyl* each, independently of one another, denote a straight-chain alkyl radical having 1-6 C atoms, and alkenyl and alkenyl* each, independently of one another, denote a straight-chain alkenyl radical having 2-6 C atoms. Alkenyl and alkenyl* preferably denote $CH_2$=CH—, $CH_2$=CHCH$_2$CH$_2$—, $CH_3$—CH=CH—, $CH_3$—$CH_2$—CH=CH—, $CH_3$—$(CH_2)_2$—CH=CH—, $CH_3$—$(CH_2)_3$—CH=CH— or $CH_3$—CH=CH—$(CH_2)_2$—.

The proportion of the biphenyls of the formulae B1 to B3 in the LC mixture is preferably at least 3% by weight, in particular ≥5% by weight.

The compounds of the formula B2 are particularly preferred.

The compounds of the formulae B1 to B3 are preferably selected from the group consisting of the following sub-formulae:

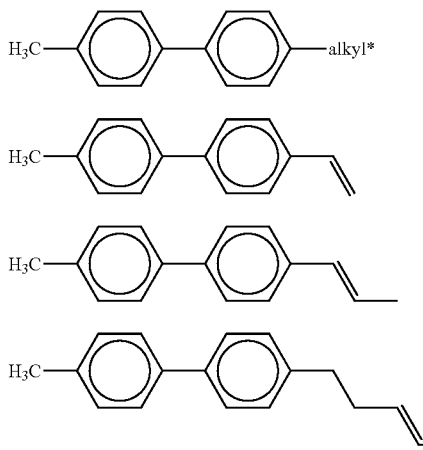

B1a
B2a
B2b
B2c in which alkyl* denotes an alkyl radical having 1-6 C atoms. The medium according to the invention particularly preferably comprises one or more compounds of the formulae B1a and/or B2c.

h) LC medium which additionally comprises one or more terphenyl compounds of the following formula:

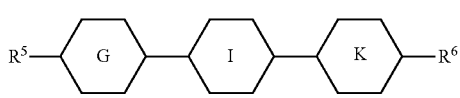

T in which $R^5$ and $R^6$ each, independently of one another, have one of the meanings indicated above for $R^1$, and

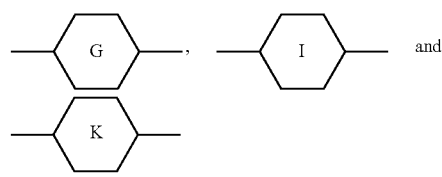

each, independently of one another, denote

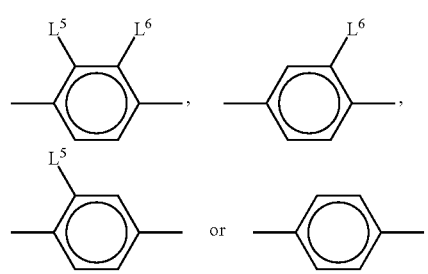

in which $L^5$ denotes F or Cl, preferably F, and $L^6$ denotes F, Cl, $OCF_3$, $CF_3$, $CH_3$, $CH_2F$ or $CHF_2$, preferably F.

The compounds of the formula T are preferably selected from the group consisting of the following sub-formulae:

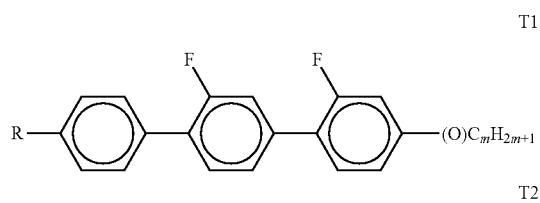

T1
T2

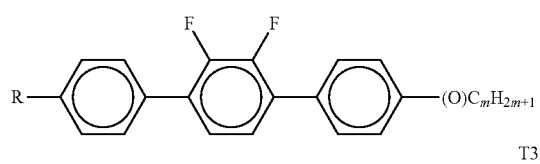

T3

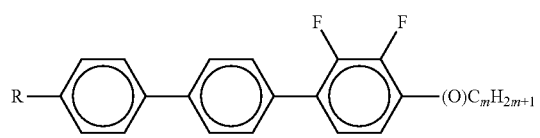

T4

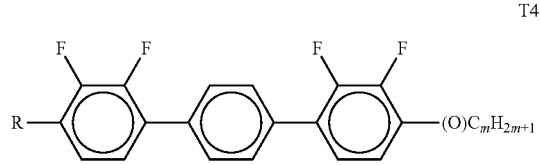

T5

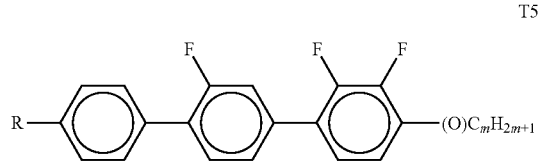

T6 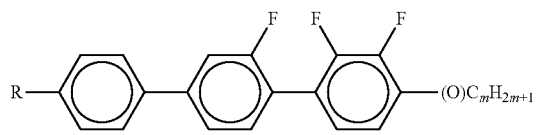
T7 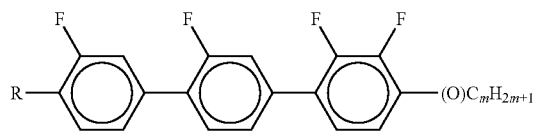
T8 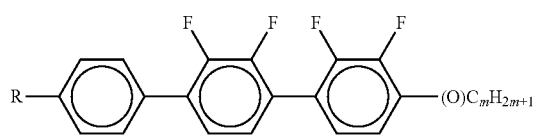
T9 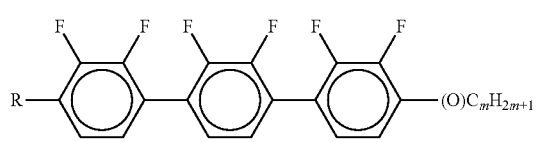
T10 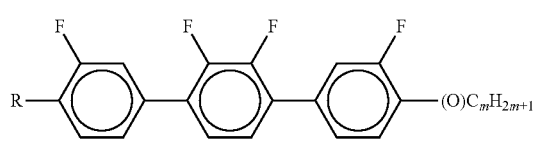
T11 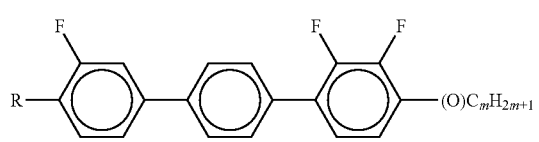
T12 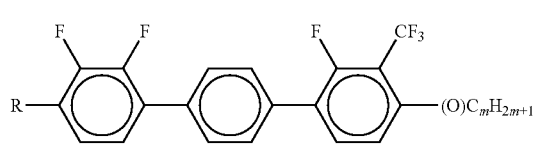
T13 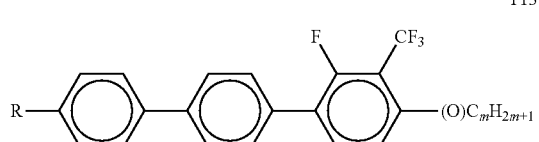
T14 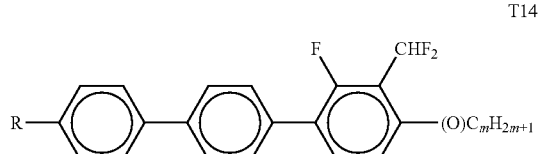
T15 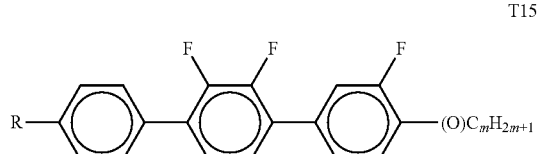
T16 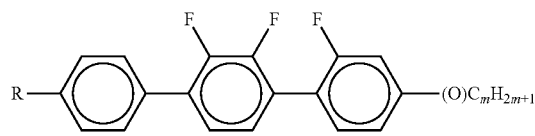
T17 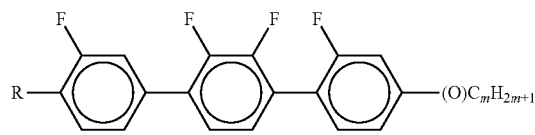
T18 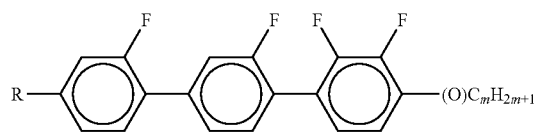
T19 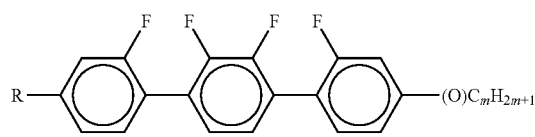
T20 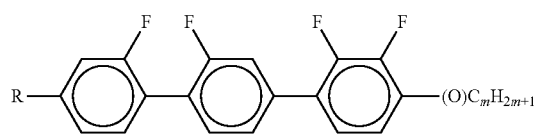
T21 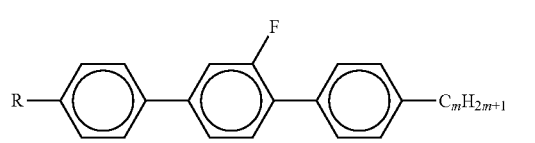
T22 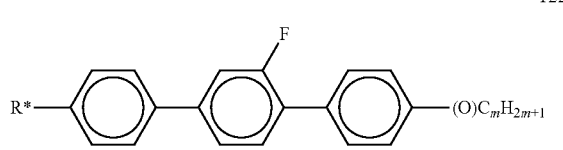
T23 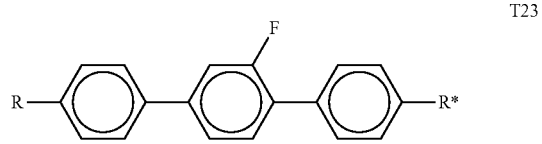
T24 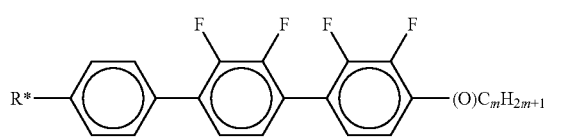
in which R denotes a straight-chain alkyl or alkoxy radical having 1-7 C atoms, R* denotes a straight-chain alkenyl radical having 2-7 C atoms, (O) denotes an oxygen atom or a single bond, and m denotes an integer from 1 to 6. R* preferably denotes $CH_2\!=\!CH-$, $CH_2\!=\!CHCH_2CH_2-$, $CH_3\!-\!CH\!=\!CH-$, $CH_3-$ CH$_2$—CH=CH—, CH$_3$—(CH$_2$)$_2$—CH=CH—, CH$_3$—(CH$_2$)$_3$—CH=CH— or CH$_3$—CH=CH—(CH$_2$)$_2$—.

R preferably denotes methyl, ethyl, propyl, butyl, pentyl, hexyl, methoxy, ethoxy, propoxy, butoxy or pentoxy.

The LC medium according to the invention preferably comprises the terphenyls of the formula T and the preferred sub-formulae thereof in an amount of 0.5-30% by weight, in particular 1-20% by weight.

Particular preference is given to compounds of the formulae T1, T2, T3 and T21. In these compounds, R preferably denotes alkyl, furthermore alkoxy, each having 1-5 C atoms.

The terphenyls are preferably employed in mixtures according to the invention if the Δn value of the mixture is to be ≥0.1. Preferred mixtures comprise 2-20% by weight of one or more terphenyl compounds of the formula T, preferably selected from the group of compounds T1 to T22.

i) LC medium which additionally comprises one or more compounds selected from the group consisting of the following formulae:

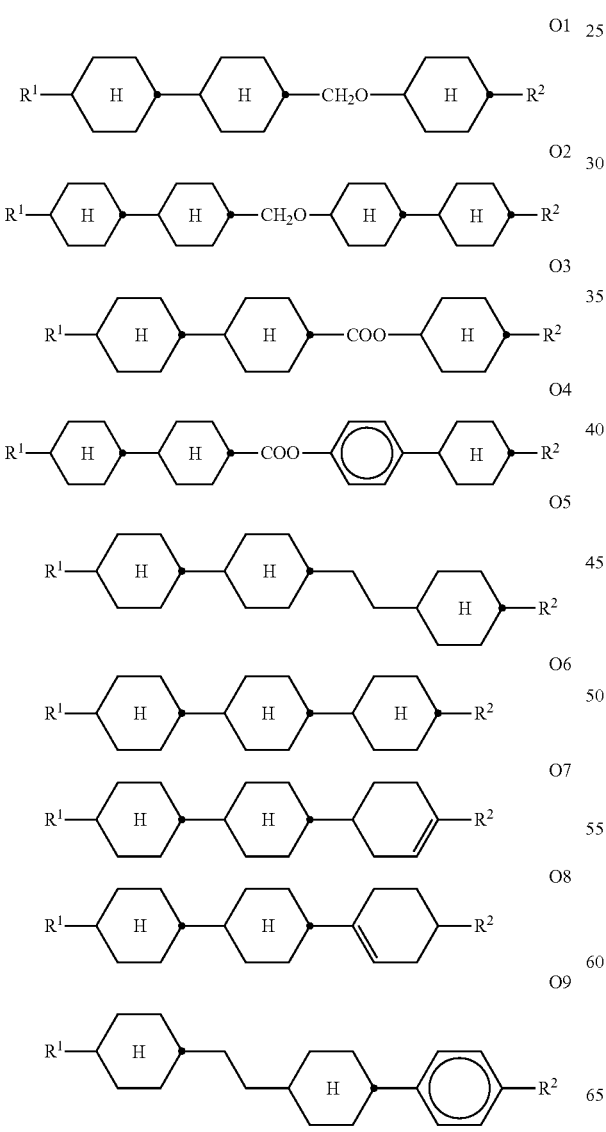

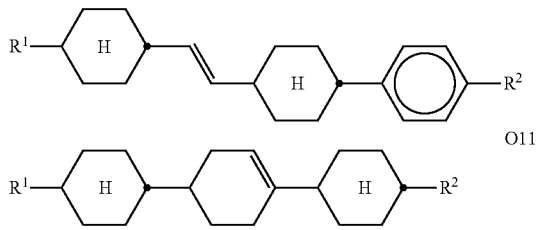

in which R$^1$ and R$^2$ have the meanings indicated above and preferably each, independently of one another, denote straight-chain alkyl having 1 to 6 C atoms or straight-chain alkenyl having 2 to 6 C atoms.

Preferred media comprise one or more compounds selected from the formulae O1, O3 and O4.

k) LC medium which additionally comprises one or more compounds of the following formula:

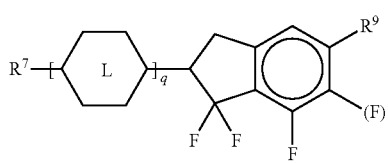

in which

denotes

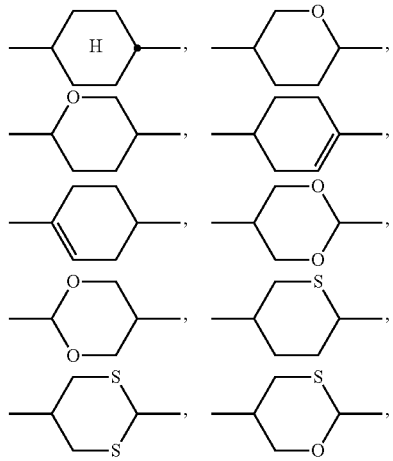

R$^9$ denotes H, CH$_3$, C$_2$H$_5$ or n-C$_3$H$_7$, (F) denotes an optional fluorine substituent, and q denotes 1, 2 or 3, and R$^7$ has one of the meanings indicated for R$^1$, preferably in amounts of >3% by weight, in particular 5% by weight and very particularly preferably 5-30% by weight.

Particularly preferred compounds of the formula FI are selected from the group consisting of the following sub-formulae:

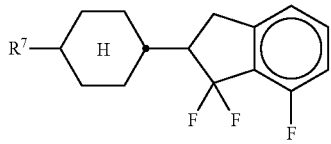
FI1

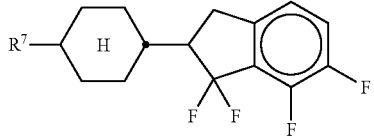
FI2

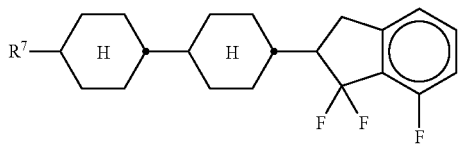
FI3

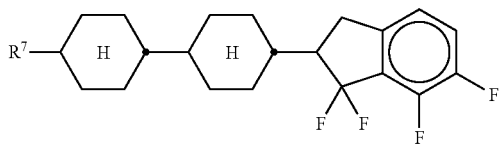
FI4

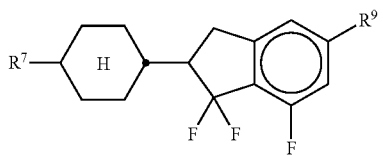
FI5

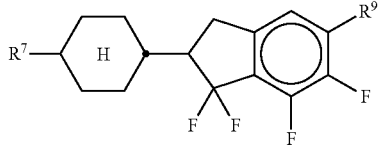
FI6

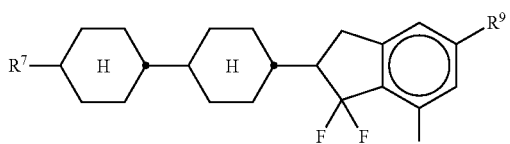
FI7

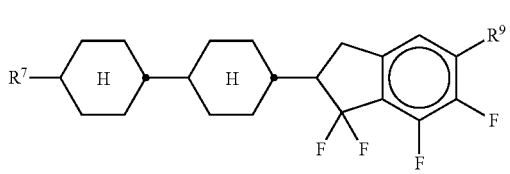
FI8 in which $R^7$ preferably denotes straight-chain alkyl, and $R^9$ denotes $CH_3$, $C_2H_5$ or $n\text{-}C_3H_7$. Particular preference is given to the compounds of the formulae FI1, FI2 and FI3.

l) LC medium which additionally comprises one or more compounds selected from the group consisting of the following formulae:

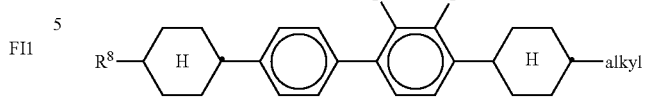
VK1

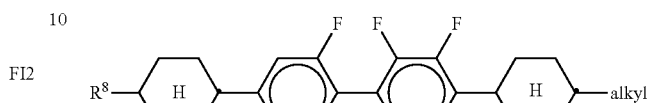
VK2

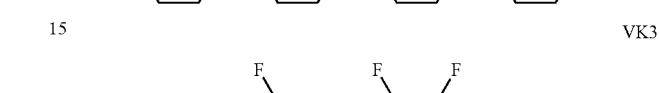
VK3

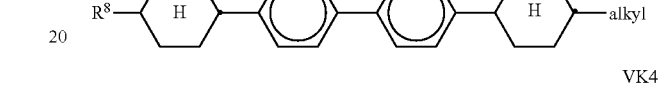
VK4 in which $R^8$ has the meaning indicated for $R^1$, and alkyl denotes a straight-chain alkyl radical having 1-6 C atoms.

m) LC medium which additionally comprises one or more compounds which contain a tetrahydronaphthyl or naphthyl unit, such as, for example, the compounds selected from the group consisting of the following formulae:

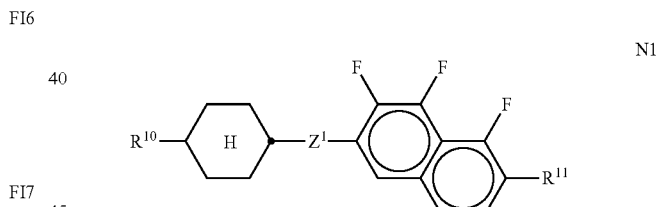
N1

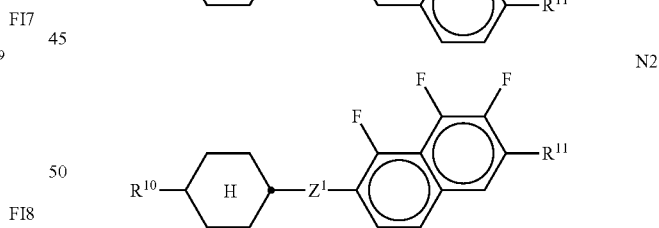
N2

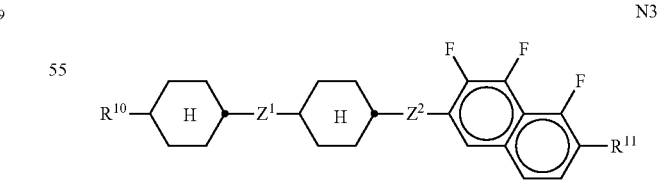
N3

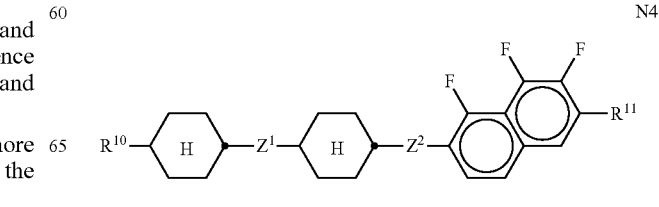
N4

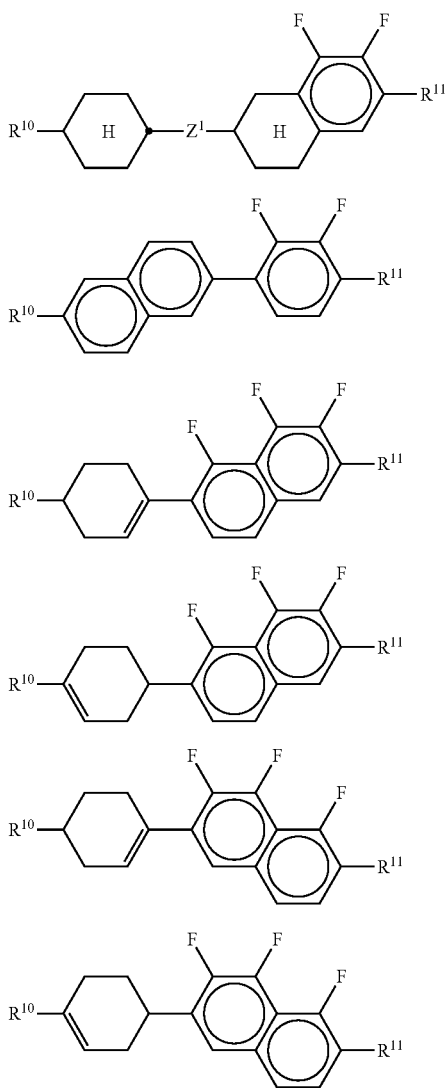

in which $R^{10}$ and $R^{11}$ each, independently of one another, have one of the meanings indicated for $R^1$, preferably denote straight-chain alkyl or alkoxy having 1 to 6 C atoms or straight-chain alkenyl having 2 to 6 C atoms, and $Z^1$ and $Z^2$ each, independently of one another, denote —$C_2H_4$—, —CH=CH—, —$(CH_2)_4$—, —$(CH_2)_3O$—, —$O(CH_2)_3$—, —CH=CH—$CH_2CH_2$—, —$CH_2CH_2$CH=CH—, —$CH_2O$—, —$OCH_2$—, —CO—O—, —O—CO—, —$C_2F_4$—, —CF=CF—, —CF=CH—, —CH=CF—, —$CH_2$— or a single bond.

n) LC medium which additionally comprises one or more difluorodibenzo-chromans and/or chromans of the following formulae:

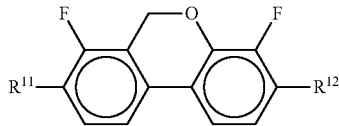

BC

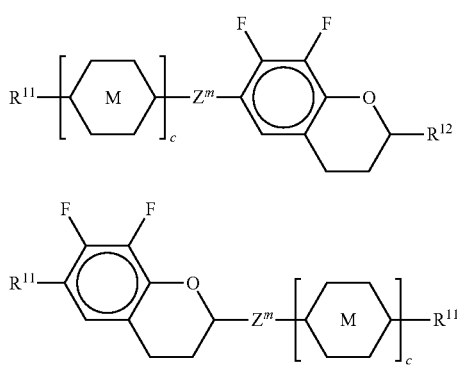

in which
$R^{11}$ and $R^{12}$ each, independently of one another, have the meanings indicated above,
ring M is trans-1,4-cyclohexylene or 1,4-phenylene,
$Z^m$ —$C_2H_4$—, —$CH_2O$—, —$OCH_2$—, —CO—O— or —O—CO—,
c is 0 or 1,
preferably in amounts of 3 to 20% by weight, in particular in amounts of 3 to 15% by weight.

Particularly preferred compounds of the formulae BC, CR and RC are selected from the group consisting of the following sub-formulae:

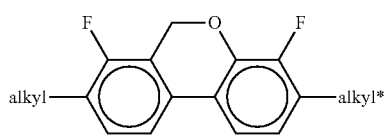

BC1

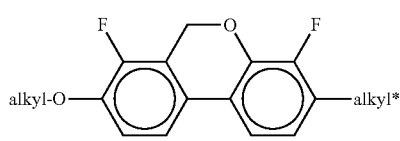

BC2

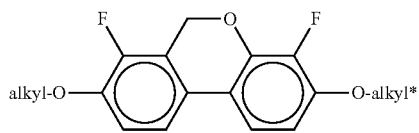

BC3

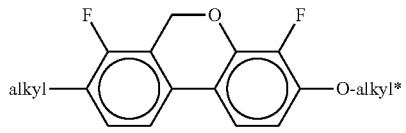

BC4

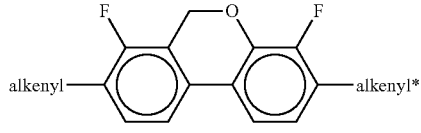

BC5

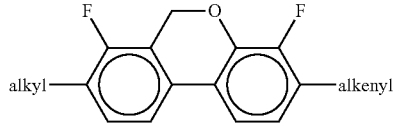

BC6

-continued

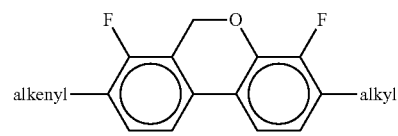
BC7

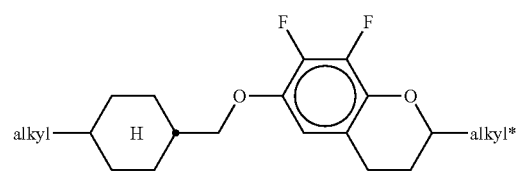
CR1

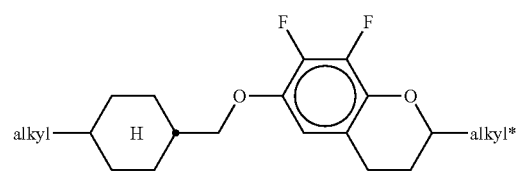
CR2

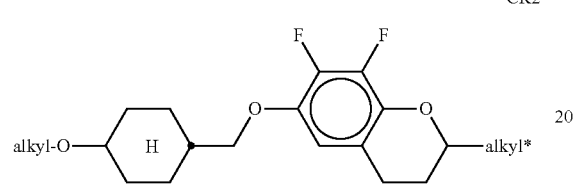
CR3

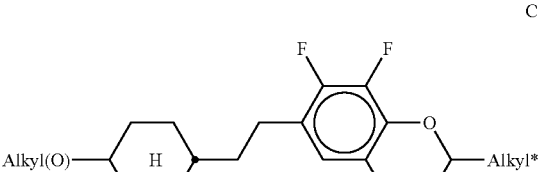
CR4

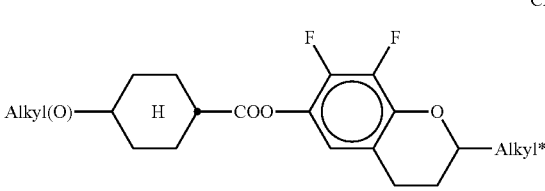
CR5

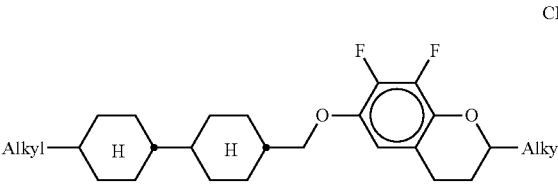
CR6

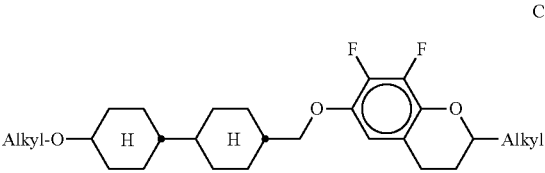
CR7

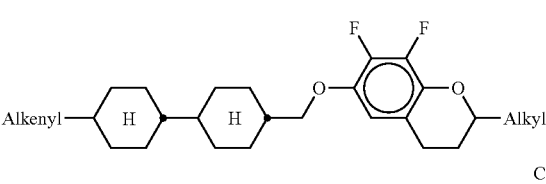
CR8

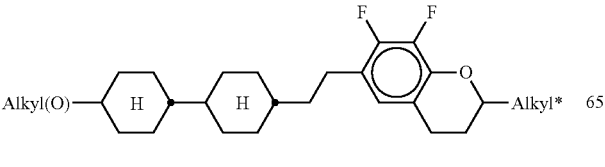
CR9

-continued

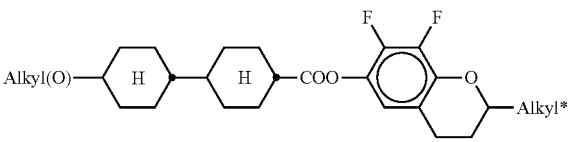
RC1

RC2

RC3 in which alkyl and alkyl* each, independently of one another, denote a straight-chain alkyl radical having 1-6 C atoms, (O) denotes an oxygen atom or a single bond, c is 1 or 2, and alkenyl and alkenyl* each, independently of one another, denote a straight-chain alkenyl radical having 2-6 C atoms. Alkenyl and alkenyl* preferably denote $CH_2=CH-$, $CH_2=CHCH_2CH_2-$, $CH_3-CH=CH-$, $CH_3-CH_2-CH=CH-$, $CH_3-(CH_2)_2-CH=CH-$, $CH_3-(CH_2)_3-CH=CH-$ or $CH_3-CH=CH-(CH_2)_2-$.

Very particular preference is given to mixtures comprising one, two or three compounds of the formula BC-2.

o) LC medium which additionally comprises one or more fluorinated phenanthrenes and/or dibenzofurans of the following formulae:

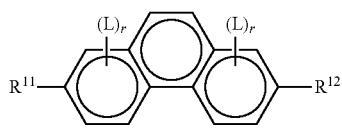
PH

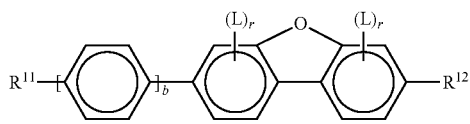
BF in which $R^{11}$ and $R^{12}$ each, independently of one another, have the meanings indicated above, b denotes 0 or 1, L denotes F, and r denotes 1, 2 or 3.

Particularly preferred compounds of the formulae PH and BF are selected from the group consisting of the following sub-formulae:

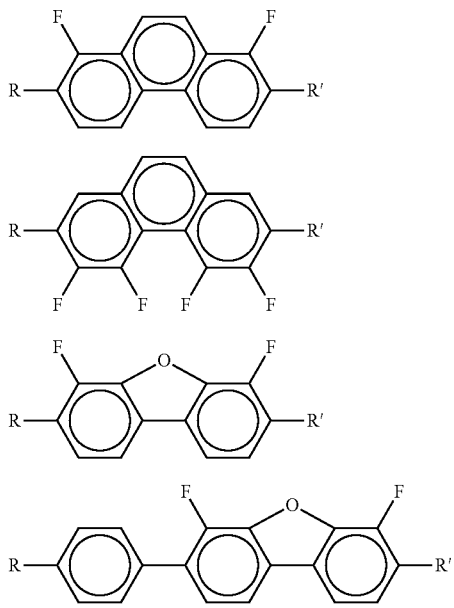

in which R and R' each, independently of one another, denote a straight-chain alkyl or alkoxy radical having 1-7 C atoms.

p) LC medium which additionally comprises one or more monocyclic compounds of the following formula

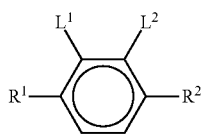

wherein
R$^1$ and R$^2$ each, independently of one another, denote alkyl having 1 to 12 C atoms, where, in addition, one or two non-adjacent CH$_2$ groups may be replaced by —O—, —CH=CH—, —CO—, —OCO— or —COO— in such a way that O atoms are not linked directly to one another, preferably alkyl or alkoxy having 1 to 6 C atoms,
L$^1$ and L$^2$ each, independently of one another, denote F, Cl, OCF$_3$, CF$_3$, CH$_3$, CH$_2$F, CHF$_2$.
Preferably, both L$^1$ and L$^2$ denote F or one of L$^1$ and L$^2$ denotes F and the other denotes Cl,
The compounds of the formula Y are preferably selected from the group consisting of the following sub-formulae:

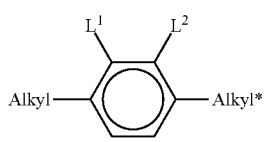

Y1

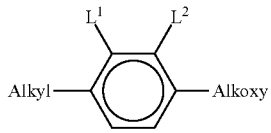

Y2

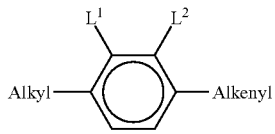

Y3

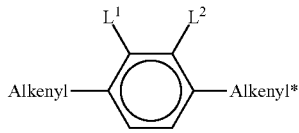

Y4

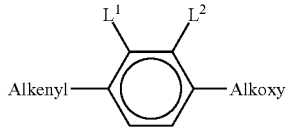

Y5

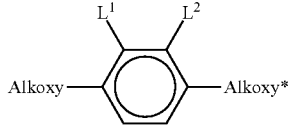

Y6

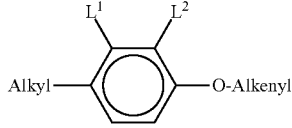

Y7

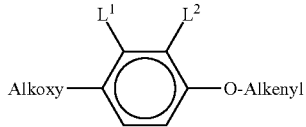

Y8

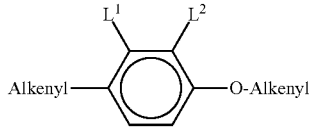

Y9

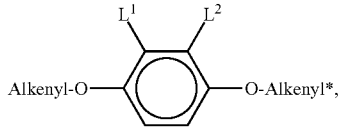

Y10 in which, Alkyl and Alkyl* each, independently of one another, denote a straight-chain alkyl radical having 1-6 C atoms, Alkoxy denotes a straight-chain alkoxy radical having 1-6 C atoms, Alkenyl and Alkenyl* each, independently of one another, denote a straight-chain alkenyl radical having 2-6 C atoms, and O denotes an oxygen atom or a single bond. Alkenyl and Alkenyl* preferably denote CH$_2$=CH—, CH$_2$=CHCH$_2$CH$_2$—, CH$_3$—CH=CH—, CH$_3$—CH$_2$—CH=CH—, CH$_3$—(CH$_2$)$_2$—CH=CH—, CH$_3$—(CH$_2$)$_3$—CH=CH— or CH$_3$—CH=CH—(CH$_2$)$_2$—.
Particularly preferred compounds of the formula Y are selected from the group consisting of the following sub-formulae:

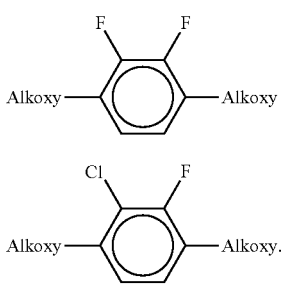

wherein Alkoxy preferably denotes straight-chain alkoxy with 3, 4, or 5 C atoms.

q) LC medium which, apart from the polymerisable compounds according to the invention, in particular of the formula I or sub-formulae thereof and the comonomers, comprises no compounds which contain a terminal vinyloxy group (—O—CH=CH$_2$).

r) LC medium which comprises 1 to 5, preferably 1, 2 or 3, polymerisable compounds, preferably selected from polymerisable compounds according to the invention, in particular of the formula I or sub-formulae thereof.

s) LC medium in which the proportion of polymerisable compounds, in particular of the formula I or sub-formulae thereof, in the mixture as a whole is 0.05 to 5%, preferably 0.1 to 1%.

t) LC medium which comprises 1 to 8, preferably 1 to 5, compounds of the formulae CY1, CY2, PY1 and/or PY2. The proportion of these compounds in the mixture as a whole is preferably 5 to 60%, particularly preferably 10 to 35%. The content of these individual compounds is preferably in each case 2 to 20%.

u) LC medium which comprises 1 to 8, preferably 1 to 5, compounds of the formulae CY9, CY10, PY9 and/or PY10. The proportion of these compounds in the mixture as a whole is preferably 5 to 60%, particularly preferably 10 to 35%. The content of these individual compounds is preferably in each case 2 to 20%.

v) LC medium which comprises 1 to 10, preferably 1 to 8, compounds of the formula ZK, in particular compounds of the formulae ZK1, ZK2 and/or ZK6. The proportion of these compounds in the mixture as a whole is preferably 3 to 25%, particularly preferably 5 to 45%. The content of these individual compounds is preferably in each case 2 to 20%.

w) LC medium in which the proportion of compounds of the formulae CY, PY and ZK in the mixture as a whole is greater than 70%, preferably greater than 80%.

x) LC medium in which the LC host mixture contains one or more compounds containing an alkenyl group, preferably selected from the group consisting of formula CY, PY and LY, wherein one or both of R$^1$ and R$^2$ denote straight-chain alkenyl having 2-6 C atoms, formula ZK and DK, wherein one or both of, R$^3$ and R$^4$ denote straight-chain alkenyl having 2-6 C atoms, and formula B2 and B3, very preferably selected from formulae CY15, CY16, CY34, CY32, PY15, PY16, ZK3, ZK4, DK3, DK6, B2 and B3, most preferably selected from formulae ZK3, ZK4, B2 and B3. The concentration of these compounds in the LC host mixture is preferably from 2 to 70%, very preferably from 3 to 55%.

y) LC medium which contains one or more, preferably 1 to 5, compounds selected of formula PY1-PY8, very preferably of formula PY2. The proportion of these compounds in the mixture as a whole is preferably 1 to 30%, particularly preferably 2 to 20%. The content of these individual compounds is preferably in each case 1 to 20%.

z) LC medium which contains one or more, preferably 1, 2 or 3, compounds of formula T2. The content of these compounds in the mixture as a whole is preferably 1 to 20%.

In a second preferred embodiment the LC medium contains an LC host mixture based on compounds with positive dielectric anisotropy. Such LC media are especially suitable for use in PSA-OCB-, PSA-TN-, PSA-Posi-VA-, PSA-IPS- or PSA-FFS-displays.

Particularly preferred is an LC medium of this second preferred embodiment, which contains one or more compounds selected from the group consisting of compounds of formula AA and BB

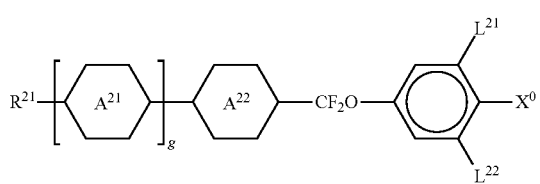

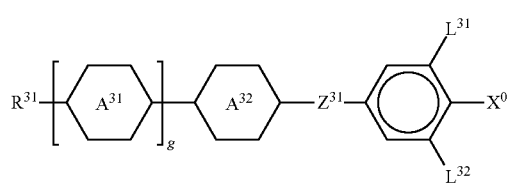

and optionally contains, in addition to the compounds of formula AA and/or BB, one or more compounds of formula CC

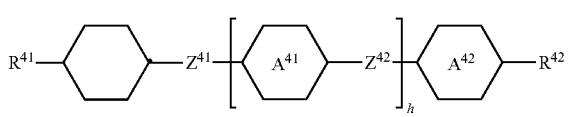

in which the individual radicals have the following meanings:

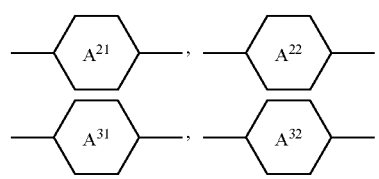

each, independently of one another, and on each occurrence, identically or differently

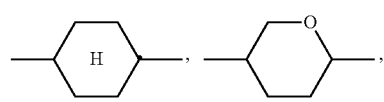

-continued

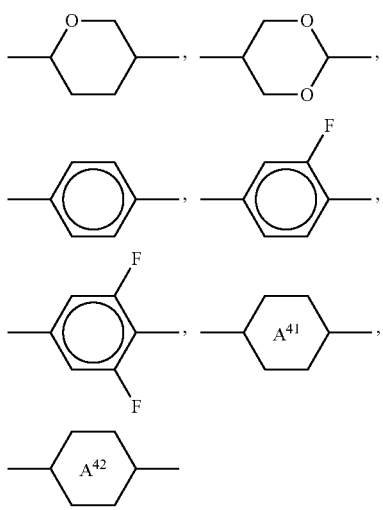

each, independently of one another, and on each occurrence, identically or differently

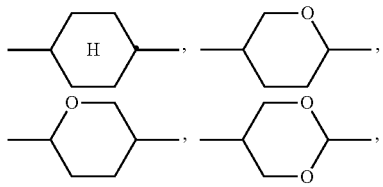

-continued

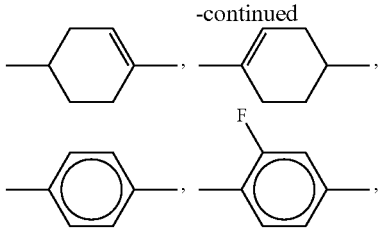

$R^{21}$, $R^{31}$, $R^{41}$, $R^{42}$ each, independently of one another, alkyl, alkoxy, oxaalkyl or fluoroalkyl having 1 to 9 C atoms or alkenyl having 2 to 9 C atoms, $X^0$ F, Cl, halogenated alkyl or alkoxy having 1 to 6 C atoms or halogenated alkenyl or alkenyloxy having 2 to 6 C atoms, $Z^{31}$ —$CH_2CH_2$—, —$CF_2CF_2$—, —COO—, trans-CH=CH—, trans-CF=CF, —$CH_2O$— or a single bond, preferably —$CH_2CH_2$—, —COO—, trans-CH=CH— or a single bond, particularly preferably —COO—, trans-CH=CH— or a single bond, $Z^{41}$, $Z^{42}$, —$CH_2CH_2$—, —COO—, trans-CH=CH—, trans-CF=CF—, —$CH_2O$, —$CF_2O$—, —C≡C— or a single bond, preferably a single bond, $L^{21}$, $L^{22}$, $L^{31}$, $L^{32}$ H or F, g 1, 2 or 3, h 0, 1, 2 or 3.

$X^0$ is preferably F, Cl, $CF_3$, $CHF_2$, $OCF_3$, $OCHF_2$, OCFHCF_3, OCFHCHF_2, OCFHCHF_2, $OCF_2CH_3$, $OCF_2CHF_2$, $OCF_2CHF_2$, $OCF_2CF_2CHF_2$, $OCF_2CF_2CHF_2$, OCFHCF_2CF_3, OCFHCF_2CHF_2, $OCF_2CF_2CF_3$, $OCF_2CF_2CClF_2$, $OCClFCF_2CF_3$ or CH=CF_2, very preferably F or $OCF_3$ The compounds of formula AA are preferably selected from the group consisting of the following formulae:

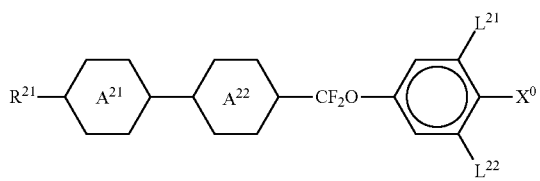

AA1

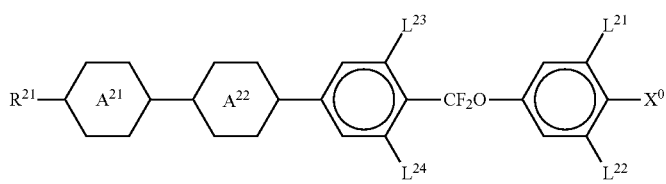

AA2

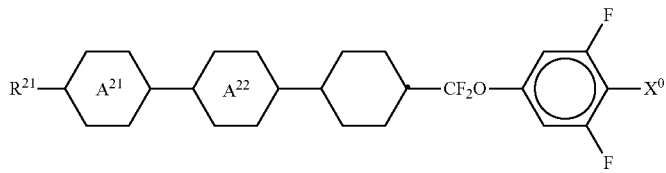

AA3

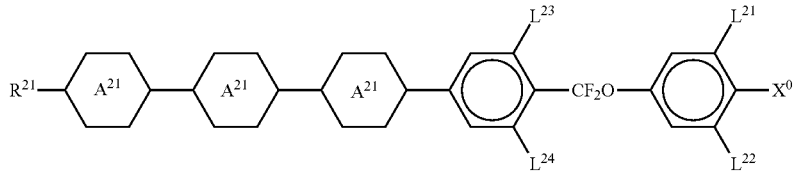

AA4 in which $A^{21}$, $R^{21}$, $X^0$, $L^{21}$ and $L^{22}$ have the meanings given in formula AA, $L^{23}$ and $L^{24}$ each, independently of one another, are H or F, and $X^0$ is preferably F. Particularly preferred are compounds of formulae AA1 and AA2.

Particularly preferred compounds of formula AA1 are selected from the group consisting of the following subformulae:

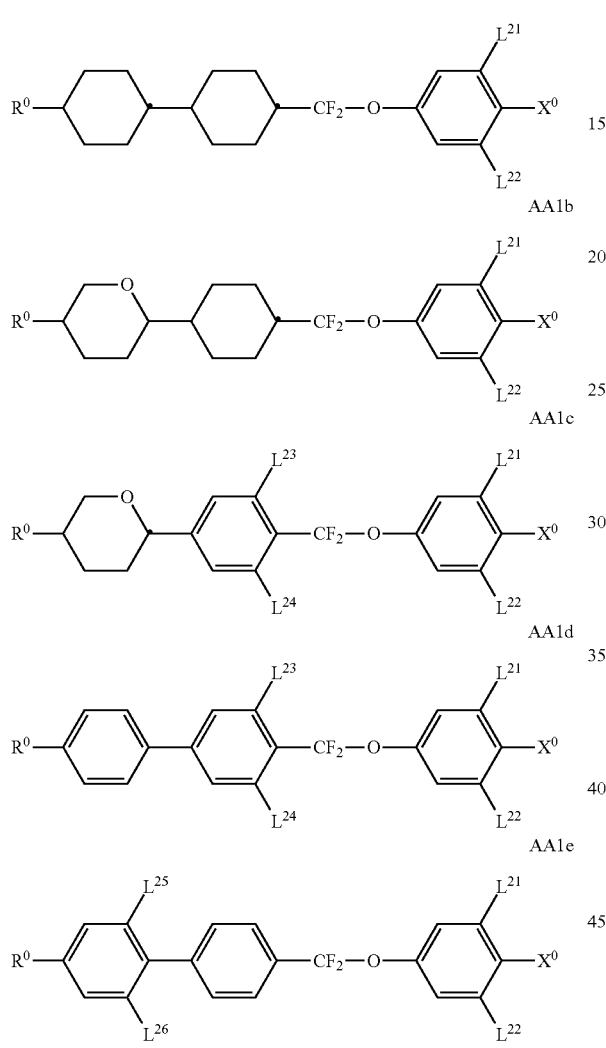

in which $R^0$ has one of the meanings given for $R^{21}$ in formula AA1, $X^0$, $L^{21}$ and $L^{22}$ have the meaning given in formula AA1, $L^{23}$, $L^{24}$, $L^{25}$ and $L^{26}$ are each, independently of one another, H or F, and $X^0$ is preferably F.

Very particularly preferred compounds of formula AA1 are selected from the group consisting of the following subformulae:

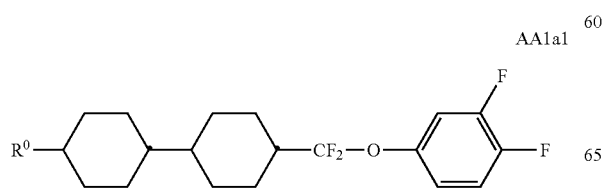

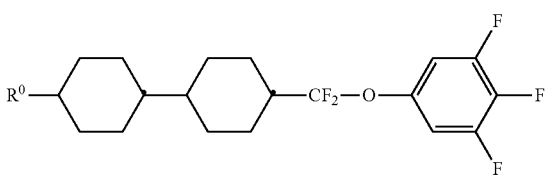

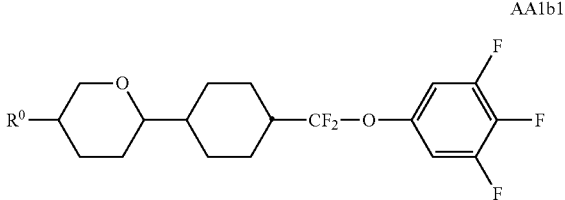

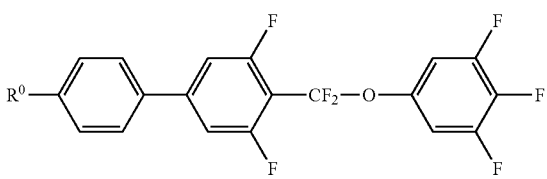

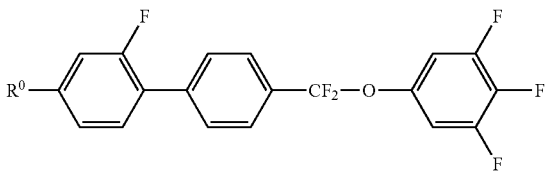

In which $R^0$ has the meaning given for $R^{21}$ in formula AA1.

Very preferred compounds of formula AA2 are selected from the group consisting of the following subformulae:

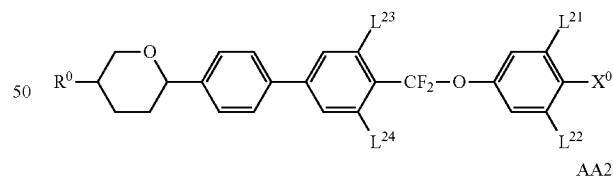

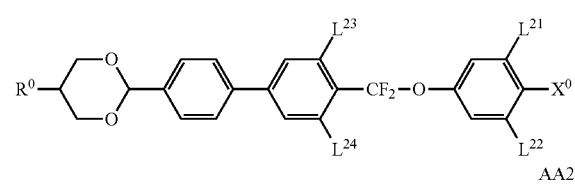

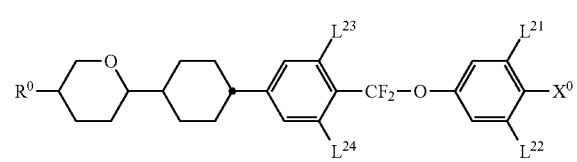

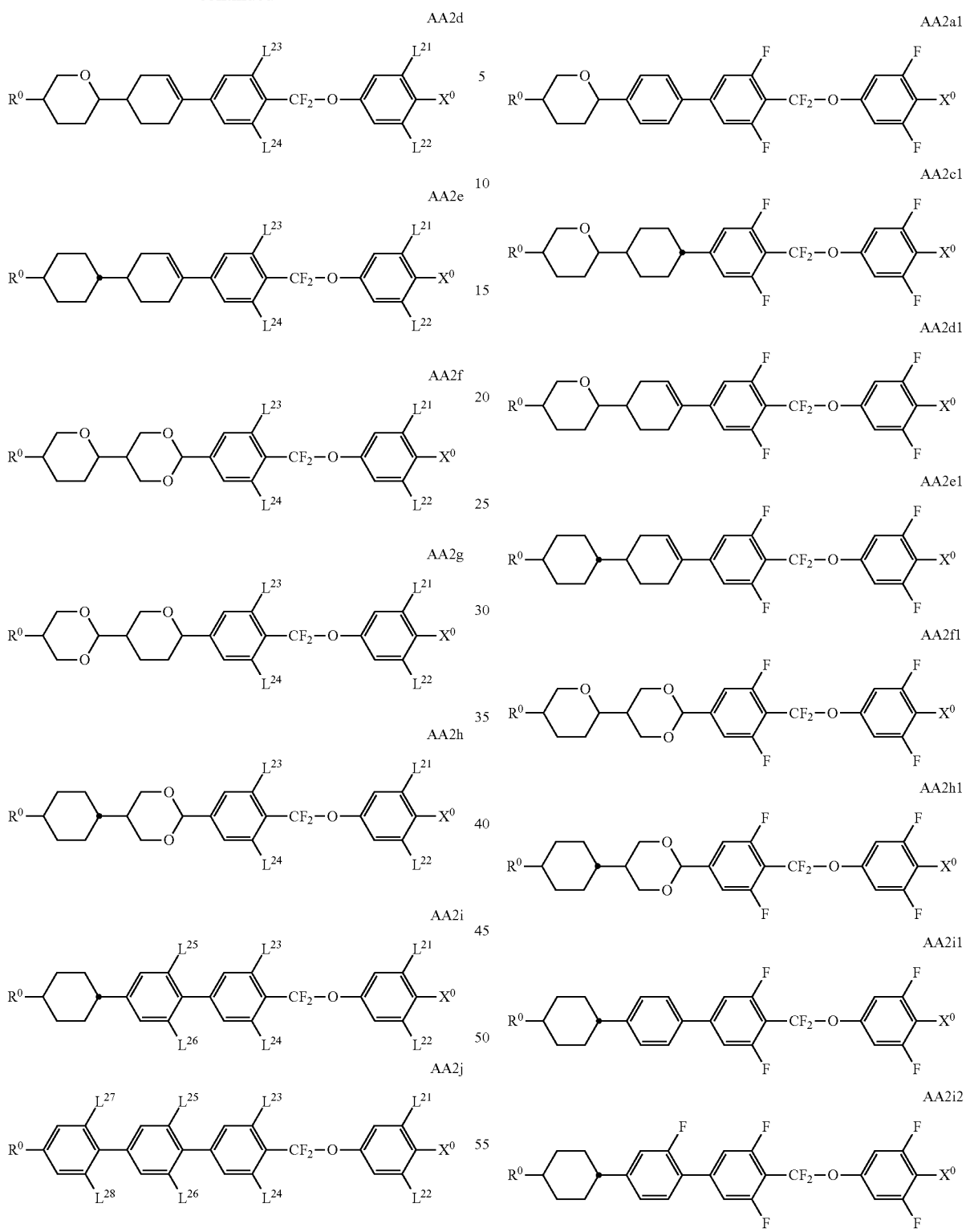
in which R⁰ has the meaning given for $R^{21}$ in formula AA1, $X^0$, $L^{21}$ and $L^{22}$ have the meaning given in formula AA, $L^{23}$, $L^{24}$, $L^{25}$ and $L^{26}$ each, independently of one another, are H or F, and $X^0$ is preferably F.
Very particularly preferred compounds of formula AA2 are selected from the group consisting of the following subformulae:

AA2j2

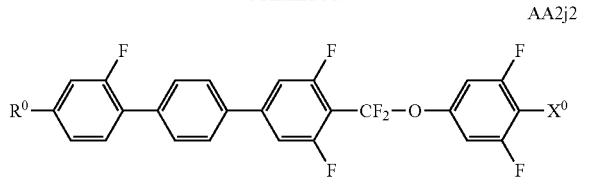

in which R⁰ has the meaning given for $R^{21}$ in formula AA1.

Particularly preferred compounds of formula AA3 are selected from the group consisting of the following subformulae:

AA3a

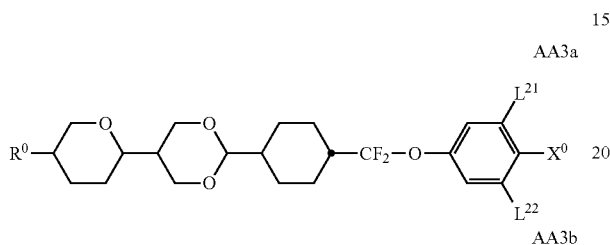

AA3b

AA3c in which R⁰ has the meaning given for $R^{21}$ in formula AA1, $X^0$, $L^{21}$ and $L^{22}$ have the meaning given in formula AA3, and $X^0$ is preferably F.

Particularly preferred compounds of formula AA4 are selected from the group consisting of the following subformulae:

AA4a

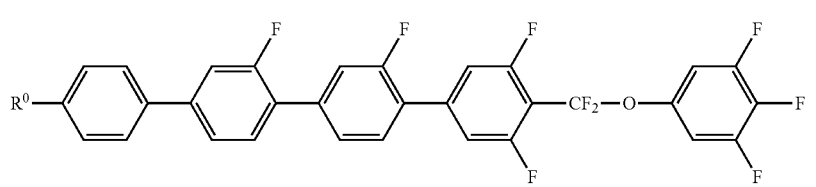

in which R⁰ has the meaning given for $R^{21}$ in formula AA1.

The compounds of formula BB are preferably selected from the group consisting of the following formulae:

BB1

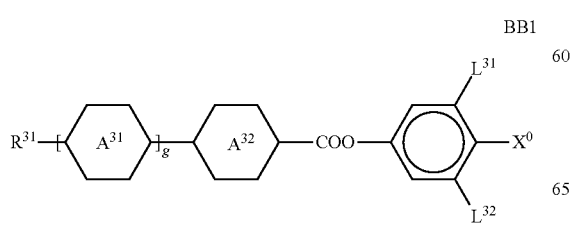

BB2

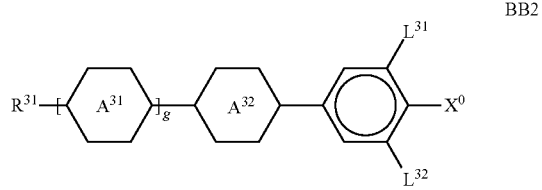

BB3

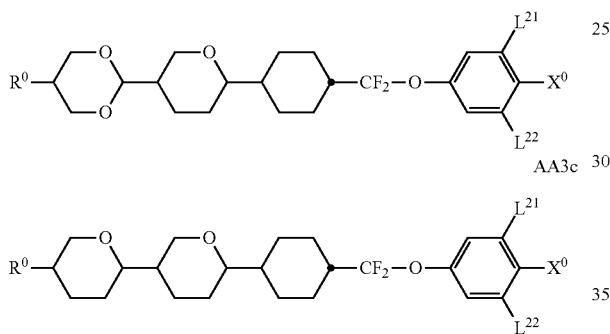

in which $A^{31}$, $A^{32}$, $R^{31}$, $X^0$, $L^{31}$ and $L^{32}$ have the meanings given in formula BB, and $X^0$ is preferably F. Particularly preferred are compounds of formulae BB1 and BB2.

Particularly preferred compounds of formula BB1 are selected from the group consisting of the following subformulae:

BB1a

-continued

BB1b

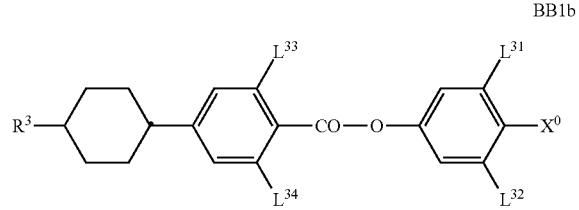

in which R³ has the meaning given for R³¹ in formula BB1, X⁰, L³¹ and L³² have the meaning given in formula BB1, and X⁰ is preferably F.

Very particularly preferred compounds of formula BB1a are selected from the group consisting of the following subformulae:

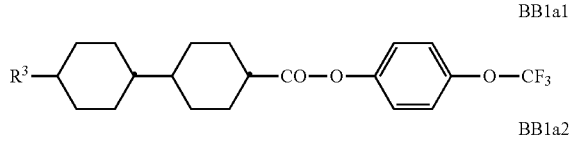
BB1a1

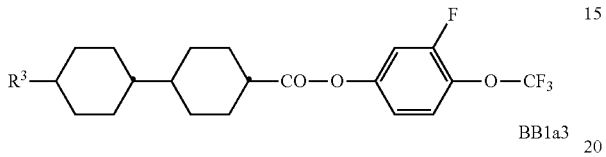
BB1a2

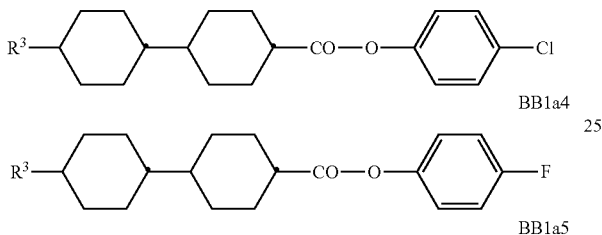
BB1a3

BB1a4

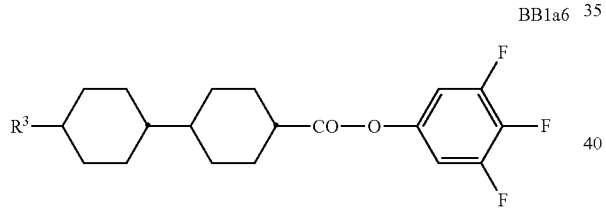
BB1a5

BB1a6

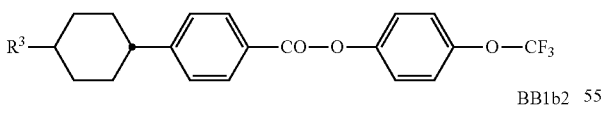

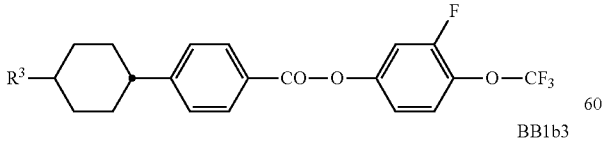

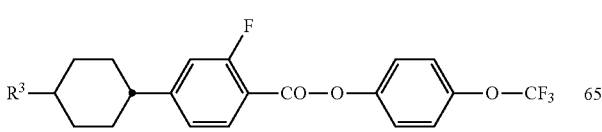

in which R³ has the meaning given for R³¹ in formula BB1.

Very particularly preferred compounds of formula BB1b are selected from the group consisting of the following subformulae:

BB1b1

BB1b2

BB1b3

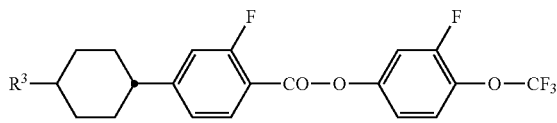
BB1b4 in which R³ has the meaning given for R³¹ in formula BB1.

Particularly preferred compounds of formula BB2 are selected from the group consisting of the following subformulae:

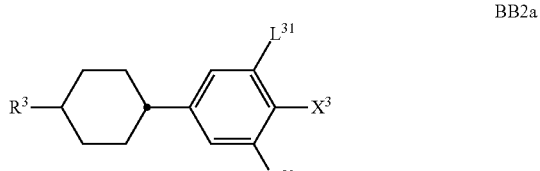
BB2a

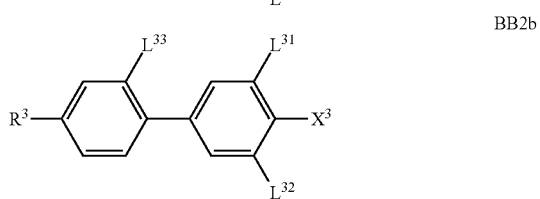
BB2b

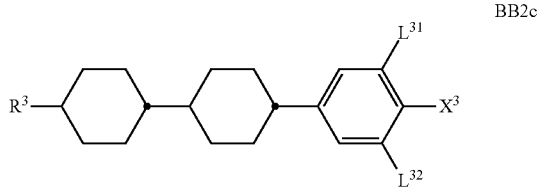
BB2c

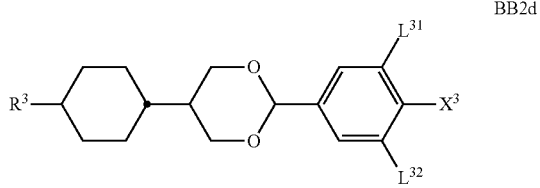
BB2d

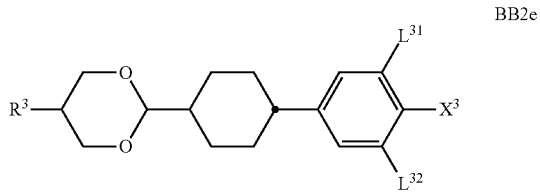
BB2e

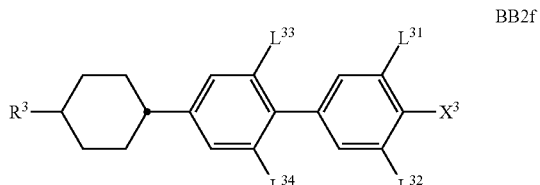
BB2f

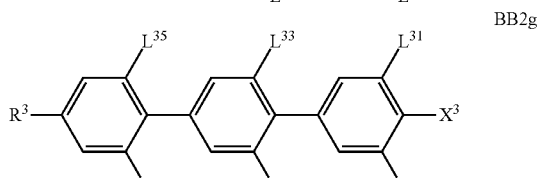
BB2g

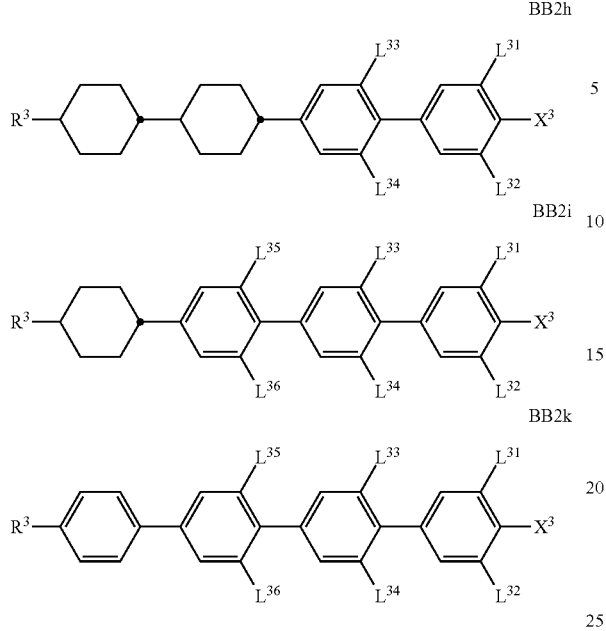

in which R⁰ has one of the meanings given for $R^{21}$ in formula BB2, $X^0$, $L^{31}$ and $L^{32}$ have the meaning given in formula BB2, $L^{33}$, $L^{34}$, $L^{35}$ and $L^{36}$ are each, independently of one another, H or F, and $X^0$ is preferably F.

Very particularly preferred compounds of formula BB2 are selected from the group consisting of the following subformulae:

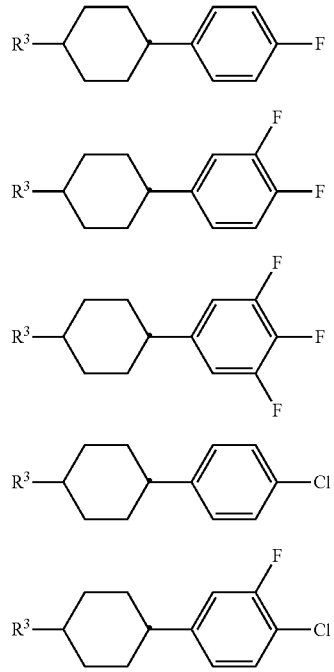

in which $R^3$ has the meaning given for $R^{31}$ in formula BB2.

Very particularly preferred compounds of formula BB2b are selected from the group consisting of the following subformulae

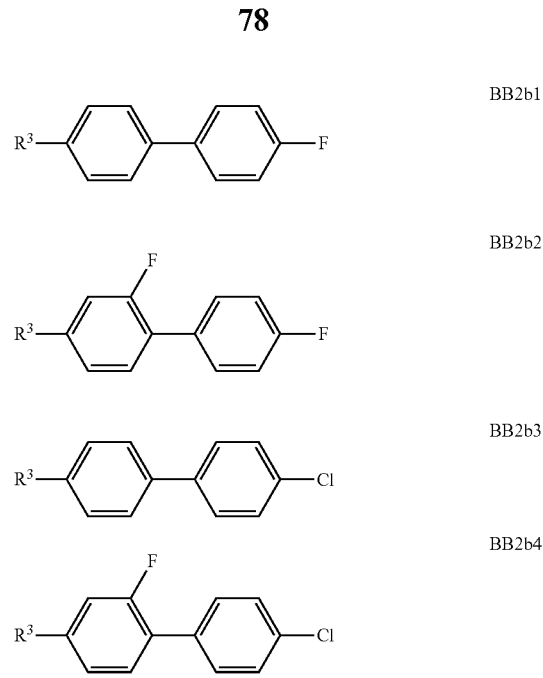

in which $R^3$ has the meaning given for $R^{31}$ in formula BB2.

Very particularly preferred compounds of formula BB2c are selected from the group consisting of the following subformulae:

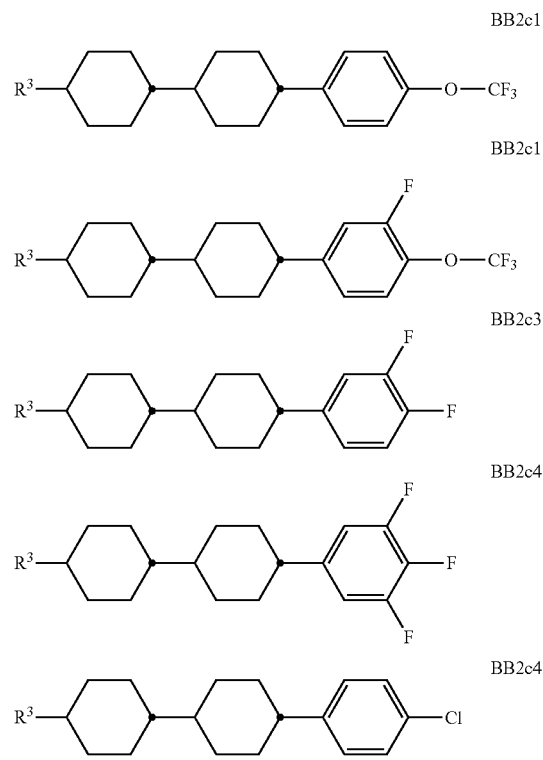

in which $R^3$ has the meaning given for $R^{31}$ in formula BB2.

Very particularly preferred compounds of formula BB2d and BB2e are selected from the group consisting of the following subformulae:

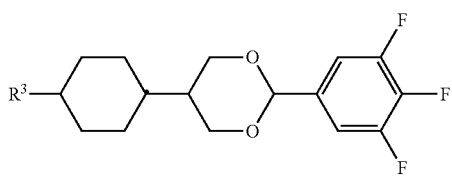

BB2d1

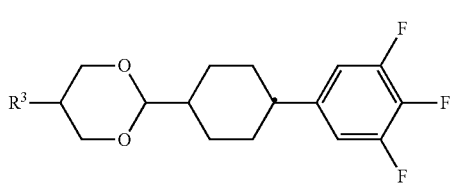

BB2e1 in which R³ has the meaning given for R³¹ in formula BB2.

Very particularly preferred compounds of formula BB2f are selected from the group consisting of the following subformulae:

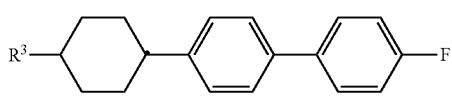

BB2f1

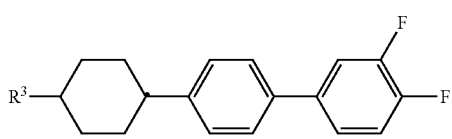

BB2f2

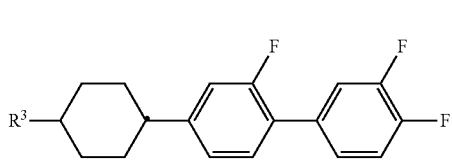

BB2f3

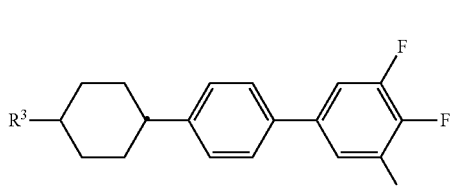

BB2f4

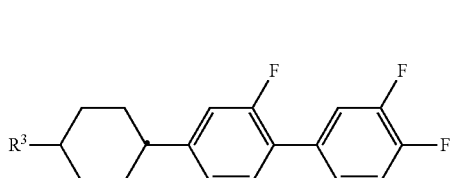

BB2f4 in which R³ has the meaning given for R³¹ in formula BB2.

Very particularly preferred compounds of formula BB2g are selected from the group consisting of the following subformulae:

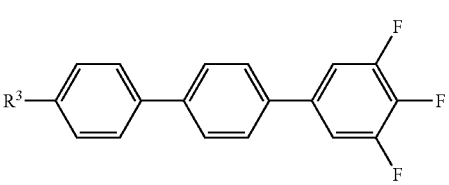

BB2g1

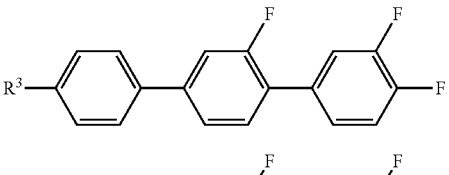

BB2g2

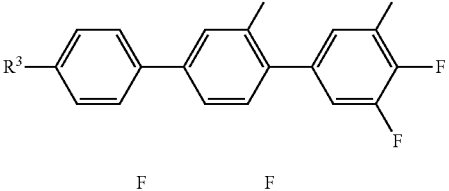

BB2g3

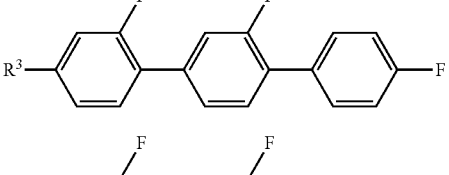

BB2g4

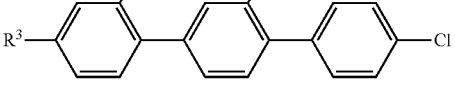

BB2g5 in which R³ has the meaning given for R³¹ in formula BB2.

Very particularly preferred compounds of formula BB2h are selected from the group consisting of the following subformulae:

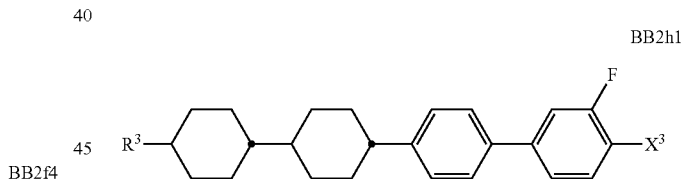

BB2h1

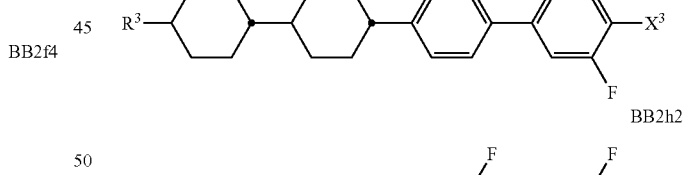

BB2h2

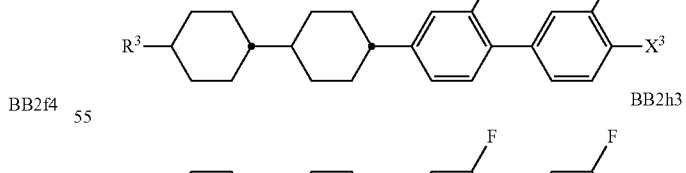

BB2h3 in which R³ has the meaning given for R³¹ in formula BB2.

Very particularly preferred compounds of formula BB2i are selected from the group consisting of the following subformulae:

BB2i1

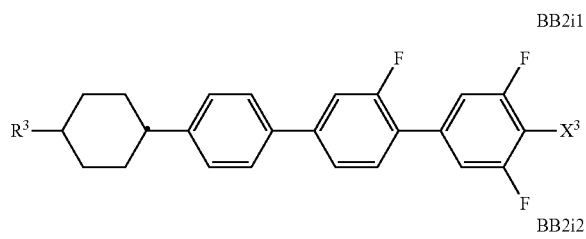

BB2i2

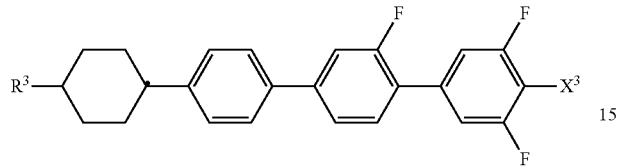

in which R³ has the meaning given for R³¹ in formula BB2.

Very particularly preferred compounds of formula BB2k are selected from the group consisting of the following subformulae:

BB2k1

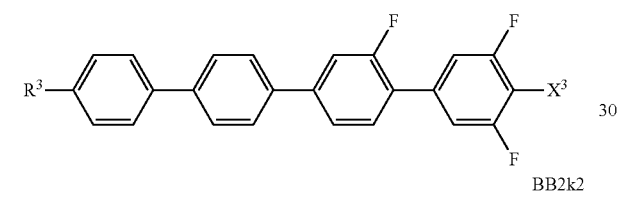

BB2k2

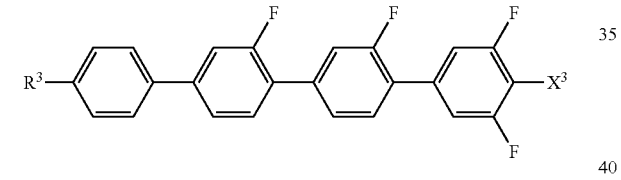

in which R³ has the meaning given for R³¹ in formula BB2.

Alternatively to, or in addition to, the compounds of formula BB1 and/or BB2 the LC media may also comprise one or more compounds of formula BB3 as defined above.

Particularly preferred compounds of formula BB3 are selected from the group consisting of the following subformulae:

BB3a

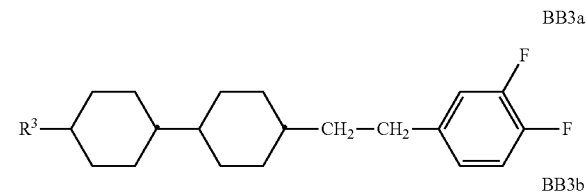

BB3b

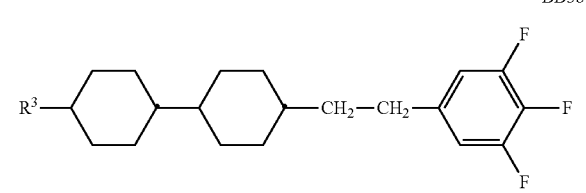

in which R³ has the meaning given for R³¹ in formula BB3.

Preferably the LC media according to this second preferred embodiment comprise, in addition to the compounds of formula AA and/or BB, one or more dielectrically neutral compounds having a dielectric anisotropy in the range from −1.5 to +3, preferably selected from the group of compounds of formula CC as defined above.

Particularly preferred compounds of formula CC are selected from the group consisting of the following subformulae:

CC1

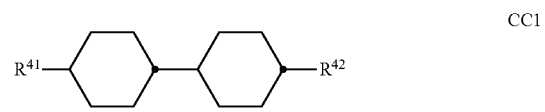

CC2

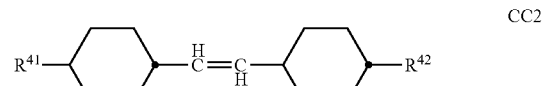

CC3

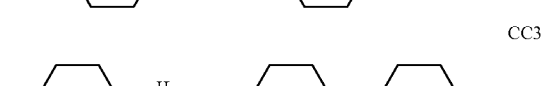

CC4

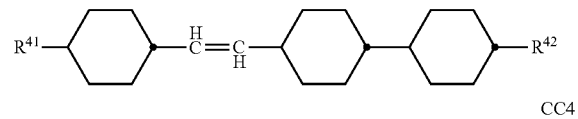

CC5

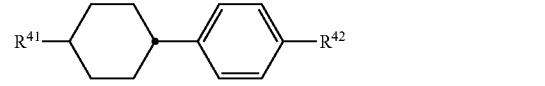

CC6

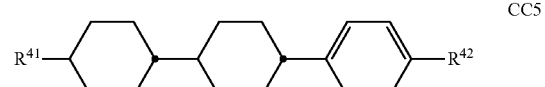

CC7

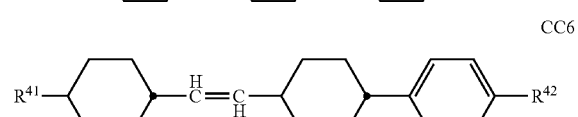

CC8

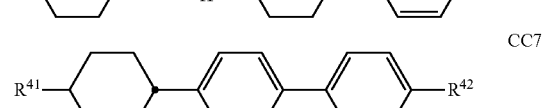

CC9

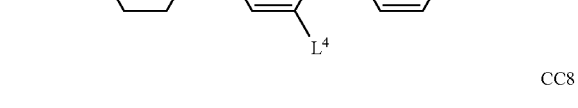

CC10

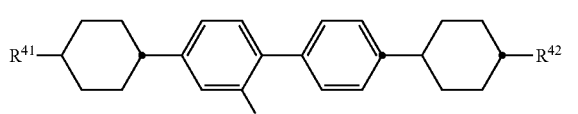

CC11

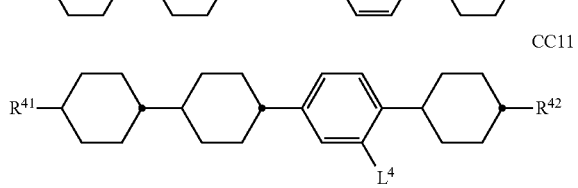

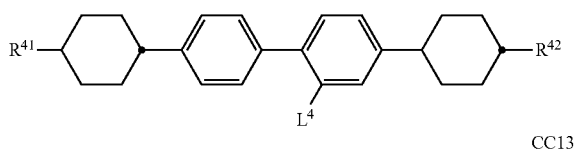

CC12

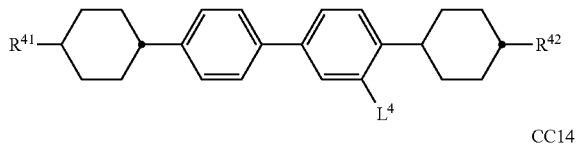

CC13

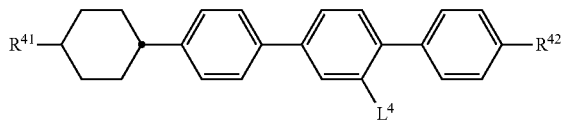

CC14

In which $R^{41}$ and $R^{42}$ have the meanings given in formula CC, and preferably denote each, independently of one another, alkyl, alkoxy, fluorinated alkyl or fluorinated alkoxy with 1 to 7 C atoms, or alkenyl, alkenyloxy, alkoxyalkyl or fluorinated alkenyl with 2 to 7 C atoms, and $L^4$ is H or F.

Preferably the LC media according to this second preferred embodiment comprise, in addition or alternatively to the dielectrically neutral compounds of formula CC, one or more dielectrically neutral compounds having a dielectric anisotropy in the range from −1.5 to +3, selected from the group of compounds of formula DD.

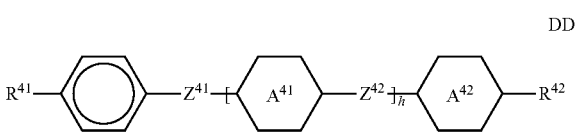

DD

In which $A^{41}$, $A^{42}$, $Z^{41}$, $Z^{42}$, $R^{41}$, $R^{42}$ and h have the meanings given in formula CC.

Particularly preferred compounds of formula DD are selected from the group consisting of the following subformulae:

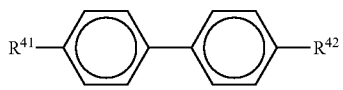

DD1

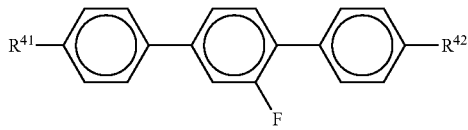

DD2 in which $R^{41}$ and $R^{42}$ have the meanings given in formula DD and $R^{41}$ preferably denotes alkyl bedeutet, and in formula DD1 $R^{42}$ preferably denotes alkenyl, particularly preferably vorzugsweise —(CH$_2$)$_2$—CH=CH—CH$_3$, and in formula DD2 $R^{42}$ preferably denotes alkyl, —(CH$_2$)$_2$—CH=CH$_2$ or —(CH$_2$)$_2$—CH=CH—CH$_3$.

The compounds of formula AA and BB are preferably used in the LC medium according to the invention in a concentration from 2% to 60%, more preferably from 3% to 35%, and very particularly preferably from 4% to 30% in the mixture as a whole.

The compounds of formula CC and DD are preferably used in the LC medium according to the invention in a concentration from 2% to 70%, more preferably from 5% to 65%, even more preferably from 10% to 60%, and very particularly preferably from 10%, preferably 15%, to 55% in the mixture as a whole.

The combination of compounds of the preferred embodiments mentioned above with the polymerised compounds described above causes low threshold voltages, low rotational viscosities and very good low-temperature stabilities in the LC media according to the invention at the same time as constantly high clearing points and high HR values, and allows the rapid establishment of a particularly low pretilt angle in PSA displays. In particular, the LC media exhibit significantly shortened response times, in particular also the grey-shade response times, in PSA displays compared with the media from the prior art.

The liquid-crystal mixture preferably has a nematic phase range of at least 80 K, particularly preferably at least 100 K, and a rotational viscosity of not greater than 250 mPa·s, preferably not greater than 200 mPa·s, at 20° C.

In the VA-type displays according to the invention, the molecules in the layer of the LC medium in the switched-off state are aligned perpendicular to the electrode surfaces (homeotropically) or have a tilted homeotropic alignment. On application of an electrical voltage to the electrodes, a realignment of the LC molecules takes place with the longitudinal molecular axes parallel to the electrode surfaces.

LC media according to the invention based on compounds with negative dielectric anisotropy according to the first preferred embodiment, in particular for use in displays of the PSA-VA type, have a negative dielectric anisotropy, preferably from −0.5 to −10, in particular from −2.5 to −7.5, at 20° C. and 1 kHz.

The birefringence n in LC media according to the invention for use in displays of the PSA-VA type is preferably below 0.16, particularly preferably from 0.06 to 0.14, very particularly preferably from 0.07 to 0.12.

In the OCB-type displays according to the invention, the molecules in the layer of the LC medium have a "bend" alignment. On application of an electrical voltage, a realignment of the LC molecules takes place with the longitudinal molecular axes perpendicular to the electrode surfaces.

LC media according to the invention for use in displays of the PSA-OCB type are preferably those based on compounds with positive dielectric anisotropy according to the second preferred embodiment, and preferably have a positive dielectric anisotropy from +4 to +17 at 20° C. and 1 kHz.

The birefringence n in LC media according to the invention for use in displays of the PSA-OCB type is preferably from 0.14 to 0.22, particularly preferably from 0.16 to 0.22.

LC media according to the invention, based on compounds with positive dielectric anisotropy according to the second preferred embodiment, for use in displays of the PSA-TN-, PSA-posi-VA-, PSA-IPS-oder PSA-FFS-type, preferably have a positive dielectric anisotropy from +2 to +30, particularly preferably from +3 to +20, at 20° C. and 1 kHz.

The birefringence n in LC media according to the invention for use in displays of the PSA-TN-, PSA-posi-VA-, PSA-IPS-oder PSA-FFS-type is preferably from 0.07 to 0.15, particularly preferably from 0.08 to 0.13.

The LC media according to the invention may also comprise further additives which are known to the person skilled in the art and are described in the literature, such as, for example, polymerisation initiators, inhibitors, stabilisers, surface-active substances or chiral dopants. These may be polymerisable or non-polymerisable. Polymerisable additives are accordingly ascribed to the polymerisable component or component A). Non-polymerisable additives are accordingly ascribed to the non-polymerisable component or component B).

In a preferred embodiment the LC media contain one or more chiral dopants, preferably in a concentration from 0.01 to 1%, very preferably from 0.05 to 0.5%. The chiral dopants are preferably selected from the group consisting of compounds from Table B below, very preferably from the group consisting of R- or S-1011, R- or S-2011, R- or S-3011, R- or S-4011, and R- or S-5011.

In another preferred embodiment the LC media contain a racemate of one or more chiral dopants, which are preferably selected from the chiral dopants mentioned in the previous paragraph.

Furthermore, it is possible to add to the LC media, for example, 0 to 15% by weight of pleochroic dyes, furthermore nanoparticles, conductive salts, preferably ethyldimethyldodecylammonium 4-hexoxybenzoate, tetrabutylammonium tetraphenylborate or complex salts of crown ethers (cf., for example, Haller et al., Mol. Cryst. Liq. Cryst. 24, 249-258 (1973)), for improving the conductivity, or substances for modifying the dielectric anisotropy, the viscosity and/or the alignment of the nematic phases. Substances of this type are described, for example, in DE-A 22 09 127, 22 40 864, 23 21 632, 23 38 281, 24 50 088, 26 37 430 and 28 53 728.

The individual components of the preferred embodiments a)-z) of the LC media according to the invention are either known or methods for the preparation thereof can readily be derived from the prior art by the person skilled in the relevant art, since they are based on standard methods described in the literature. Corresponding compounds of the formula CY are described, for example, in EPA-0 364 538. Corresponding compounds of the formula ZK are described, for example, in DE-A-26 36 684 and DE-A-33 21 373.

The LC media which can be used in accordance with the invention are prepared in a manner conventional per se, for example by mixing one or more of the above-mentioned compounds with one or more polymerisable compounds as defined above, and optionally with further liquid-crystalline compounds and/or additives. In general, the desired amount of the components used in lesser amount is dissolved in the components making up the principal constituent, advantageously at elevated temperature. It is also possible to mix solutions of the components in an organic solvent, for example in acetone, chloroform or methanol, and to remove the solvent again, for example by distillation, after thorough mixing. The invention furthermore relates to the process for the preparation of the LC media according to the invention.

It goes without saying to the person skilled in the art that the LC media according to the invention may also comprise compounds in which, for example, H, N, O, Cl, F have been replaced by the corresponding isotopes.

The structure of the LC displays according to the invention corresponds to the usual geometry for PSA displays, as described in the prior art cited at the outset. Geometries without protrusions are preferred, in particular those in which, in addition, the electrode on the colour filter side is unstructured and only the electrode on the TFT side has slots. Particularly suitable and preferred electrode structures for PSA-VA displays are described, for example, in US 2006/0066793 A1.

The following examples explain the present invention without restricting it. However, they show the person skilled in the art preferred mixture concepts with compounds preferably to be employed and the respective concentrations thereof and combinations thereof with one another. In addition, the examples illustrate which properties and property combinations are accessible.

The following abbreviations are used:
(m, m, z: in each case, independently of one another, 1, 2, 3, 4, 5 or 6)

TABLE A

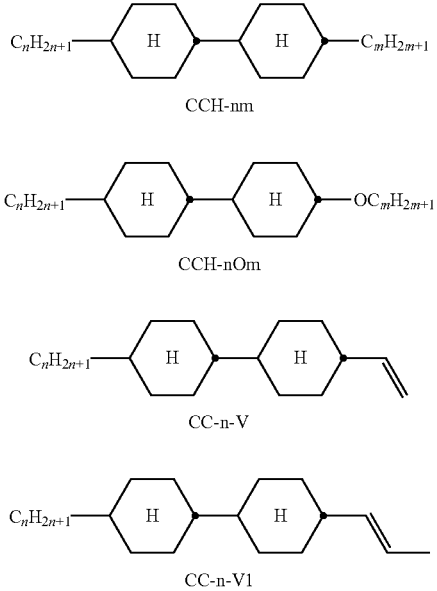

TABLE A-continued
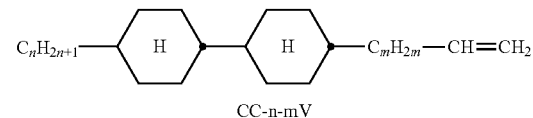
CC-n-mV
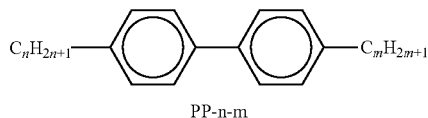
PP-n-m
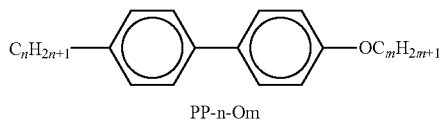
PP-n-Om
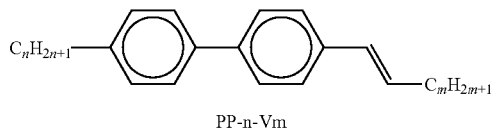
PP-n-Vm
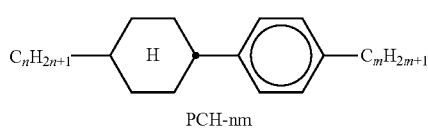
PCH-nm
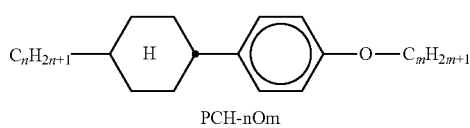
PCH-nOm
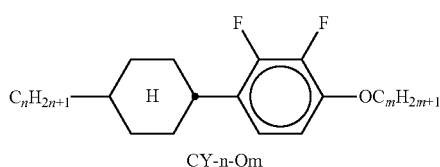
CY-n-Om
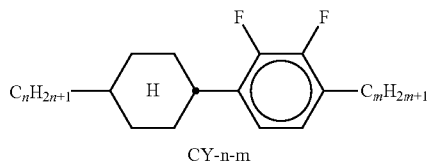
CY-n-m
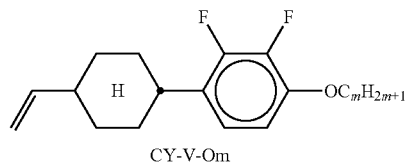
CY-V-Om
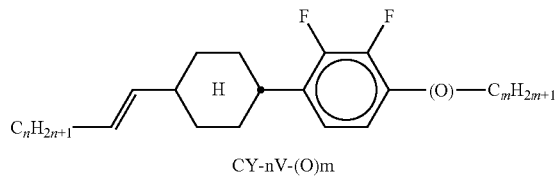
CY-nV-(O)m TABLE A-continued
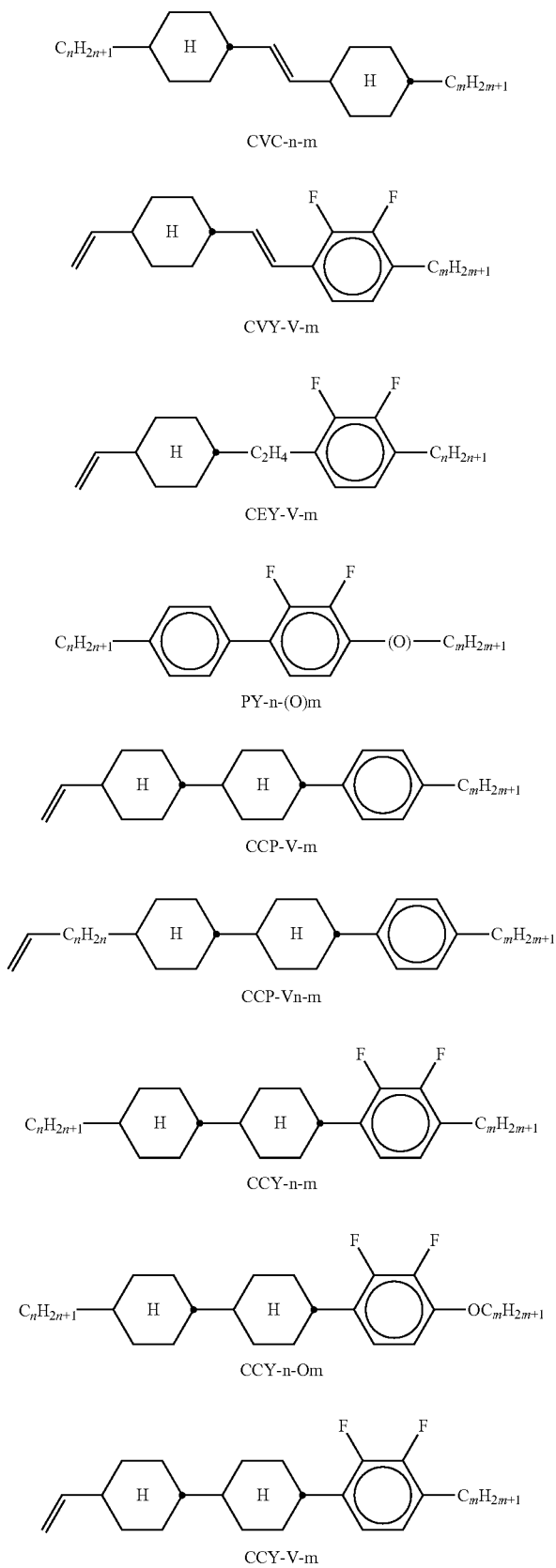

TABLE A-continued
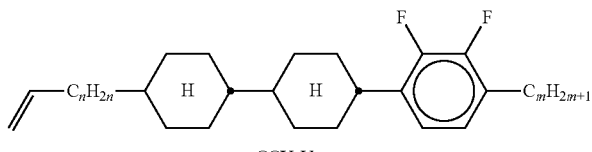
CCY-Vn-m
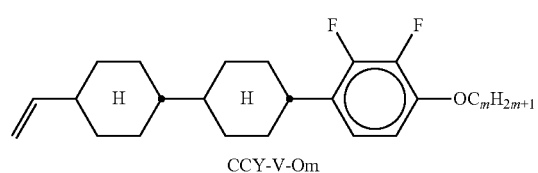
CCY-V-Om
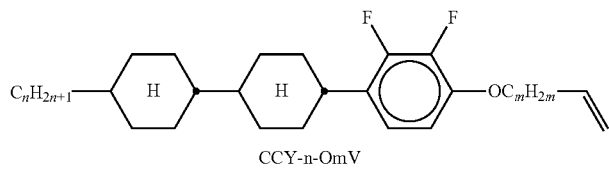
CCY-n-OmV
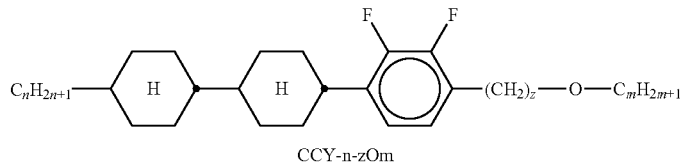
CCY-n-zOm
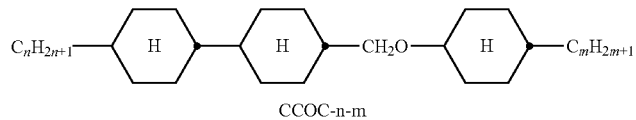
CCOC-n-m
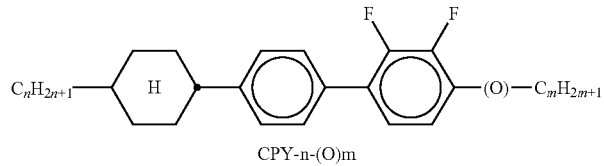
CPY-n-(O)m
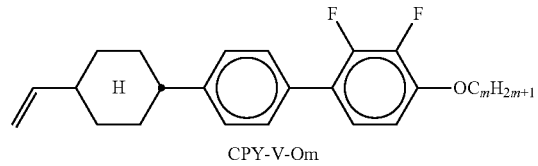
CPY-V-Om
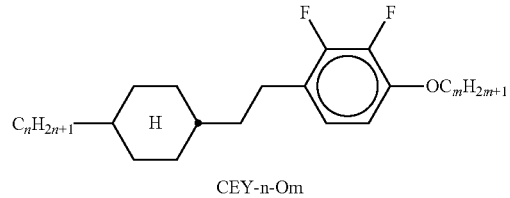
CEY-n-Om
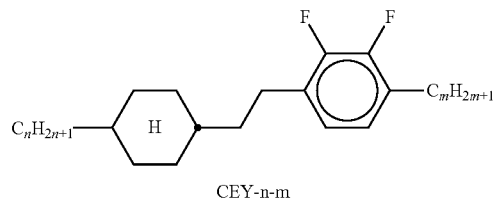
CEY-n-m TABLE A-continued
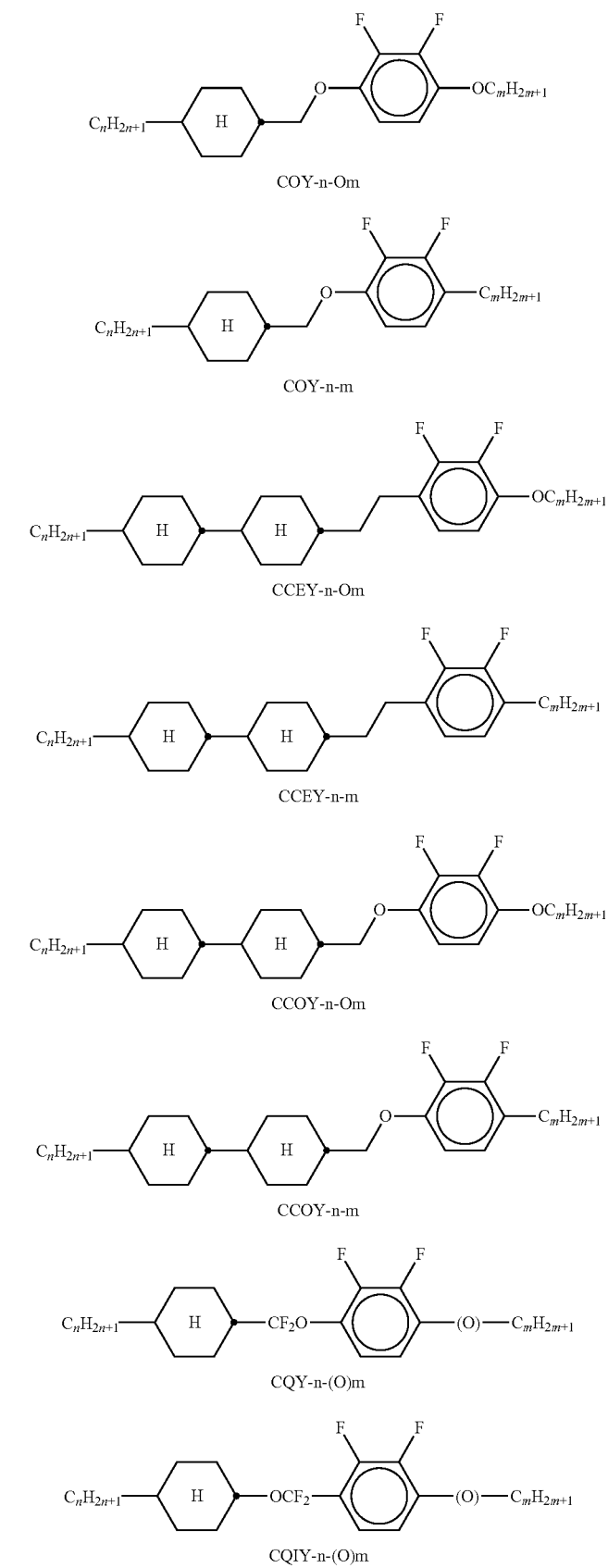

TABLE A-continued
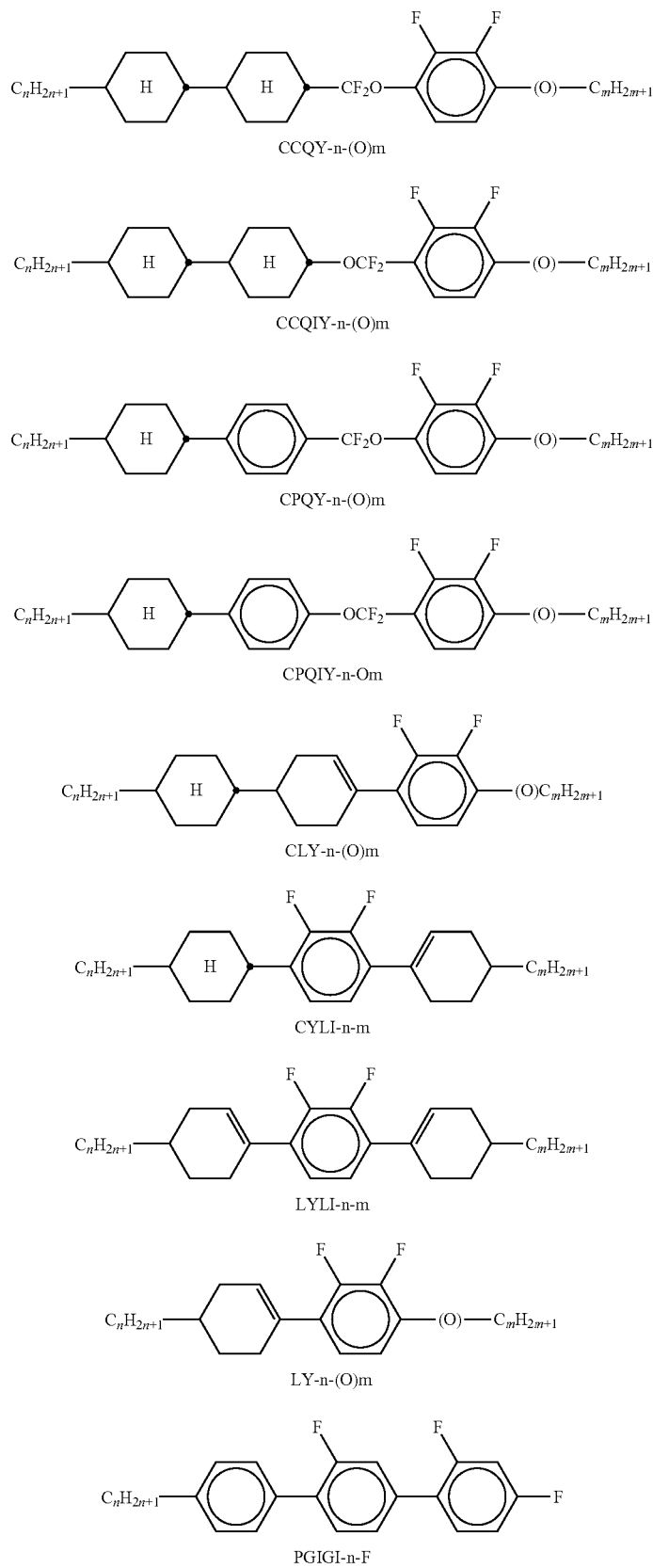

TABLE A-continued
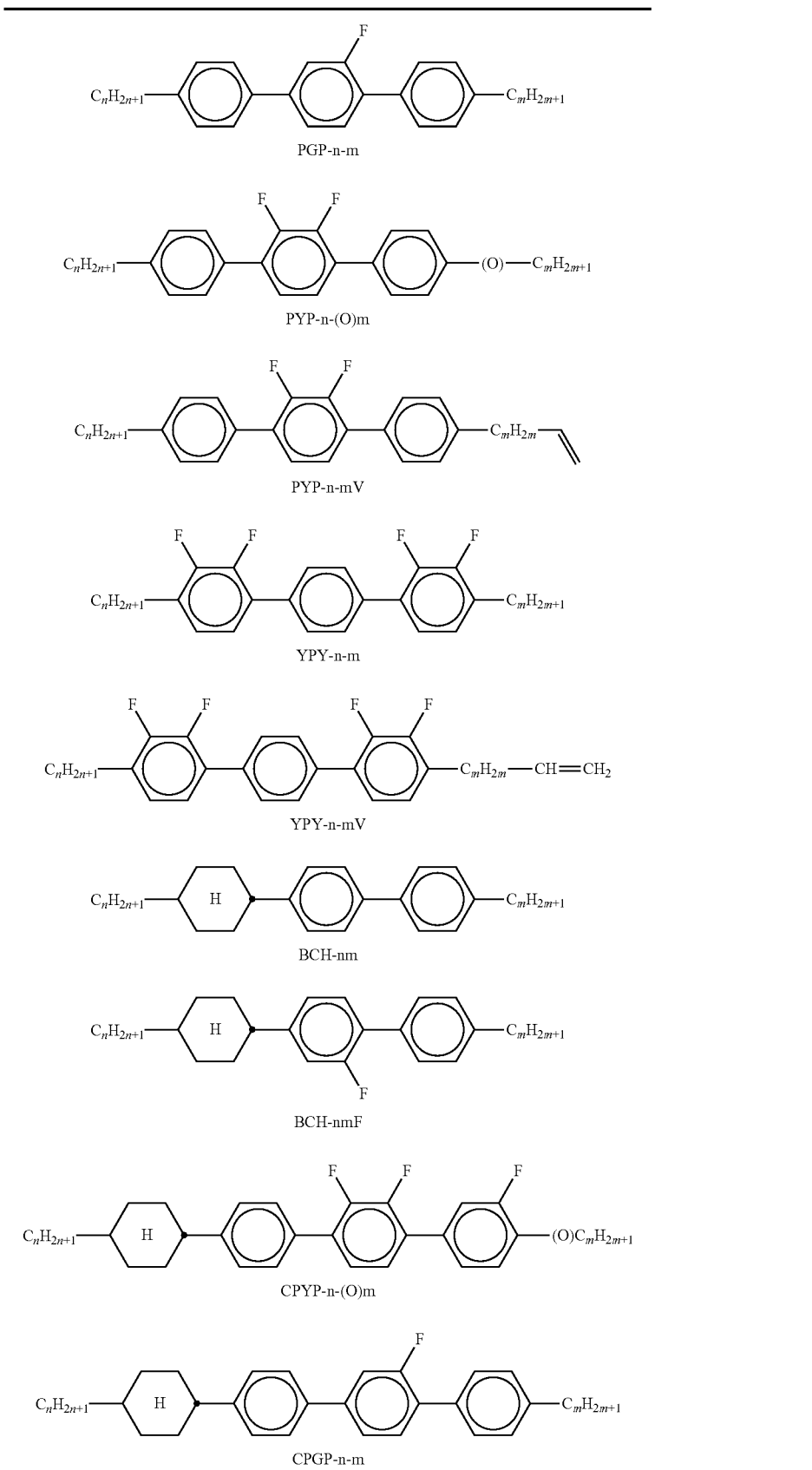

TABLE A-continued
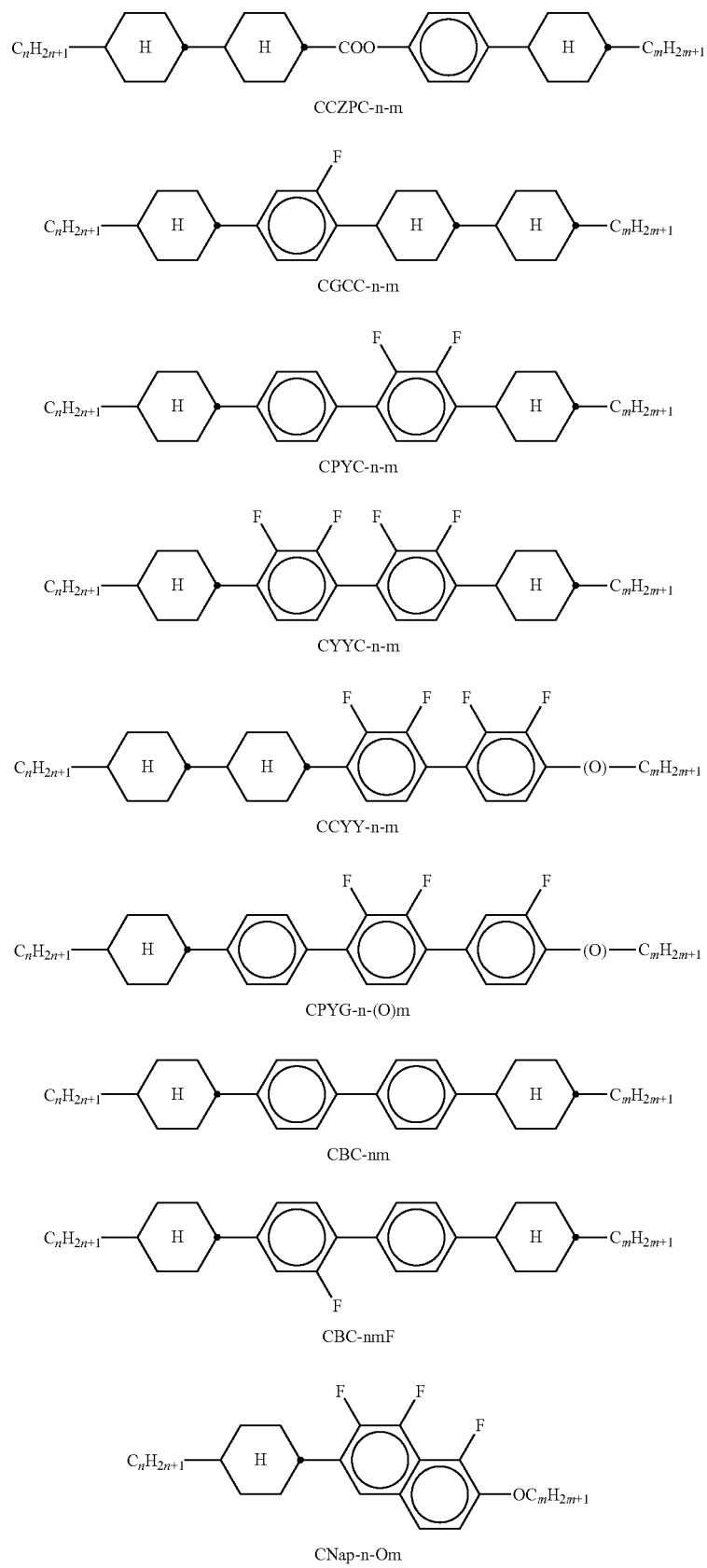

TABLE A-continued
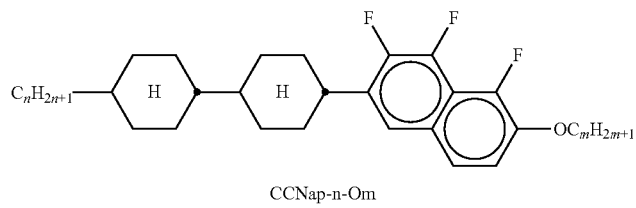
CCNap-n-Om
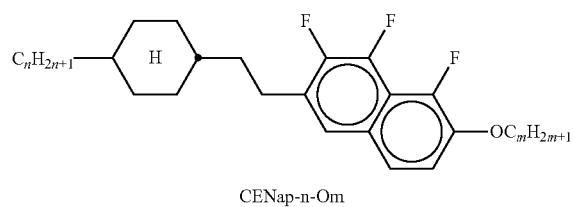
CENap-n-Om
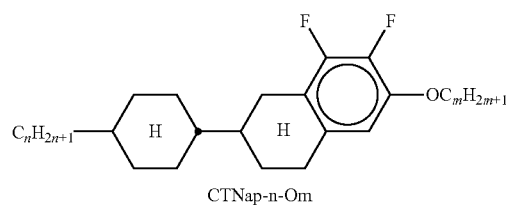
CTNap-n-Om
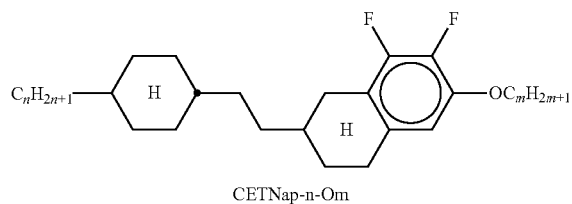
CETNap-n-Om
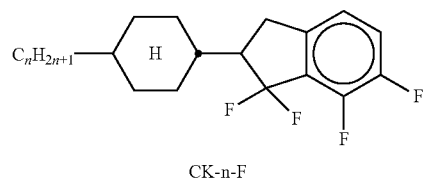
CK-n-F
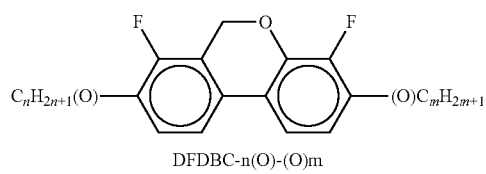
DFDBC-n(O)-(O)m
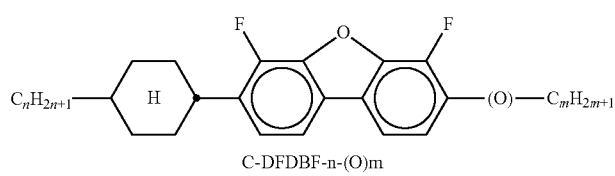
C-DFDBF-n-(O)m In a preferred embodiment of the present invention, the LC media according to the invention comprise one or more compounds selected from the group consisting of compounds from Table A.
TABLE B
Table B shows possible chiral dopants which can be added to the LC media according to the invention.
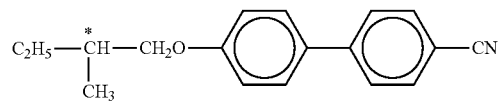
C 15
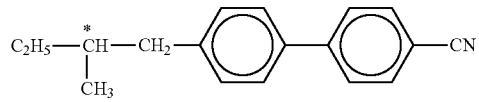
CB 15
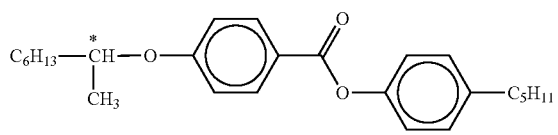
CM 21
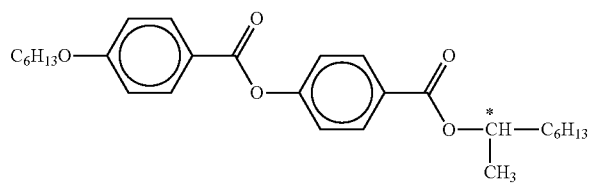
R/S-811
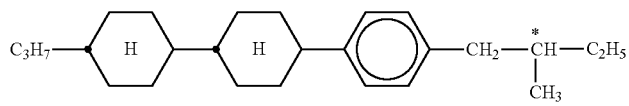
CM 44
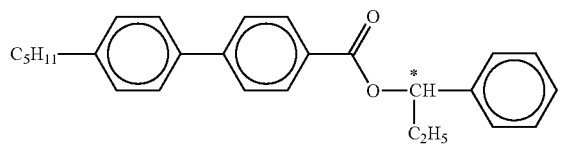
CM 45
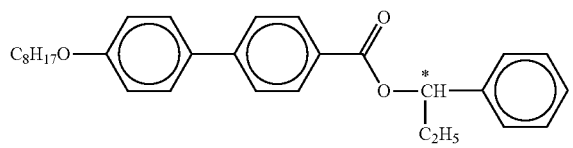
CM 47
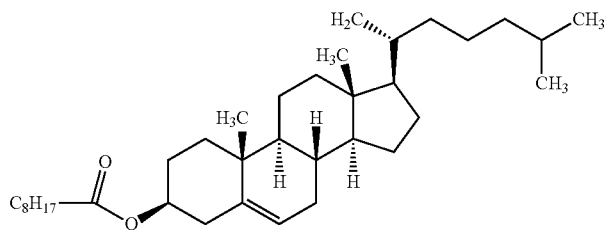
CN
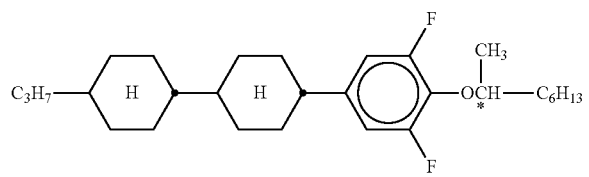
R/S-2011

TABLE B-continued

Table B shows possible chiral dopants which can be added to the LC media according to the invention.

R/S-3011

R/S-4011

R/S-5011

R/S-1011

The LC media preferably comprise 0 to 10% by weight, in particular 0.01 to 5% by weight, particularly preferably 0.1 to 3% by weight, of dopants. The LC media preferably comprise one or more dopants selected from the group consisting of compounds from Table B.

TABLE C

Table C shows possible stabilisers which can be added the LC media according to the invention.

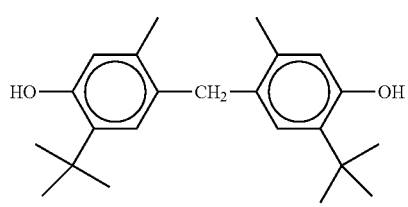

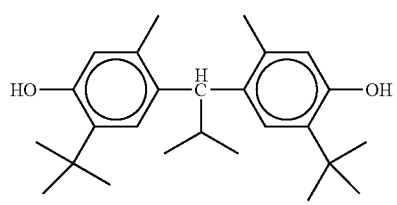

TABLE C-continued
Table C shows possible stabilisers which can be added the LC media according to the invention.
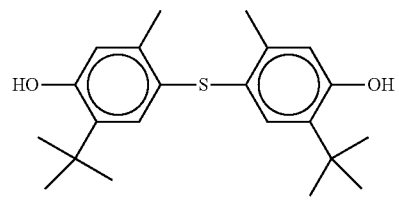
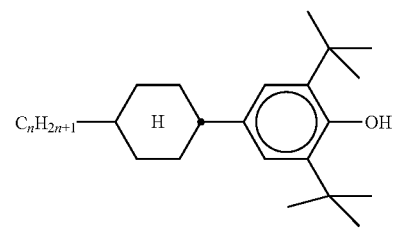
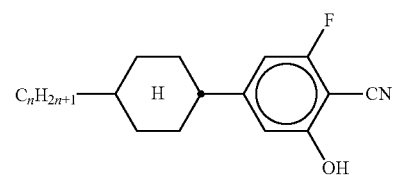
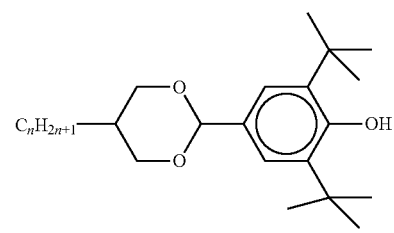
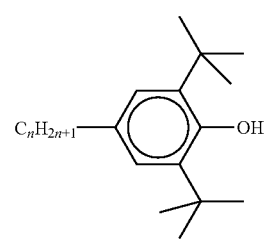
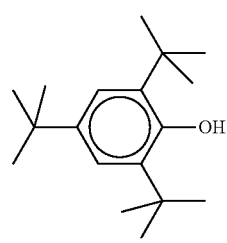
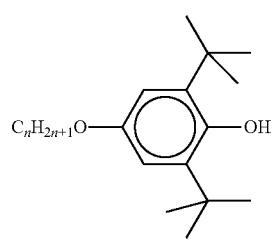

TABLE C-continued
Table C shows possible stabilisers which can be added the LC media according to the invention.
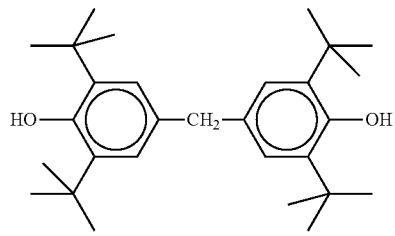
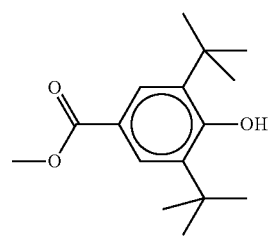
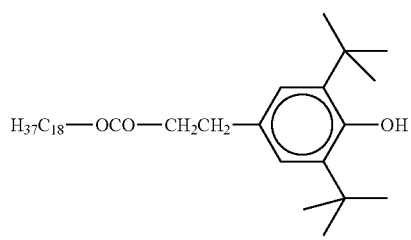
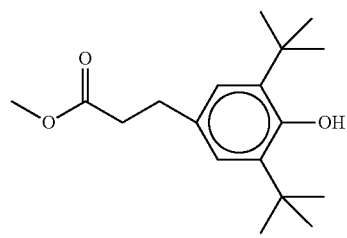
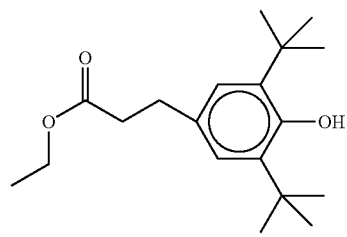
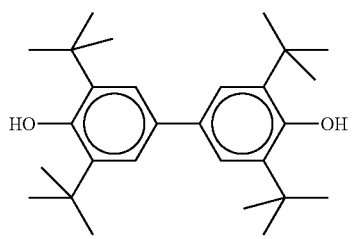

TABLE C-continued
Table C shows possible stabilisers which can be added the LC media according to the invention.
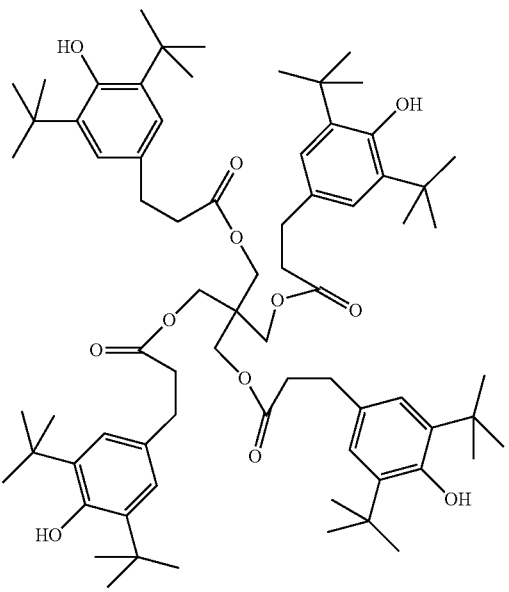 [SMILES: CC(C)(C)c1cc(CCC(=O)OCC(COC(=O)CCc2cc(C(C)(C)C)c(O)c(C(C)(C)C)c2)(COC(=O)CCc2cc(C(C)(C)C)c(O)c(C(C)(C)C)c2)COC(=O)CCc2cc(C(C)(C)C)c(O)c(C(C)(C)C)c2)cc(C(C)(C)C)c1O]
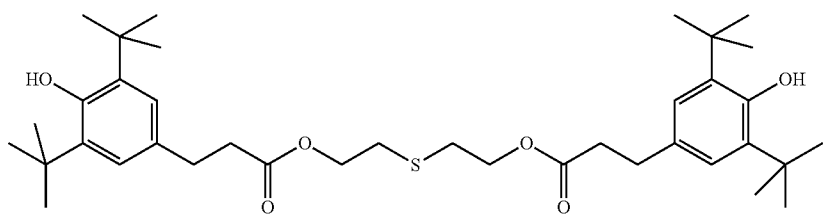 [SMILES: CC(C)(C)c1cc(CCC(=O)OCCSCCOC(=O)CCc2cc(C(C)(C)C)c(O)c(C(C)(C)C)c2)cc(C(C)(C)C)c1O]
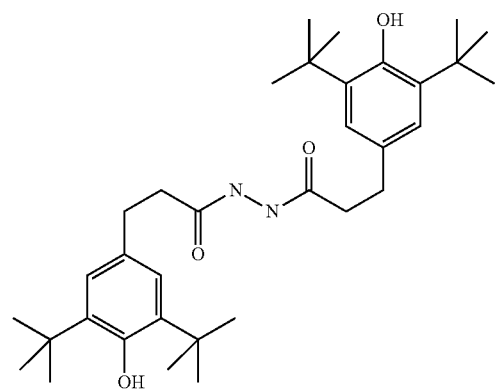 [SMILES: CC(C)(C)c1cc(CCC(=O)NNC(=O)CCc2cc(C(C)(C)C)c(O)c(C(C)(C)C)c2)cc(C(C)(C)C)c1O]
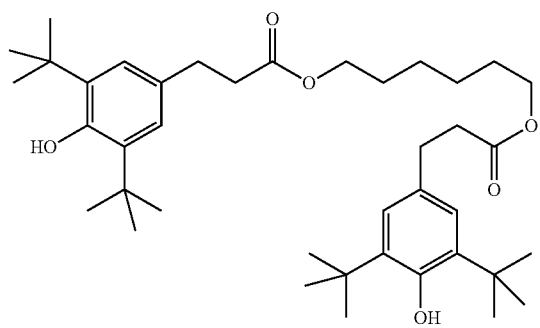 [SMILES: CC(C)(C)c1cc(CCC(=O)OCCCCCCOC(=O)CCc2cc(C(C)(C)C)c(O)c(C(C)(C)C)c2)cc(C(C)(C)C)c1O]

TABLE C-continued
Table C shows possible stabilisers which can be added the LC media according to the invention.
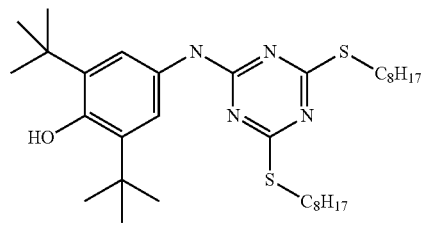
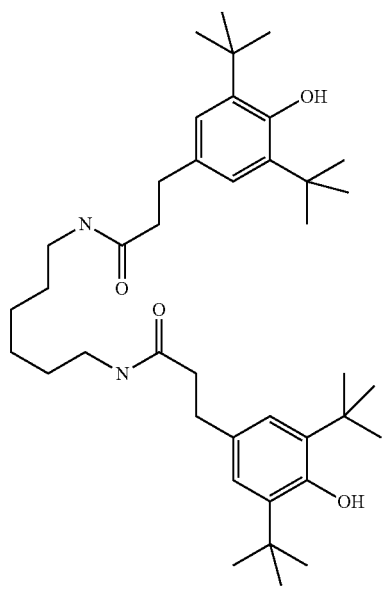 [SMILES: CC(C)(C)c1cc(CCC(=O)NCCCCCCNC(=O)CCc2cc(C(C)(C)C)c(O)c(C(C)(C)C)c2)cc(C(C)(C)C)c1O]
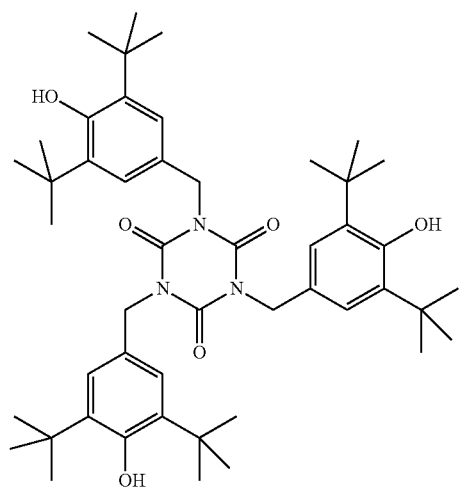 [SMILES: CC(C)(C)c1cc(Cn2c(=O)n(Cc3cc(C(C)(C)C)c(O)c(C(C)(C)C)c3)c(=O)n(Cc3cc(C(C)(C)C)c(O)c(C(C)(C)C)c3)c2=O)cc(C(C)(C)C)c1O]

TABLE C-continued
Table C shows possible stabilisers which can be added the LC media according to the invention.
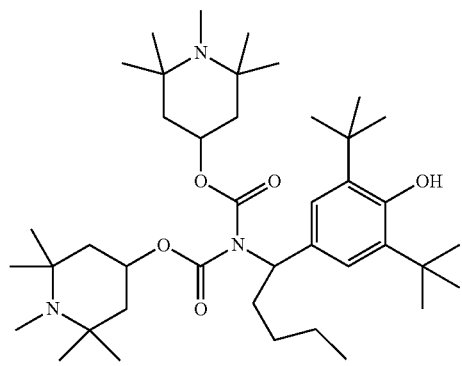 [SMILES: CCCCC(c1cc(C(C)(C)C)c(O)c(C(C)(C)C)c1)N(C(=O)OC1CC(C)(C)N(C)C(C)(C)C1)C(=O)OC1CC(C)(C)N(C)C(C)(C)C1]
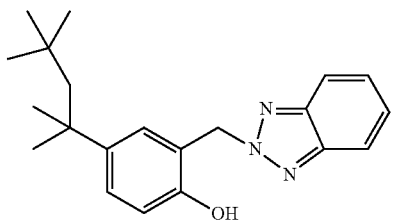 [SMILES: CC(C)(C)CC(C)(C)c1ccc(O)c(Cn2nc3ccccc3n2)c1]
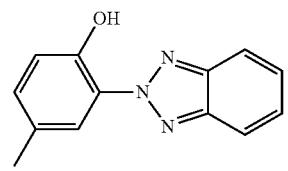 [SMILES: Cc1ccc(O)c(-n2nc3ccccc3n2)c1]
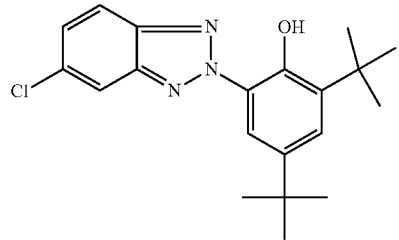 [SMILES: CC(C)(C)c1cc(-n2nc3ccc(Cl)cc3n2)c(O)c(C(C)(C)C)c1]
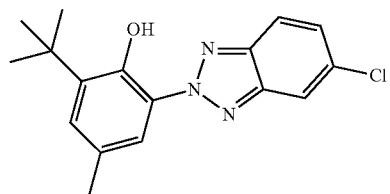 [SMILES: Cc1cc(-n2nc3ccc(Cl)cc3n2)c(O)c(C(C)(C)C)c1]
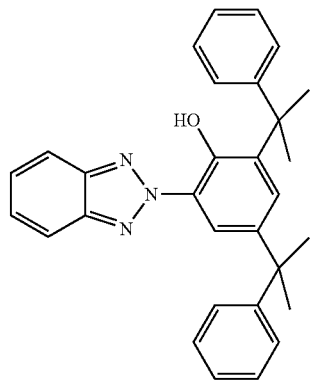 [SMILES: CC(C)(c1ccccc1)c1cc(-n2nc3ccccc3n2)c(O)c(C(C)(C)c2ccccc2)c1]

TABLE C-continued
Table C shows possible stabilisers which can be added the LC media according to the invention.
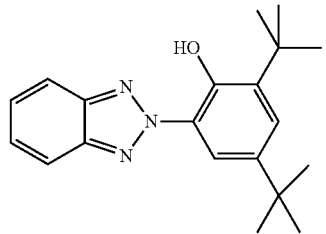 [SMILES: CC(C)(C)c1cc(-n2nc3ccccc3n2)c(O)c(C(C)(C)C)c1]
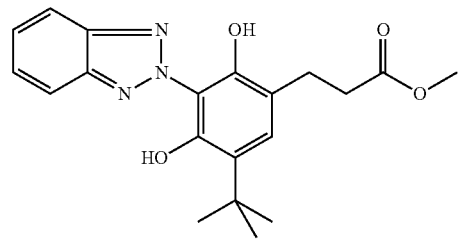 [SMILES: COC(=O)CCc1cc(C(C)(C)C)c(O)c(-n2nc3ccccc3n2)c1O]
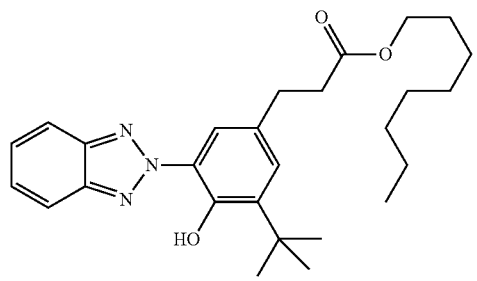 [SMILES: CCCCCCCCOC(=O)CCc1cc(-n2nc3ccccc3n2)c(O)c(C(C)(C)C)c1]
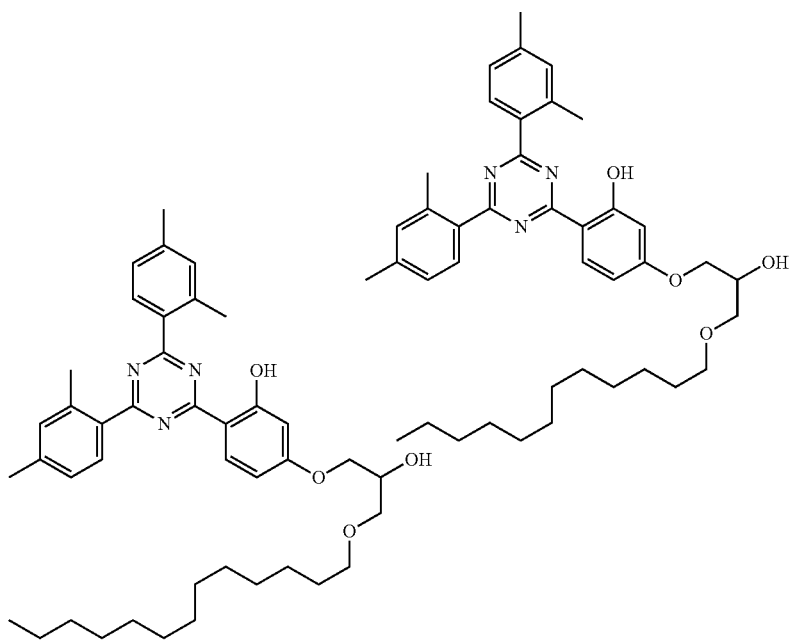

TABLE C-continued

Table C shows possible stabilisers which can be added the LC media according to the invention.

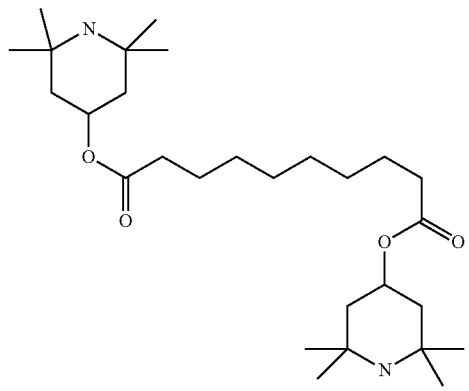

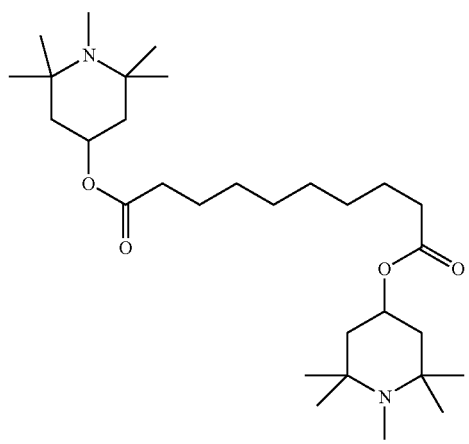

(n here denotes an integer from 1 to 12, preferably 1, 2, 3, 4, 5, 6, 7 or 8, terminal methyl groups are not shown).

The LC media preferably comprise 0 to 10% by weight, in particular 1 ppm to 5% by weight, particularly preferably 1 ppm to 1% by weight, of stabilisers. The LC media preferably comprise one or more stabilisers selected from the group consisting of compounds from Table C.

TABLE D

Table D shows illustrative compounds which can be used in the LC media in accordance with the present invention, preferably as reactive mesogenic compounds.

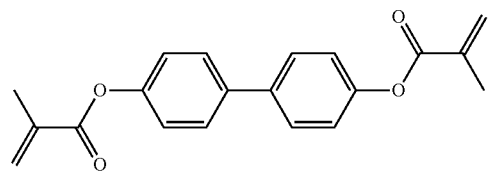 [SMILES: C=C(C)C(=O)Oc1ccc(-c2ccc(OC(=O)C(=C)C)cc2)cc1]

RM-1

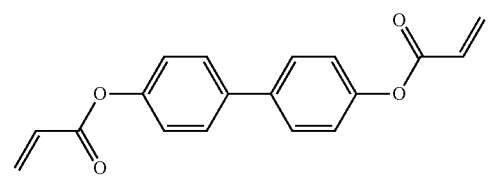

RM-2

TABLE D-continued
Table D shows illustrative compounds which can be used in the LC media in accordance with the present invention, preferably as reactive mesogenic compounds.
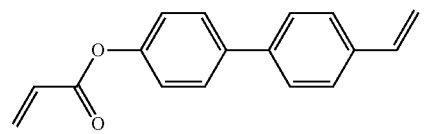
RM-3
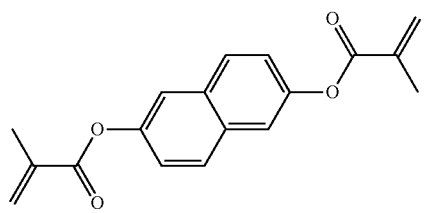 [SMILES: C=C(C)C(=O)Oc1ccc2cc(OC(=O)C(=C)C)ccc2c1]
RM-4
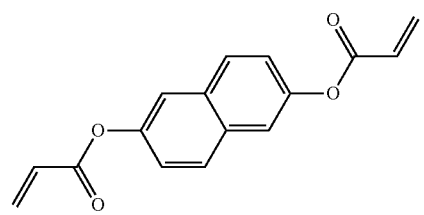 [SMILES: C=CC(=O)Oc1ccc2cc(OC(=O)C=C)ccc2c1]
RM-5
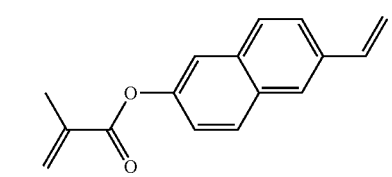 [SMILES: C=Cc1ccc2cc(OC(=O)C(=C)C)ccc2c1]
RM-6
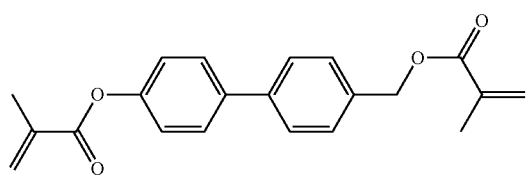 [SMILES: C=C(C)C(=O)OCc1ccc(-c2ccc(OC(=O)C(=C)C)cc2)cc1]
RM-7
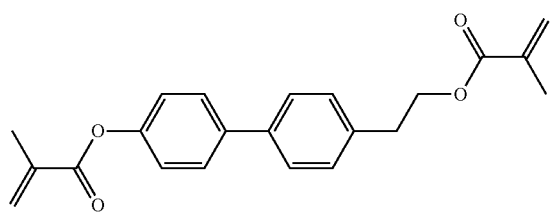 [SMILES: C=C(C)C(=O)OCCc1ccc(-c2ccc(OC(=O)C(=C)C)cc2)cc1]
RM-8
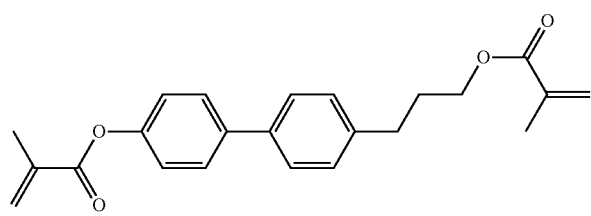 [SMILES: C=C(C)C(=O)OCCCc1ccc(-c2ccc(OC(=O)C(=C)C)cc2)cc1]
RM-9
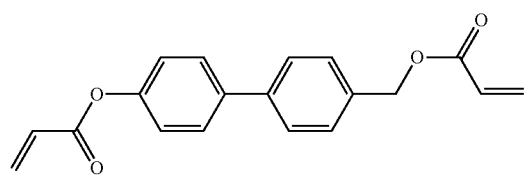 [SMILES: C=CC(=O)OCc1ccc(-c2ccc(OC(=O)C=C)cc2)cc1]
RM-10

TABLE D-continued
Table D shows illustrative compounds which can be used in the LC media in accordance with the present invention, preferably as reactive mesogenic compounds.
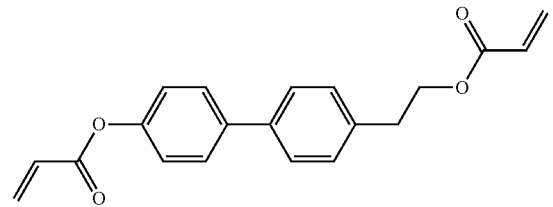 [SMILES: C=CC(=O)OCCc1ccc(-c2ccc(OC(=O)C=C)cc2)cc1] RM-11
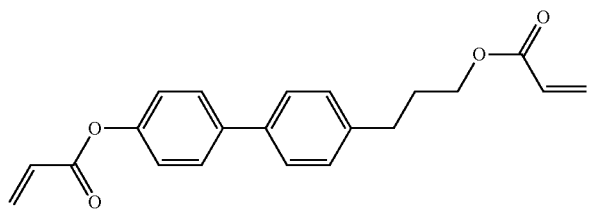 [SMILES: C=CC(=O)OCCCc1ccc(-c2ccc(OC(=O)C=C)cc2)cc1] RM-12
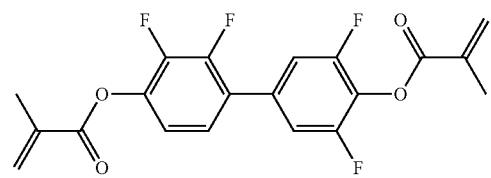 RM-13
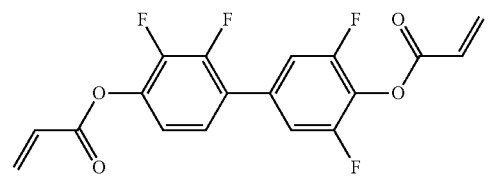 [SMILES: C=CC(=O)Oc1ccc(-c2cc(F)c(OC(=O)C=C)c(F)c2)c(F)c1F] RM-14
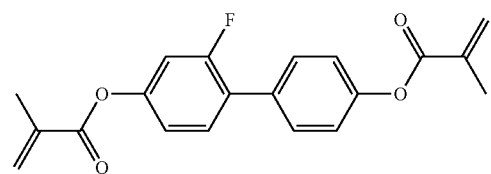 RM-15
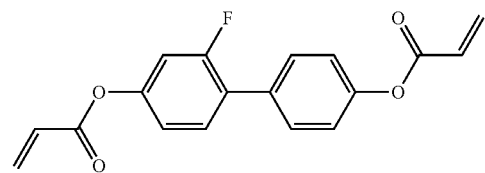 RM-16
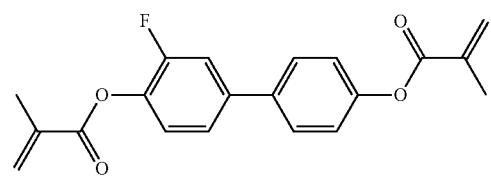 RM-17
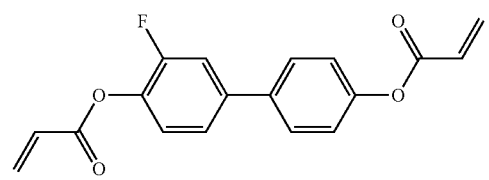 RM-18

TABLE D-continued
Table D shows illustrative compounds which can be used in the LC media in accordance with the present invention, preferably as reactive mesogenic compounds.
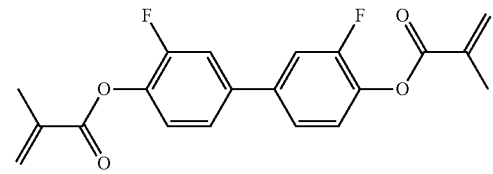 RM-19
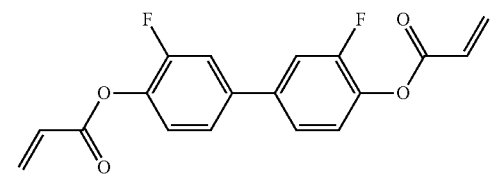 RM-20
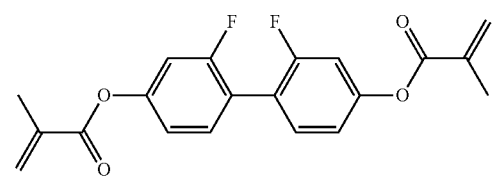 [SMILES: C=C(C)C(=O)Oc1ccc(-c2ccc(OC(=O)C(=C)C)cc2F)cc1] RM-21
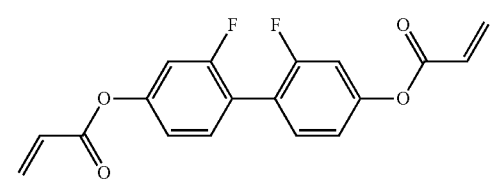 [SMILES: C=CC(=O)Oc1ccc(-c2ccc(OC(=O)C=C)cc2F)cc1] RM-22
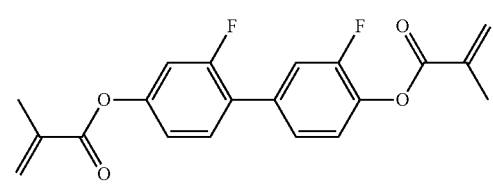 [SMILES: C=C(C)C(=O)Oc1ccc(-c2ccc(OC(=O)C(=C)C)c(F)c2)c(F)c1] RM-23
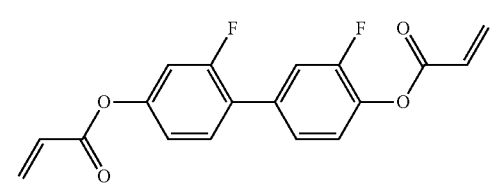 [SMILES: C=CC(=O)Oc1ccc(-c2ccc(OC(=O)C=C)c(F)c2)c(F)c1] RM-24
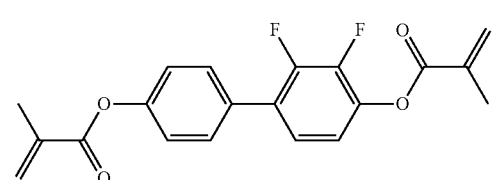 RM-25
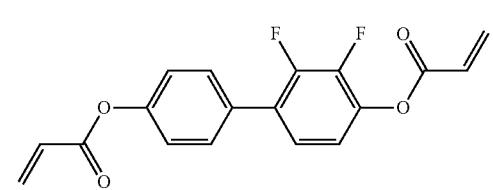 [SMILES: C=CC(=O)Oc1ccc(-c2ccc(OC(=O)C=C)c(F)c2F)cc1] RM-26

TABLE D-continued
Table D shows illustrative compounds which can be used in the LC media in accordance with the present invention, preferably as reactive mesogenic compounds.
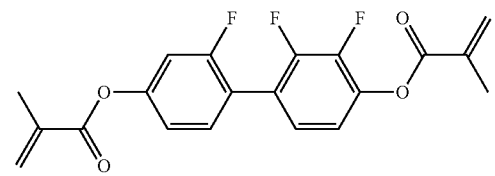 [SMILES: C=C(C)C(=O)Oc1ccc(-c2ccc(OC(=O)C(=C)C)c(F)c2F)c(F)c1] RM-27
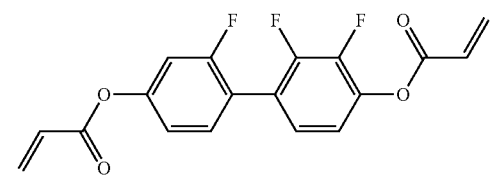 [SMILES: C=CC(=O)Oc1ccc(-c2ccc(OC(=O)C=C)c(F)c2F)c(F)c1] RM-28
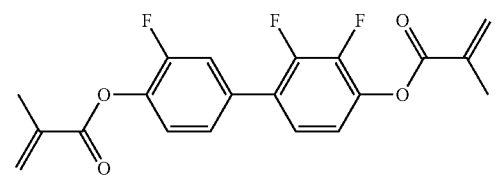 RM-29
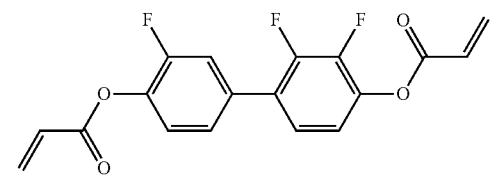 RM-30
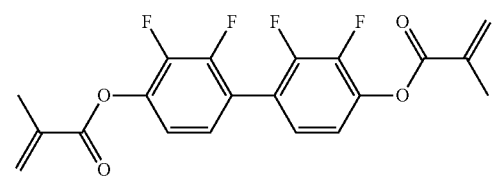 [SMILES: C=C(C)C(=O)Oc1ccc(-c2ccc(OC(=O)C(=C)C)c(F)c2F)cc1F] RM-31
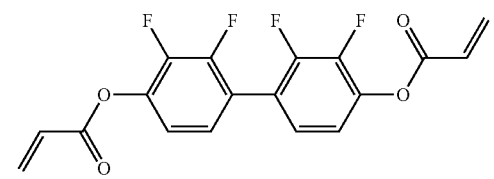 RM-32
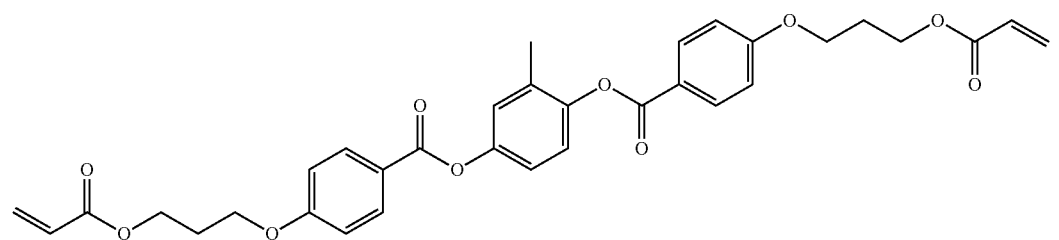 [SMILES: C=CC(=O)OCCCOc1ccc(C(=O)Oc2ccc(OC(=O)c3ccc(OCCCOC(=O)C=C)cc3)c(C)c2)cc1] RM-33

TABLE D-continued
Table D shows illustrative compounds which can be used in the LC media in accordance with the present invention, preferably as reactive mesogenic compounds.
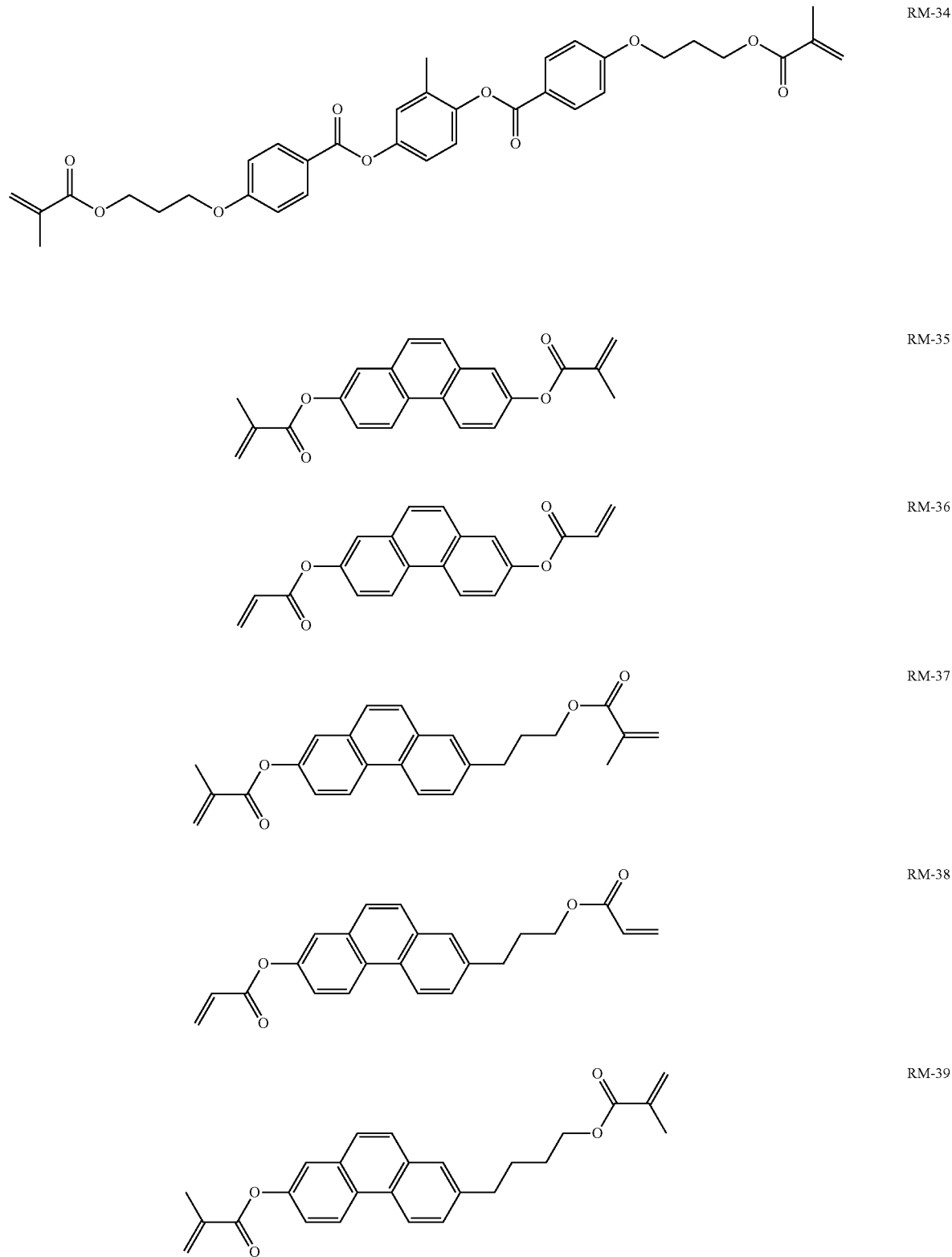
RM-34
RM-35
RM-36
RM-37
RM-38
RM-39

TABLE D-continued
Table D shows illustrative compounds which can be used in the LC media in accordance with the present invention, preferably as reactive mesogenic compounds.
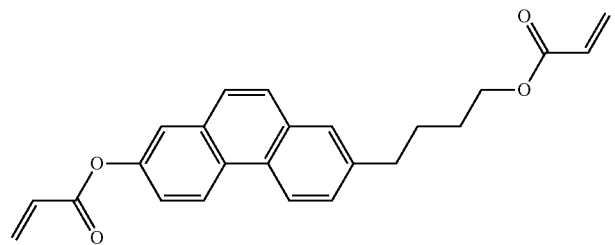 [SMILES: C=CC(=O)OCCCCc1ccc2c(ccc3cc(OC(=O)C=C)ccc32)c1] RM-40
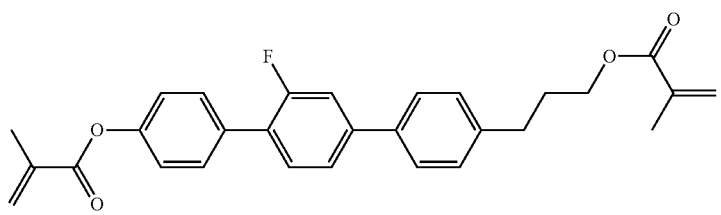 [SMILES: C=C(C)C(=O)OCCCc1ccc(-c2ccc(-c3ccc(OC(=O)C(=C)C)cc3)c(F)c2)cc1] RM-41
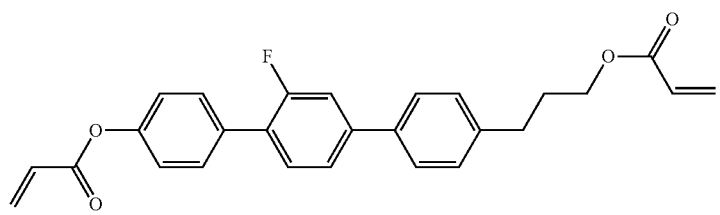 [SMILES: C=CC(=O)OCCCc1ccc(-c2ccc(-c3ccc(OC(=O)C=C)cc3)c(F)c2)cc1] RM-42
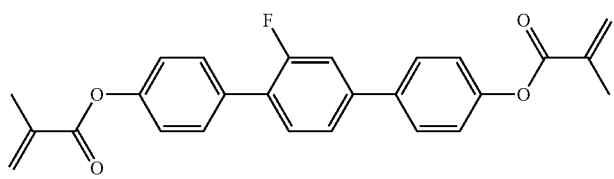 RM-43
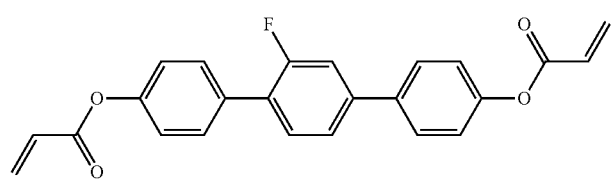 [SMILES: C=CC(=O)Oc1ccc(-c2ccc(-c3ccc(OC(=O)C=C)cc3)c(F)c2)cc1] RM-44
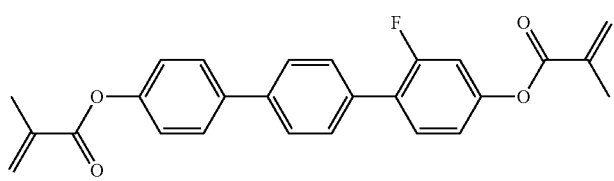 [SMILES: C=C(C)C(=O)Oc1ccc(-c2ccc(-c3ccc(OC(=O)C(=C)C)cc3F)cc2)cc1] RM-45
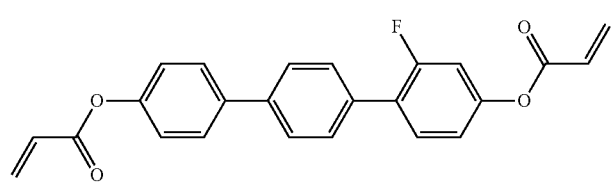 [SMILES: C=CC(=O)Oc1ccc(-c2ccc(-c3ccc(OC(=O)C=C)cc3F)cc2)cc1] RM-46
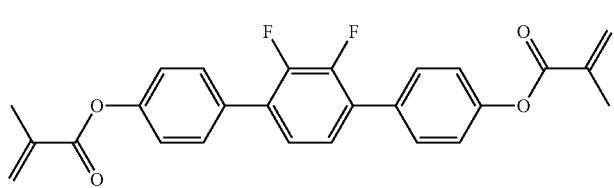 [SMILES: C=C(C)C(=O)Oc1ccc(-c2ccc(-c3ccc(OC(=O)C(=C)C)cc3)c(F)c2F)cc1] RM-47

TABLE D-continued
Table D shows illustrative compounds which can be used in the LC media in accordance with the present invention, preferably as reactive mesogenic compounds.
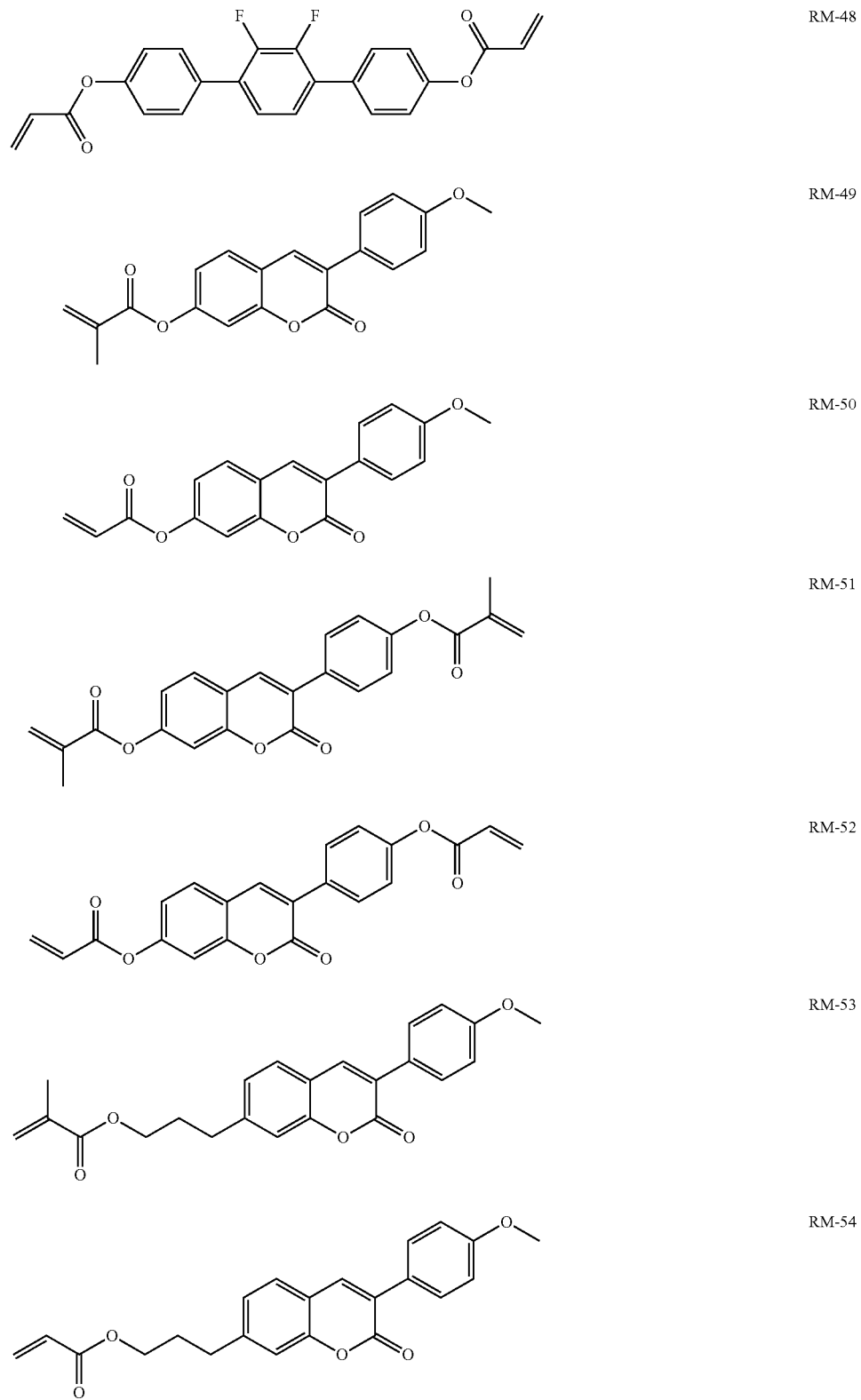
RM-48
RM-49
RM-50
RM-51
RM-52
RM-53
RM-54

TABLE D-continued
Table D shows illustrative compounds which can be used in the LC media in accordance with the present invention, preferably as reactive mesogenic compounds.
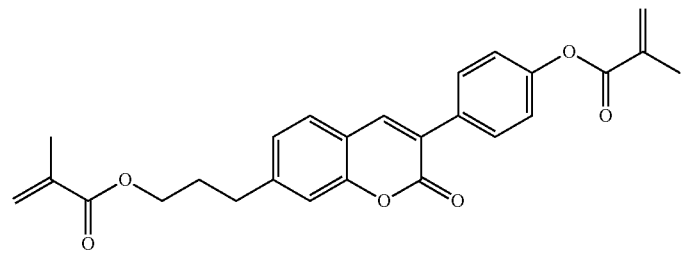 [SMILES: C=C(C)C(=O)OCCCc1ccc2cc(-c3ccc(OC(=O)C(=C)C)cc3)c(=O)oc2c1] RM-55
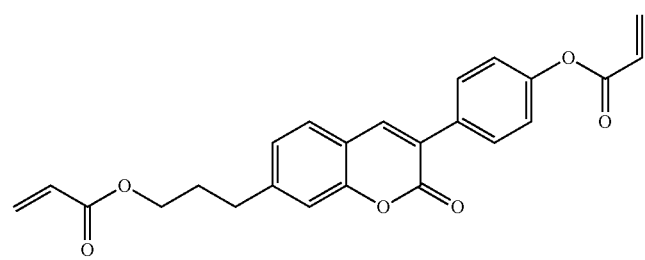 [SMILES: C=CC(=O)OCCCc1ccc2cc(-c3ccc(OC(=O)C=C)cc3)c(=O)oc2c1] RM-56
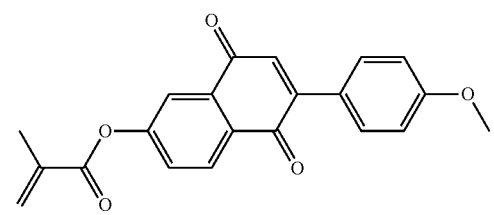 [SMILES: C=C(C)C(=O)Oc1ccc2c(c1)C(=O)C=C(c1ccc(OC)cc1)C2=O] RM-57
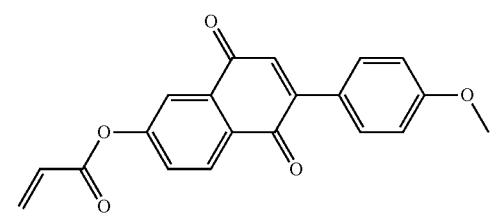 [SMILES: C=CC(=O)Oc1ccc2c(c1)C(=O)C=C(c1ccc(OC)cc1)C2=O] RM-58
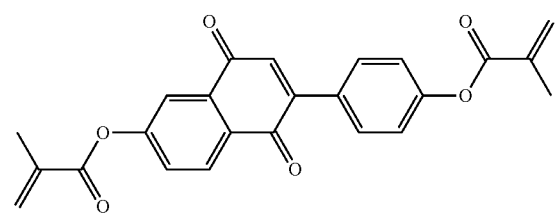 [SMILES: C=C(C)C(=O)Oc1ccc(C2=CC(=O)c3cc(OC(=O)C(=C)C)ccc3C2=O)cc1] RM-59
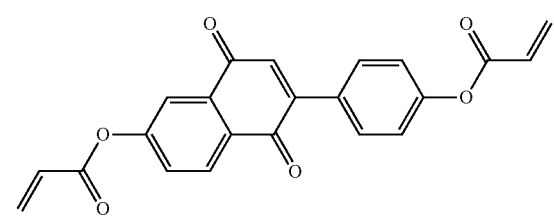 [SMILES: C=CC(=O)Oc1ccc(C2=CC(=O)c3cc(OC(=O)C=C)ccc3C2=O)cc1] RM-60

TABLE D-continued
Table D shows illustrative compounds which can be used in the LC media in accordance with the present invention, preferably as reactive mesogenic compounds.
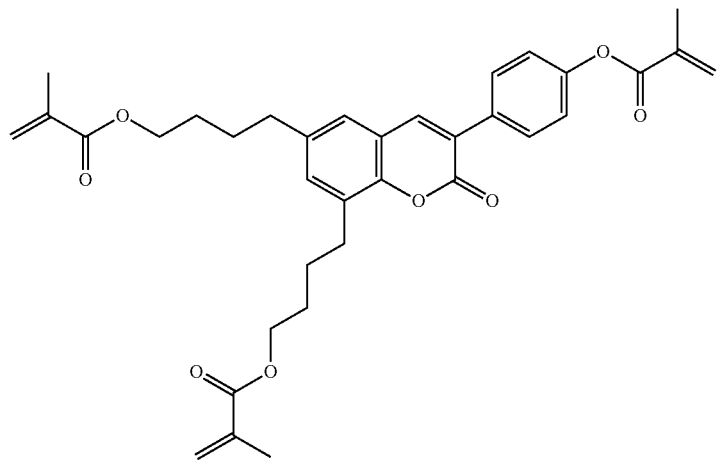 [SMILES: C=C(C)C(=O)OCCCCc1cc(CCCCOC(=O)C(=C)C)c2oc(=O)c(-c3ccc(OC(=O)C(=C)C)cc3)cc2c1]
RM-61
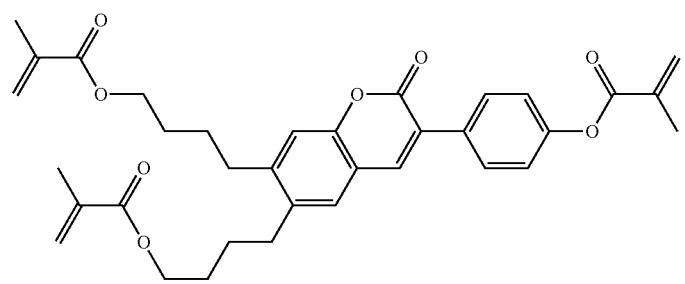 [SMILES: C=C(C)C(=O)OCCCCc1cc2cc(-c3ccc(OC(=O)C(=C)C)cc3)c(=O)oc2cc1CCCCOC(=O)C(=C)C]
RM-62
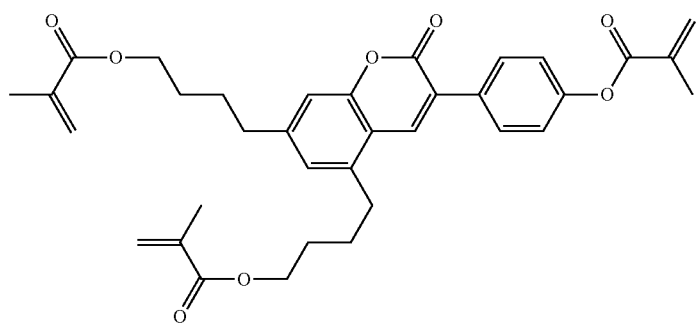 [SMILES: C=C(C)C(=O)OCCCCc1cc(CCCCOC(=O)C(=C)C)c2cc(-c3ccc(OC(=O)C(=C)C)cc3)c(=O)oc2c1]
RM-63
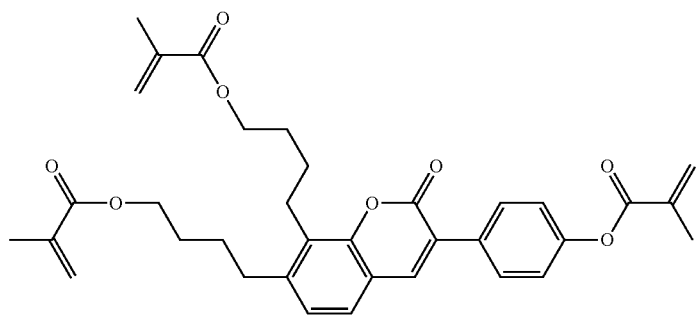 [SMILES: C=C(C)C(=O)OCCCCc1ccc2cc(-c3ccc(OC(=O)C(=C)C)cc3)c(=O)oc2c1CCCCOC(=O)C(=C)C]
RM-64

TABLE D-continued
Table D shows illustrative compounds which can be used in the LC media in accordance with the present invention, preferably as reactive mesogenic compounds.
RM-65
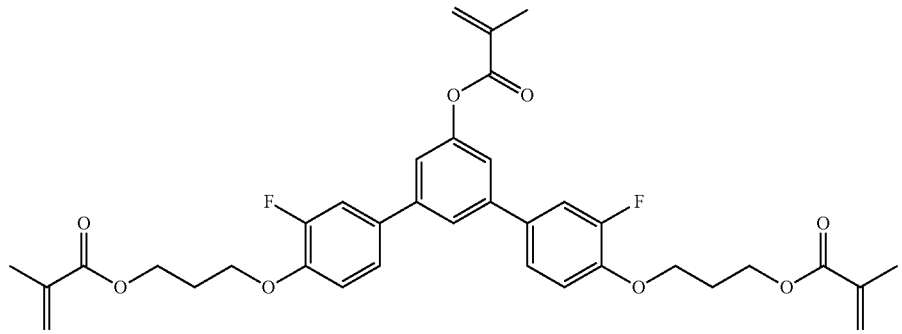 [SMILES: C=C(C)C(=O)OCCCOc1ccc(-c2cc(OC(=O)C(=C)C)cc(-c3ccc(OCCCOC(=O)C(=C)C)c(F)c3)c2)cc1F]
RM-66
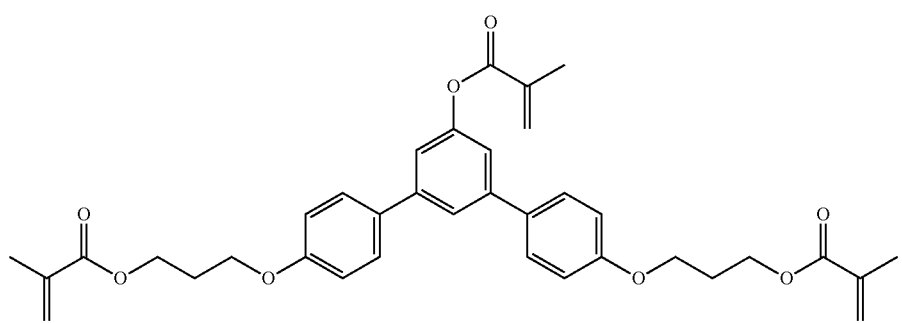 [SMILES: C=C(C)C(=O)OCCCOc1ccc(-c2cc(OC(=O)C(=C)C)cc(-c3ccc(OCCCOC(=O)C(=C)C)cc3)c2)cc1]
RM-67
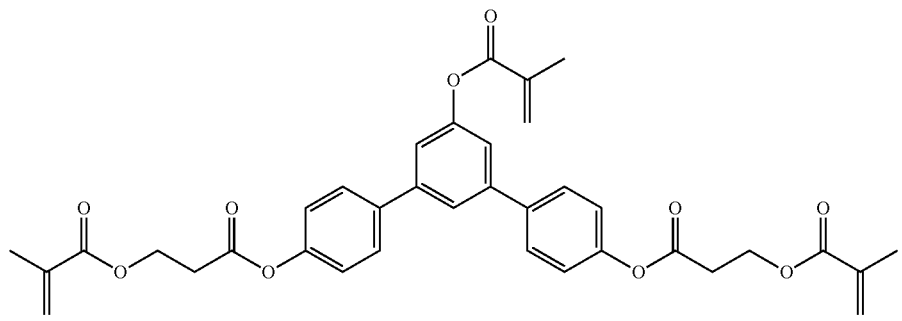 [SMILES: C=C(C)C(=O)OCCC(=O)Oc1ccc(-c2cc(OC(=O)C(=C)C)cc(-c3ccc(OC(=O)CCOC(=O)C(=C)C)cc3)c2)cc1]
RM-68
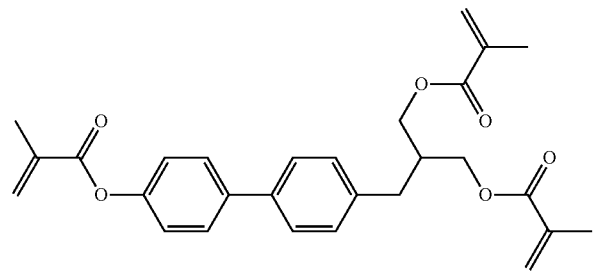 [SMILES: C=C(C)C(=O)OCC(COC(=O)C(=C)C)Cc1ccc(-c2ccc(OC(=O)C(=C)C)cc2)cc1]
RM-69
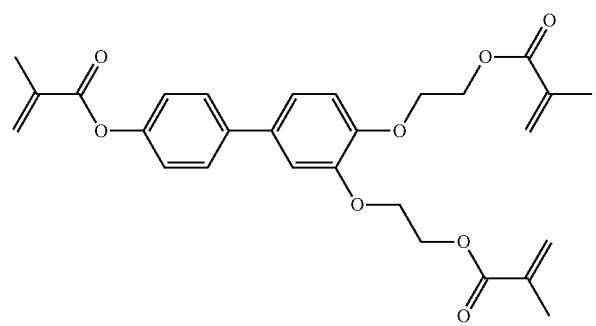 [SMILES: C=C(C)C(=O)OCCOc1ccc(-c2ccc(OC(=O)C(=C)C)cc2)cc1OCCOC(=O)C(=C)C]

TABLE D-continued
Table D shows illustrative compounds which can be used in the LC media in accordance with the present invention, preferably as reactive mesogenic compounds.
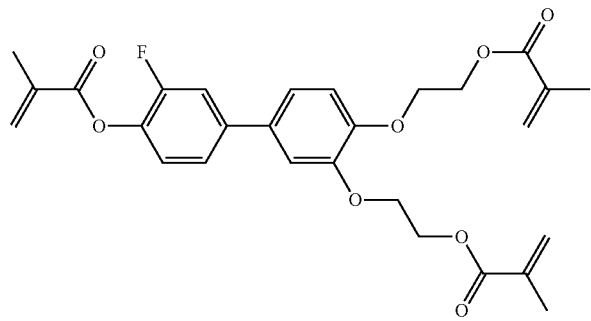 [SMILES: C=C(C)C(=O)OCCOc1ccc(-c2ccc(OC(=O)C(=C)C)c(F)c2)cc1OCCOC(=O)C(=C)C]
RM-70
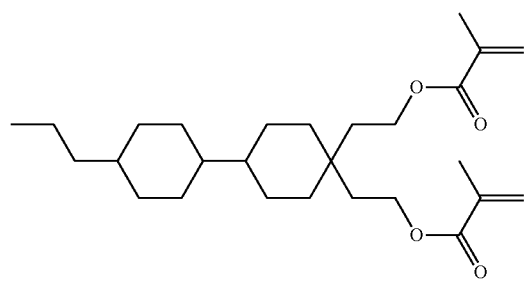 [SMILES: C=C(C)C(=O)OCCC1(CCOC(=O)C(=C)C)CCC(C2CCC(CCC)CC2)CC1]
RM-71
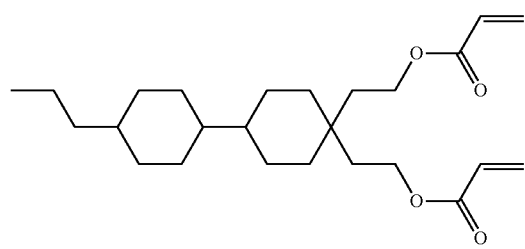 [SMILES: C=CC(=O)OCCC1(CCOC(=O)C=C)CCC(C2CCC(CCC)CC2)CC1]
RM-72
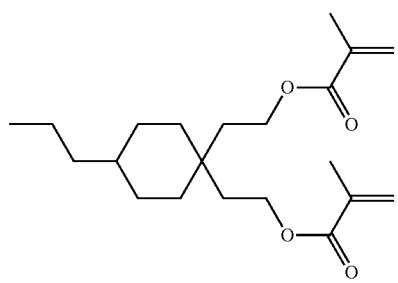 [SMILES: C=C(C)C(=O)OCCC1(CCOC(=O)C(=C)C)CCC(CCC)CC1]
RM-73
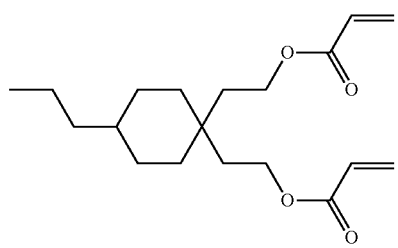 [SMILES: C=CC(=O)OCCC1(CCOC(=O)C=C)CCC(CCC)CC1]
RM-74
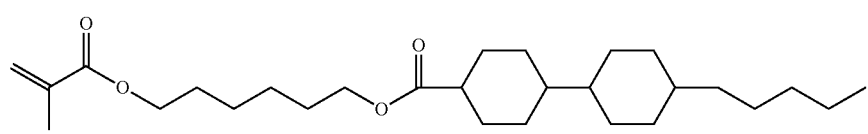 [SMILES: C=C(C)C(=O)OCCCCCCOC(=O)C1CCC(C2CCC(CCCCC)CC2)CC1]
RM-75

TABLE D-continued
Table D shows illustrative compounds which can be used in the LC media in
accordance with the present invention, preferably as reactive mesogenic compounds.
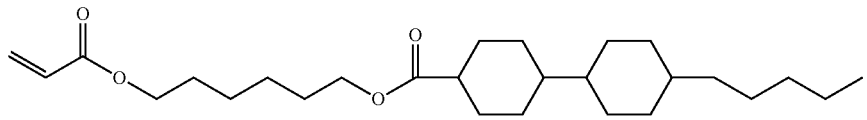
RM-76
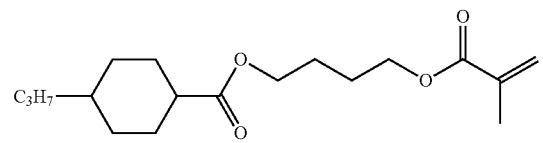
RM-77
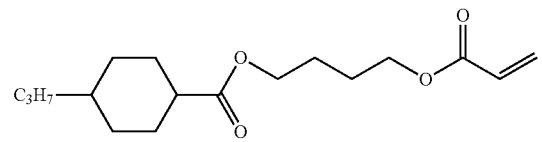
RM-78
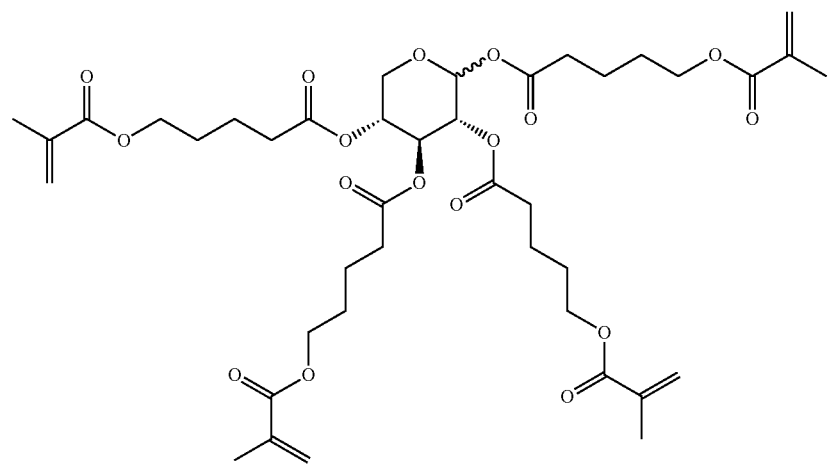 [SMILES: C=C(C)C(=O)OCCCCC(=O)OC1OC[C@@H](OC(=O)CCCCOC(=O)C(=C)C)[C@H](OC(=O)CCCCOC(=O)C(=C)C)[C@H]1OC(=O)CCCCOC(=O)C(=C)C]
RM-79
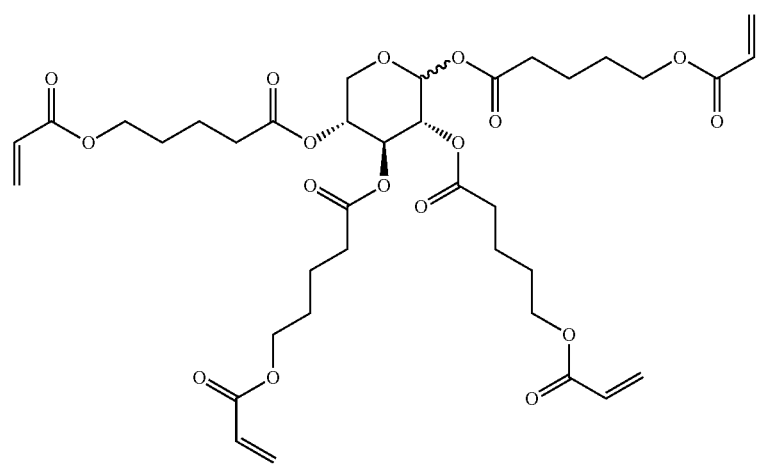 [SMILES: C=CC(=O)OCCCCC(=O)OC1OC[C@@H](OC(=O)CCCCOC(=O)C=C)[C@H](OC(=O)CCCCOC(=O)C=C)[C@H]1OC(=O)CCCCOC(=O)C=C]
RM-80

TABLE D-continued
Table D shows illustrative compounds which can be used in the LC media in accordance with the present invention, preferably as reactive mesogenic compounds.
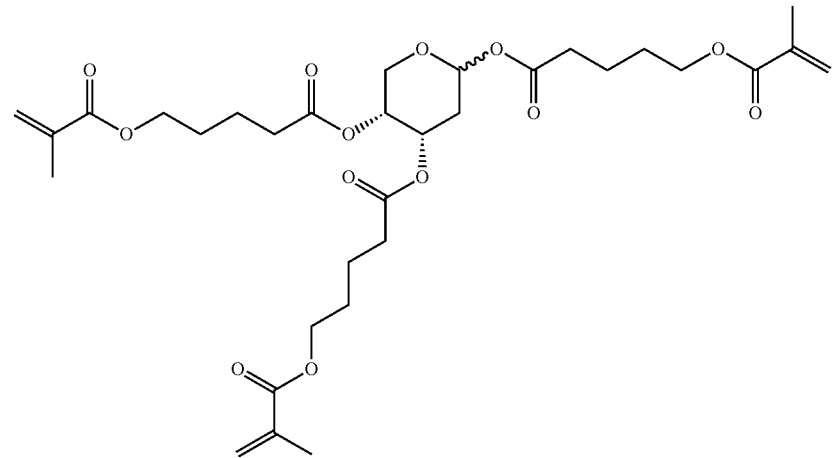 [SMILES: C=C(C)C(=O)OCCCCC(=O)OC1C[C@H](OC(=O)CCCCOC(=O)C(=C)C)[C@H](OC(=O)CCCCOC(=O)C(=C)C)CO1]
RM-81
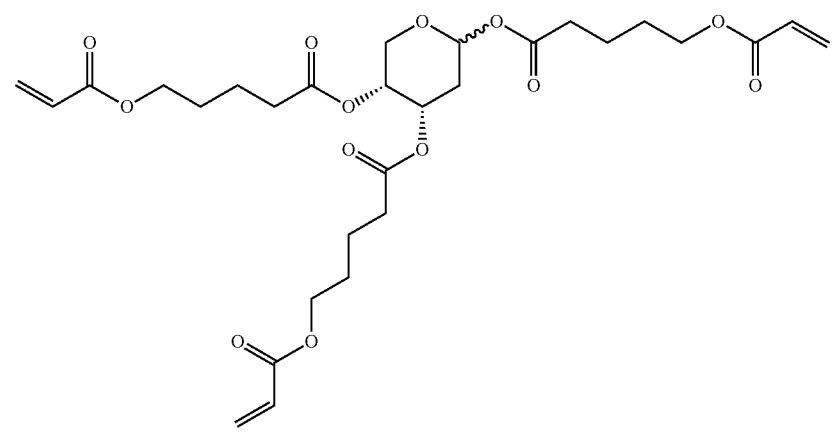 [SMILES: C=CC(=O)OCCCCC(=O)OC1C[C@H](OC(=O)CCCCOC(=O)C=C)[C@H](OC(=O)CCCCOC(=O)C=C)CO1]
RM-82
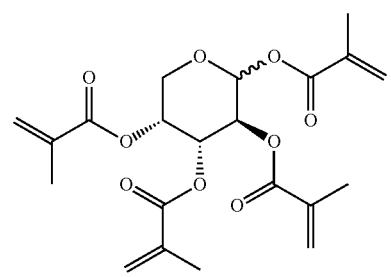 [SMILES: C=C(C)C(=O)OC1OC[C@@H](OC(=O)C(=C)C)[C@@H](OC(=O)C(=C)C)[C@@H]1OC(=O)C(=C)C]
RM-83
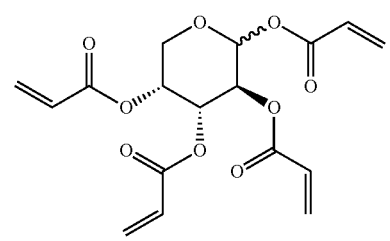 [SMILES: C=CC(=O)OC1OC[C@@H](OC(=O)C=C)[C@@H](OC(=O)C=C)[C@@H]1OC(=O)C=C]
RM-84

In a preferred embodiment of the present invention, the mesogenic media comprise one or more compounds selected from the group of the compounds from Table D.

In addition, the following abbreviations and symbols are used:

$V_0$ threshold voltage, capacitive [V] at 20° C.,
$n_e$ extraordinary refractive index at 20° C. and 589 nm,
$n_o$ ordinary refractive index at 20° C. and 589 nm,
$\Delta n$ optical anisotropy at 20° C. and 589 nm,
$\varepsilon_\perp$ dielectric permittivity perpendicular to the director at 20° C. and 1 kHz,
$\varepsilon_\parallel$ dielectric permittivity parallel to the director at 20° C. and 1 kHz,
$\Delta\varepsilon$ dielectric anisotropy at 20° C. and 1 kHz,
cl.p., T(N,I) clearing point [° C.],
$\gamma_1$ rotational viscosity at 20° C. [mPa·s],
$K_1$ elastic constant, "splay" deformation at 20° C. [pN],
$K_2$ elastic constant, "twist" deformation at 20° C. [pN],
$K_3$ elastic constant, "bend" deformation at 20° C. [pN].

Unless explicitly noted otherwise, all concentrations in the present application are quoted in percent by weight and relate to the corresponding mixture as a whole, comprising all solid or liquid-crystalline components, without solvents.

Unless explicitly noted otherwise, all temperature values indicated in the present application, such as, for example, for the melting point T(C,N), the transition from the smectic (S) to the nematic (N) phase T(S,N) and the clearing point T(N,I), are quoted in degrees Celsius (° C.). M.p. denotes melting point, cl.p.=clearing point. Furthermore, C=crystalline state, N=nematic phase, S=smectic phase and I=isotropic phase. The data between these symbols represent the transition temperatures.

All physical properties are and have been determined in accordance with "Merck Liquid Crystals, Physical Properties of Liquid Crystals", Status November 1997, Merck KGaA, Germany, and apply for a temperature of 20° C., and $\Delta n$ is determined at 589 nm and at 1 kHz, unless explicitly indicated otherwise in each case.

The term "threshold voltage" for the present invention relates to the capacitive threshold ($V_0$), also known as the Freedericks threshold, unless explicitly indicated otherwise. In the examples, the optical threshold may also, as generally usual, be quoted for 10% relative contrast ($V_{10}$).

Unless stated otherwise, the process of polymerising the polymerisable compounds in the PSA displays as described above and below is carried out at a temperature where the LC medium exhibits a liquid crystal phase, preferably a nematic phase, and most preferably is carried out at room temperature.

Unless stated otherwise, methods of preparing test cells and measuring their electrooptical and other properties are carried out by the methods as described hereinafter or in analogy thereto.

The display used for measurement of the capacitive threshold voltage consists of two plane-parallel glass outer plates at a separation of 25 μm, each of which has on the inside an electrode layer and an unrubbed polyimide alignment layer on top, which effect a homeotropic edge alignment of the liquid-crystal molecules.

The display or test cell used for measurement of the tilt angles consists of two plane-parallel glass outer plates at a separation of 4 μm, each of which has on the inside an electrode layer and a polyimide alignment layer on top, where the two polyimide layers are rubbed antiparallel to one another and effect a homeotropic edge alignment of the liquid-crystal molecules.

The polymerisable compounds are polymerised in the display or test cell by irradiation with UVA light of defined intensity for a prespecified time, with a voltage simultaneously being applied to the display (usually 10 V to 30 V alternating current, 1 kHz). In the examples, unless indicated otherwise, a metal halide lamp and an intensity of 100 mW/cm$^2$ is used for polymerisation. The intensity is measured using a standard UVA meter (Hoenle UV-meter high end with UVA sensor).

The tilt angle is determined by crystal rotation experiment (Autronic-Melchers TBA-105). A low value (i.e. a large deviation from the 90° angle) corresponds to a large tilt here.

The VHR value is measured as follows: 0.3% of a polymerisable monomeric compound is added to the LC host mixture, and the resultant mixture is introduced into VA-VHR test cells (not rubbed, VA-polyimide alignment layer, LC-layer thickness d≈6 μm). The HR value is determined after 5 min at 100° C. before and after UV exposure at 1 V, 60 Hz, 64 μs pulse (measuring instrument: Autronic-Melchers VHRM-105).

Example 1

Polymerisable monomeric compound (1) is prepared as follows.

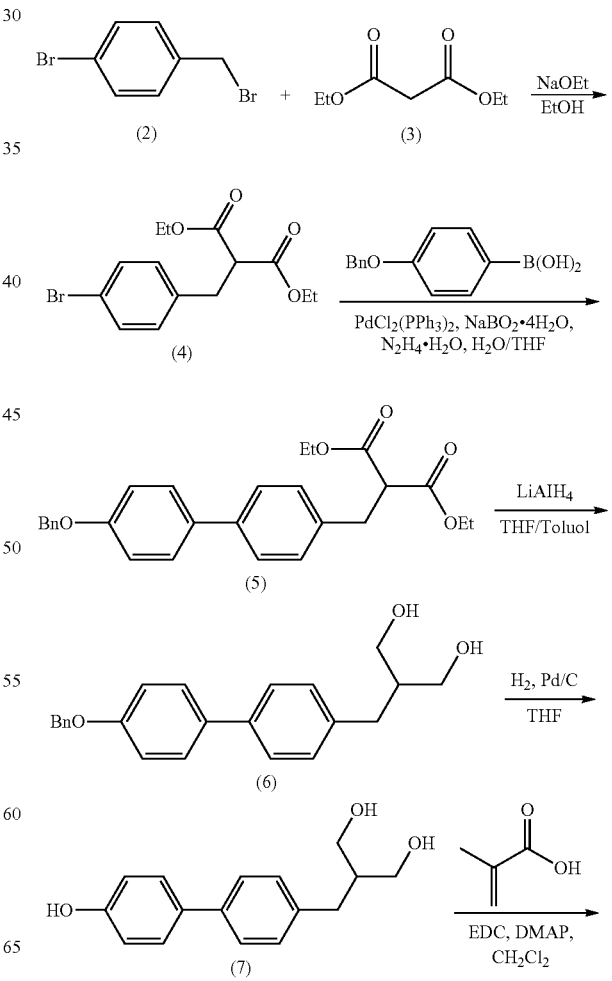

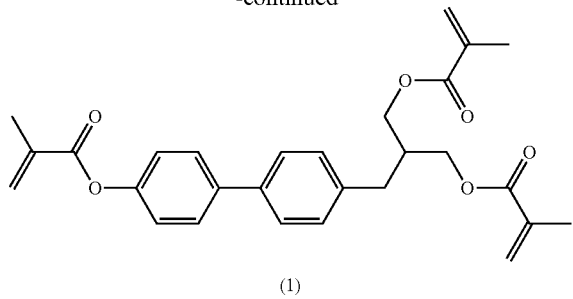

(1)

1.1 2-[(4-Bromophenyl)methyl]-propanedioic acid 1,3-diethyl ester (4)

2-[(4-Bromophenyl)methyl]-propanedioic acid 1,3-diethyl ester (4) (CAS 70146-78-0) is prepared according to the literature (WO 2010/105179; Tetrahedron: Asymmetry 2001, 12(4), 585) from commercially available 1-bromo-4-(bromomethyl)-benzene (2) (CAS 589-15-1) and diethyl malonate (3) (CAS 105-53-3).

1.2 2-[(4'-Phenylmethoxy-biphenyl-4-yl)methyl]-propanedioic acid 1,3-diethyl ester (5)

To a solution of sodium metaborate tetrahydrate (60.5 g, 0.43 mol) in dest. water (230 mL) is added dry tetrahydrofuran (1025 mL), 2-[(4-bromophenyl)methyl]-propanedioic acid 1,3-diethyl ester (4) (130.0 g, 0.39 mol) and [4-(Benzyloxy)phenyl]-boronic acid (CAS 146631-00-7) (90.1 g, 0.39 mol) followed by bis(triphenylphosphine)palladium (II) dichloride (5.7 g, 7.9 mmol) and hydrazine hydrate (1.9 mL, 0.04 mol) under argon atmosphere. The reaction mixture is heated at reflux for 20 h. After cooling to room temperature, the aqueous phase is separated and extracted with methyl tert-butyl ether (2×). The combined organic extracts are washed with dest. water, dried over sodium sulfate and concentrated in vacuo. The residue is purified by silica gel chromatography (heptane/ethyl acetate 4/1) to give white crystals of 2-[(4'-phenylmethoxy-biphenyl-4-yl)methyl]-propanedioic acid 1,3-diethyl ester (5) (84.0 g).

1.3 2-[(4'-Phenylmethoxy-biphenyl-4-yl)methyl]-propane-1,3-diol (6)

To a suspension of lithium aluminum hydride (7.5 g, 0.20 mol) in toluene (40 mL) and tetrahydrofuran (100 mL) is added dropwise a solution of 2-[(4'-phenylmethoxy-biphenyl-4-yl)methyl]-propanedioic acid 1,3-diethyl ester (5) (66.0 g, 0.15 mol) in tetrahydrofuran (330 mL) at 0° C. The reaction mixture is then stirred for 2 h at 50° C. and carefully hydrolysed by addition of dest. water/tetrahydrofuran (1/1, 6 mL) followed by an aqueous solution (35 mL) of sodium carbonate decahydrate (22.6 g, 0.21 mol). The precipitate is filtered off, and the residue is treated with tetrahydrofuran at elevated temperature. The precipitate is again removed by filtration and washed with warm methyl tert-butyl ether. The combined mother liquors are concentrated in vacuo, and the residue is recrystallised from isopropanol. 2-[(4'-phenylmethoxy-biphenyl-4-yl)methyl]-propane-1,3-diol (6) (38.4 g) is isolated as a white solid.

1.4 2-[(4'-Hydroxy-biphenyl-4-yl)methyl]-propane-1,3-diol (7)

A solution of 2-[(4'-phenylmethoxy-biphenyl-4-yl)methyl]-propane-1,3-diol (6) (19.1 g, 50 mmol) in tetrahydrofuran (200 mL) is treated with palladium (5%) on activated charcoal (5.0 g) and submitted to hydrogenation for 20 h. The catalyst is then filtered off, and the remaining solution is concentrated in vacuo. The residue is recrystallised from acetonitrile to give white crystals of 2-[(4'-hydroxy-biphenyl-4-yl)methyl]-propane-1,3-diol (7) (12.3 g).

$^1$H-NMR (DMSO-$d_6$, 400 MHz): (ppm)=9.44 (s, 1H, OH), 7.47-7.43 (m, 4H, Ar—H), 7.21 (d, J=8.2 Hz, 2H, Ar—H), 6.84-6.81 (m, 2H, Ar—H), 4.37 (t, J=5.1 Hz, 2H, CH$_2$), 3.41-3.33 (m, 4H, 2×OCH$_2$), 2.57 (s, 1H, OH), 2.56 (s, 1H, OH), 1.79-1.72 (m, 1H, CH).

1.5 2-Methyl-acrylic acid 4'-[3-(2-methyl-acryloyloxy)-2-(2-methylacryloyloxymethyl)-propyl]-biphenyl-4-yl ester (1)

Methacrylic acid (22.9 mL, 271 mmol) and 4-(dimethylamino)pyridine (0.58 g, 4.8 mmol) is added to a suspension of 2-[(4'-hydroxy-biphenyl-4-yl)methyl]-propane-1,3-diol (7) (12.3 g, 48 mmol) in dichloromethane (500 mL). The reaction mixture is treated dropwise at 0° C. with a solution of N-(3-dimethylaminopropyl)-N'-ethylcarbodiimide (47.7 mL, 271 mmol) in dichloromethane (120 mL) and stirred for 20 h at ambient temperature. Excess solvent is then removed from the reaction mixture in vacuo, and the residue is purified by silica gel chromatography (heptane/ethyl acetate 7/3). Recrystallisation of the crude product from ethanol and heptane affords white crystals of 2-methyl-acrylic acid 4'-[3-(2-methyl-acryloyloxy)-2-(2-methyl-acryloyloxymethyl)-propyl]-biphenyl-4-yl ester (1) (8.3 g, m.p. 49° C.).

$^1$H-NMR (DMSO-$d_6$, 400 MHz): (ppm)=7.73-7.70 (m, 2H, Ar—H), 7.63 (d, J=8.3 Hz, 2H, Ar—H), 7.33 (d, J=8.3 Hz, 2H, Ar—H), 7.28-7.25 (m, 2H, Ar—H), 6.32-6.30 (m, 1H, H$_{olefin}$), 6.06-6.04 (m, 2H, H$_{olefin}$), 5.92 (quint, J=1.5 Hz, 1H, H$_{olefin}$), 5.69 (quint, J=1.6 Hz, 2H, H$_{olefin}$), 4.17 (dd, J=5.2 Hz, J=11.2 Hz, 2H, OCH$_2$), 4.11 (dd, J=6.2 Hz, J=11.2 Hz, 2H, OCH$_2$), 2.79 (d, J=7.3 Hz, 2H, CH$_2$), 2.49-2.45 (m, 1H, CH), 2.05-2.03 (m, 3H, CH$_3$), 1.90-1.88 (m, 6H, 2×CH$_3$).

Mixture Examples 1+2

The nematic LC mixture N1 is formulated as follows.

| | | | |
|---|---|---|---|
| CY-3-O2 | 11.00% | cl.p. | +75.0° C. |
| PY-3-O2 | 10.00% | n | 0.1019 |
| CPY-2-O2 | 10.00% |  | −3.0 |
| CPY-3-O2 | 10.00% | ∥ | 3.5 |
| CCY-3-O2 | 9.00% | K$_3$/K$_1$ | 1.12 |
| CCY-4-O2 | 5.00% |  | 84 mPa s |
| CC-3-V | 39.50% | V$_0$ | 2.32 V |
| BCH-32 | 5.50% | | |

The nematic LC mixture N2 is formulated as follows.

| | | | |
|---|---|---|---|
| CY-3-O2 | 18.00% | cl.p. | +74.5° C. |
| CPY-2-O2 | 10.00% | n | 0.1021 |
| CPY-3-O2 | 10.00% | | −3.1 |
| CCY-3-O2 | 9.00% | ∥ | 3.5 |
| CCY-4-O2 | 4.00% | K$_3$/K$_1$ | 1.16 |
| CC-3-V | 40.00% | | 86 mPa s |
| PYP-2-3 | 9.00% | V$_0$ | 2.29 V |

Use Example 1+2

Polymerisable mixtures M1 and M2 are prepared by adding Monomer (1) of Example 1 to the LC mixture N1 or N2, respectively, at a concentration of 0.3% by weight. The resultant polymerisable mixtures are inserted into a VA e/o test cell (rubbed antiparallel, VA-polyimide alignment layer, LC-layer thickness d≈4 μm). For comparative purposes, VA e/o test cells are prepared with the comparison mixtures C1 and C2 comprising LC mixture N1 or N2, respectively, and 0.3% of Monomer A of prior art.

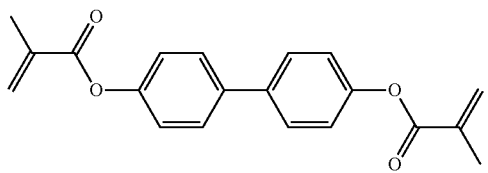

A

The test cells are irradiated with UV light having an intensity of 100 mW/cm² for the time indicated with application of a voltage of 24 $V_{rms}$ (alternating current), causing polymerisation of the polymerisable monomeric compound.

The tilt angle is determined before and after UV irradiation by a crystal rotation experiment (Autronic-Melchers TBA-105).

The VHR values of the polymerisable LC mixtures M1, M2 and C1 before and after UV exposure are measured as described above.

The tilt angle results are shown in Table 1. The VHR values of the mixtures are shown in Table 2.

TABLE 1

| UV-Time | C1 | M1 | C2 | M2 |
|---|---|---|---|---|
| | \multicolumn{4}{c}{Pretilt Angle/°} | | | |
| 0 | 88.3 | 87.6 | 88.2 | 87.7 |
| 1 | 88.3 | 87.1 | — | 81.1 |
| 2 | 87.3 | — | 75.1 | — |
| 3 | — | 81.5 | — | 75.3 |
| 4 | 80.1 | — | — | — |
| 5 | — | 79.0 | 70.1 | 74.6 |
| 6 | 75.6 | — | — | — |
| 10 | 72.2 | 74.5 | 68.5 | 73.0 |
| 15 | 71.0 | 73.9 | 68.2 | 72.6 |
| 20 | 70.7 | 72.1 | 68.1 | 72.4 |

TABLE 2

| UV-Time | C1 | M1 | C2 | M2 |
|---|---|---|---|---|
| | \multicolumn{4}{c}{VHR/%} | | | |
| 0 min | 96.1 | 96.2 | 97.3 | 96.4 |
| 5 min | 92.4 | 96.3 | 88.1 | 95.0 |
| 20 min | 85.8 | 95.7 | 74.0 | 92.2 |
| 5 min + 2 h Suntest* | 87.1 | 93.5 | 78.3 | 90.0 |

*"Suntest" means a second irradiation step with lower UV intensity but longer exposure time than the first step.

As can be seen from Table 1, a small tilt angle after polymerisation is achieved quickly in PSA displays containing mixture M1 or M2 according to the invention, which is comparable to PSA displays containing mixture C1 or C2 according to prior art.

As can be seen from Table 2, the VHR values of mixture M1 or M2 according to the invention after UV exposure are significantly higher than the VHR values of mixture C1 or C2 according to prior art.

For measuring the solubility, Monomer (1) of Example 1 and Monomer A of prior art are each dissolved at various concentrations from 0.3 to 3.0% by weight in the commercially available nematic LC mixture MJ011412 (Merck Japan Ltd.). The samples are stored for 1000 h at room temperature and checked if they remain a homogeneous solution. Afterwards the samples are centrifugated and filtrated, and the residual monomer concentration in the supernatant liquid is determined.

Maximum residual monomer concentration after 1000 h at RT:
Monomer A: 0.46%
Monomer (1): 3.00%

This shows that Monomer (1) according to the invention exhibits a much better solubility than Monomer A of prior art.

The invention claimed is:

1. A liquid-crystal (LC) medium or a LC display comprising a compound of formula I $$P^1\text{-}Sp^1\text{-}(A^1\text{-}Z^1)_n\text{-}A^2\text{-}Sp^4\text{-}CH(Sp^2\text{-}P^2)(Sp^3\text{-}P^3) \qquad I$$

in which the individual radicals have the following meanings:

$P^1$, $P^2$, $P^3$ independently of each other denote a polymerisable group, $Sp^1$ is a spacer group or a single bond, $Sp^2$ and $Sp^3$ denote —$(CH_2)_{p2}$—, in which p2 is an integer from 1 to 6, $Sp^4$ is —$(CH_2)_{p4}$—, in which p4 is an integer from 1 to 6, $A^1$, $A^2$ independently of each other, and on each occurrence identically or differently, denote an aromatic, heteroaromatic, alicyclic or heterocyclic group having 4 to 25 C atoms, which may also contain fused rings, and which is optionally mono- or polysubstituted by L, $Z^1$ is selected from the group consisting of —O—, —CO—O—, —OCO—, —OCH$_2$—, —CH$_2$O—, —CF$_2$O—, —OCF$_2$—, —CH$_2$CH$_2$—, —CH=CH—, —CF=CF—, —CH=CF—, —CF=CH—, —C≡C—, and a single bond, L denotes $P^1$—, $P^1$-$Sp^1$-, F, Cl, Br, I, —CN, —NO$_2$, —NCO, —NCS, —OCN, —SCN, —C(=O)N(R$^x$)$_2$, —C(=O)Y$^1$, —C(=O)R$^x$, —N(R$^x$)$_2$, optionally substituted silyl, optionally substituted aryl or heteroaryl having 5 to 20 ring atoms, or straight-chain or branched alkyl having 1 to 25 C atoms, in which, in addition, one or more non-adjacent CH$_2$ groups may each be replaced, independently of one another, by —C(R$^{00}$)=C(R$^{00}$)—, —C≡C—, —N(R$^{00}$)—, —O—, —S—, —CO—, —CO—O—, —O—CO—, —O—CO—O— in such a way that O and/or S atoms are not linked directly to one another, and in which, in addition, one or more H atoms may be replaced by F, Cl, CN, $P^1$— or $P^1$-$Sp^1$-, $R^{00}$ and $R^{000}$ each, independently of one another, denote H or alkyl having 1 to 12 C atoms, $Y^1$ is halogen, $R^x$ denotes $P^1$—, $P^1$-$Sp^1$-, H, halogen, straight chain, branched or cyclic alkyl having 1 to 25 C atoms, wherein one or more non-adjacent CH$_2$-groups are optionally replaced by —O—, —S—, —CO—, —CO—O—, —O—CO—, —O—CO—O— in such a manner that O- and/or S-atoms are not directly connected with each other, and wherein one or more H atoms are optionally replaced by F, Cl, $P^1$— or $P^1$-$Sp^1$-, optionally substituted aryl, aryloxy, heteroaryl or heteroaryloxy having 5 to 20 ring atoms, n is 1, 2, 3 or 4.

2. The medium or display according to claim 1, where, in the compounds of formula I, $A^1$, $A^2$ each, independently of one another, denote 1,4-phenylene, naphthalene-1,4-diyl or naphthalene-2,6-diyl, where one or more CH groups in these groups are optionally replaced by N, cyclohexane-1,4-diyl, in which, in addition, one or more non-adjacent CH$_2$ groups are optionally replaced by O and/or S, 1,4-cyclohexenylene, bicyclo[1.1.1]pentane-1,3-diyl, bicyclo[2.2.2]octane-1,4-diyl, spiro[3.3]heptane-2,6-diyl, piperidine-1,4-diyl, decahydronaphthalene-2,6-diyl, 1,2,3,4-tetrahydronaphthalene-2,6-diyl, indane-2,5-diyl, octahydro-4,7-methanoindane-2,5-diyl, anthracene-2,7-diyl, fluorene-2,7-diyl, phenanthrene-2,7-diyl or 9,10-dihydro-phenanthrene-2,7-diyl, where all these groups are unsubstituted or mono- or polysubstituted by L as defined in claim 1.

3. The medium or display according to claim 1, where, in the compounds of formula I, Sp$^1$ is a single bond; or Sp$^1$ is —(CH$_2$)$_{p2}$— or —(CH$_2$)$_{p1}$—O—, in which p1 is 1, 2 or 3, Sp$^2$ and Sp$^3$ denote —(CH$_2$)$_{p2}$—, in which p2 is 1, 2 or 3, and Sp$^4$ is —(CH$_2$)$_{p4}$—, in which p4 is 1, 2 or 3.

4. The medium or display according to claim 1, where, in the compounds of formula I, P$^1$, P$^2$ and P$^3$ independently of each other denote a vinyloxy, acrylate, methacrylate, fluoroacrylate, chloroacrylate, oxetane or epoxide group.

5. The medium or display according to claim 1, wherein the compounds of formula I are selected from the group consisting of compounds of the following sub-formulae:

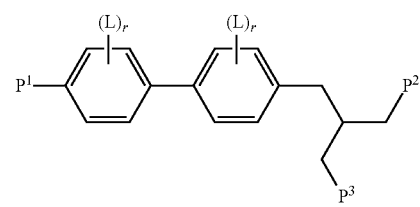

I1

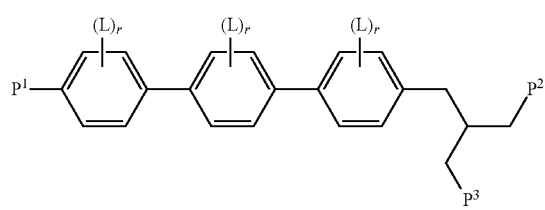

I2

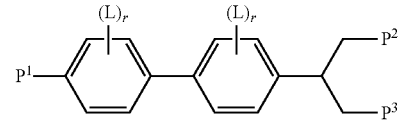

I3

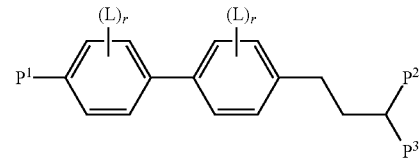

I4

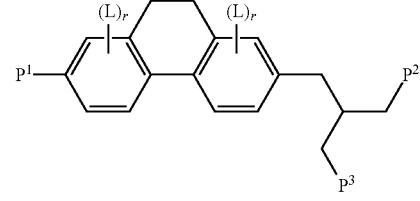

I5

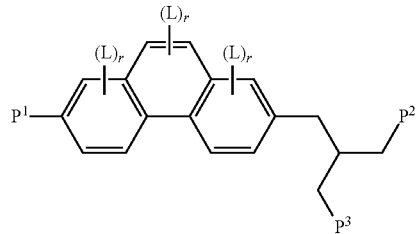

I6 wherein P$^1$, P$^2$, P$^3$ and L are as defined in claim 1 and r is 0, 1, 2, 3 or 4.

6. The medium or display according to claim 1, wherein the LC display is a PSA (polymer sustained alignment) type display.

7. The medium or display according to claim 1, wherein the LC medium comprises
a polymerisable component A) comprising one or more polymerisable compounds of formula I as defined in claim 1, and
an LC component B) comprising one or more low-molecular-weight compounds.

8. The medium or display according to claim 7, wherein the LC component B comprises one or more compounds of the formulae CY and/or PY:

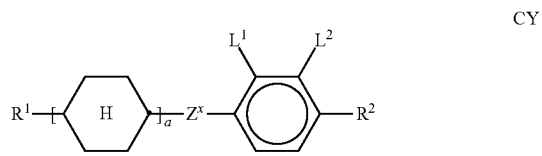

CY

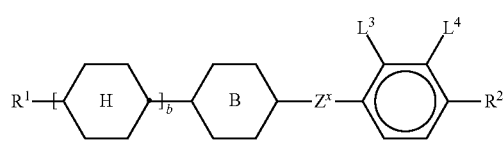

PY in which the individual radicals have the following meanings:
a denotes 1 or 2,
b denotes 0 or 1,

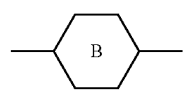

denotes

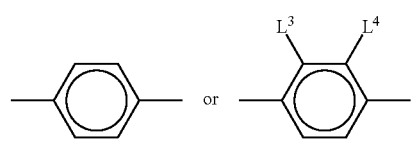

R$^1$ and R$^2$ each, independently of one another, denote alkyl having 1 to 12 C atoms, where, in addition, one or two non-adjacent CH$_2$ groups may be replaced by —O—, —CH=CH—, —CO—, —O—CO— or —CO—O— in such a way that O atoms are not linked directly to one another, $Z^x$ denotes —CH=CH—, —CH$_2$O—, —OCH$_2$—, —CF$_2$O—, —OCF$_2$—, —O—, —CH$_2$—, —CH$_2$CH$_2$— or a single bond, $L^{1-4}$ each, independently of one another, denote F, Cl, OCF$_3$, CF$_3$, CH$_3$, CH$_2$F or CHF$_2$.

9. The medium or display according to claim 7, wherein the LC component B comprises one or more compounds of the following formula:

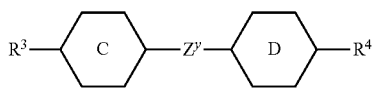

ZK in which the individual radicals have the following meanings:

denotes

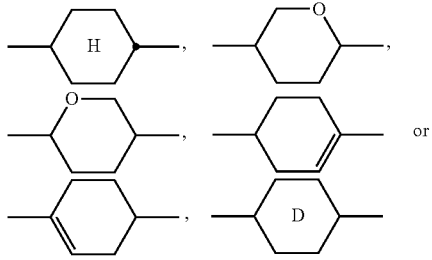

denotes

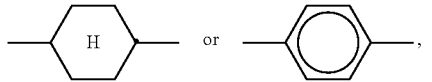

$R^3$ and $R^4$ each, independently of one another, denote alkyl having 1 to 12 C atoms, in which, in addition, one or two non-adjacent CH$_2$ groups may be replaced by —O—, —CH=CH—, —CO—, —O—CO— or —CO—O— in such a way that O atoms are not linked directly to one another, $Z^y$ denotes —CH$_2$CH$_2$—, —CH=CH—, —CF$_2$O—, —OCF$_2$—, —CH$_2$O—, —OCH$_2$—, —COO—, —OCO—, —C$_2$F$_4$—, —CF=CF— or a single bond.

10. The medium or display according to claim 7, wherein the LC component B comprises one or more compounds comprising an alkenyl group, which is stable to a polymerisation reaction under the conditions used for the polymerisation of the polymerisable compounds of formula I.

11. An LC medium comprising one or more compounds of formula I as defined in claim 1.

12. The LC medium according to claim 1, wherein the compounds of formula I are polymerised.

13. An LC display comprising one or more compounds of formula I as defined in claim 1.

14. The LC display according to claim 13, which is a PSA type display.

15. The LC display according to claim 14, which is a PSA-VA, PSA-OCB, PSA-IPS, PS-FFS, PSA-posi-VA or PSA-TN display.

16. The LC display according to claim 13, which contains an LC cell having two substrates and two electrodes, where at least one substrate is transparent to light and at least one substrate has one or two electrodes, and a layer, located between the substrates, of an LC medium comprising a polymerised component and a low-molecular-weight component, where the polymerised component is obtained by polymerisation of one or more polymerisable compounds between the substrates of the LC cell in the LC medium, where at least one of the polymerisable compounds is selected from polymerisable compounds of formula I.

17. A process for the production of an LC display according to claim 16, comprising the steps of filling an LC medium containing a compound of formula I into an LC cell having two substrates and two electrodes and polymerising the polymerisable compounds.

18. A process of preparing an LC medium according to claim 11, comprising the steps of mixing one or more low-molecular-weight liquid-crystalline compounds, with one or more polymerisable compounds of formula I, and optionally with further liquid-crystalline compounds and/or additives.

19. The medium or display according to claim 1, where, in the compounds of formula I, $Sp^2$ and $Sp^3$ denote —(CH$_2$)$_{p2}$—, in which p2 is 1, 2 or 3.

20. The medium or display according to claim 1, where, in the compounds of formula I, $Sp^2$ and $Sp^3$ denote methylene.

21. The medium or display according to claim 1, where, in the compounds of formula I, $Sp^4$ denotes methylene.

22. The medium or display according to claim 1, where, in the compounds of formula I, $Sp^2$, $Sp^3$ and $Sp^4$ denote methylene.

23. The medium or display according to claim 1, wherein, in the compounds of formula I:
$P^1$, $P^2$, $P^3$ independently of each other denote a vinyloxy, acrylate, methacrylate, fluoroacrylate, chloroacrylate, oxetane or epoxide group, and
$A^1$, $A^2$ independently of each other, and on each occurrence identically or differently, denote: 1,4-phenylene; naphthalene-2,6-diyl; phenanthrene-2,7-diyl; or 9,10-dihydro-phenanthrene-2,7-diyl; where, in addition, one or two CH groups in these rings are optionally replaced by N, and which is optionally mono- or polysubstituted by L.

24. A compound of formula I

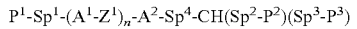

$$P^1\text{-}Sp^1\text{-}(A^1\text{-}Z^1)_n\text{-}A^2\text{-}Sp^4\text{-}CH(Sp^2\text{-}P^2)(Sp^3\text{-}P^3) \qquad I$$

in which the individual radicals have the following meanings:

$P^1$, $P^2$, $P^3$ independently of each other denote a vinyloxy, acrylate, methacrylate, fluoroacrylate, chloroacrylate, oxetane or epoxide group, $Sp^1$ is a spacer group or a single bond, $Sp^2$ and $Sp^3$ denote —(CH$_2$)$_{p2}$—, in which p2 is an integer from 1 to 6, $Sp^4$ is —(CH$_2$)$_{p4}$—, in which p4 is an integer from 1 to 6, $A^1$, $A^2$ independently of each other, and on each occurrence identically or differently, denote: 1,4-phenylene; naphthalene-2,6-diyl; phenanthrene-2,7-diyl; or 9,10- dihydro-phenanthrene-2,7-diyl; where, in addition, one or two CH groups in these rings are optionally replaced by N, and which is optionally mono- or polysubstituted by L, $Z^1$ is selected from the group consisting of —O—, —CO—O—, —OCO—, —OCH$_2$—, —CH$_2$O—, —CF$_2$O—, —OCF$_2$—, —CH$_2$CH$_2$—, —CH=CH—, —CF=CF—, —CH=CF—, —CF=CH—, —C≡C—, and a single bond, L denotes $P^1$—, $P^1$-Sp$^1$-, F, Cl, Br, I, —CN, —NO$_2$, —NCO, —NCS, —OCN, —SCN, —C(=O)N(R$^x$)$_2$, —C(=O)Y$^1$, —C(=O)R$^x$, —N(R$^x$)$_2$, optionally substituted silyl, optionally substituted aryl or heteroaryl having 5 to 20 ring atoms, or straight-chain or branched alkyl having 1 to 25 C atoms, in which, in addition, one or more non-adjacent CH$_2$ groups may each be replaced, independently of one another, by —C(R$^{00}$)=C(R$^{000}$)—, —C≡C—, —N(R$^{00}$)—, —O—, —S—, —CO—, —CO—O—, —O—CO—, —O—CO—O— in such a way that O and/or S atoms are not linked directly to one another, and in which, in addition, one or more H atoms may be replaced by F, Cl, CN, $P^1$— or $P^1$-Sp$^1$-, $R^{00}$ and $R^{000}$ each, independently of one another, denote H or alkyl having 1 to 12 C atoms, $Y^1$ is halogen, $R^x$ denotes $P^1$—, $P^1$-Sp$^1$-, H, halogen, straight chain, branched or cyclic alkyl having 1 to 25 C atoms, wherein one or more non-adjacent CH$_2$-groups are optionally replaced by —O—, —S—, —CO—, —CO—O—, —O—CO—, —O—CO—O— in such a manner that O- and/or S-atoms are not directly connected with each other, and wherein one or more H atoms are optionally replaced by F, Cl, $P^1$— or $P^1$-Sp$^1$-, optionally substituted aryl, aryloxy, heteroaryl or heteroaryloxy having 5 to 20 ring atoms, n is 1, 2, 3 or 4.

25. The compound according to claim 24, wherein Sp$^1$ is a single bond or Sp$^1$ is —(CH$_2$)$_{p2}$— or —(CH$_2$)$_{p1}$—O—, in which p1 is 1, 2 or 3, Sp$^2$ and Sp$^3$ denote —(CH$_2$)$_{p2}$—, in which p2 is 1, 2 or 3, and Sp$^4$ is —(CH$_2$)$_{p4}$—, in which p4 is 1, 2 or 3.

26. The compound according to claim 24, which is selected from the group consisting of the compounds of the following sub-formulae:

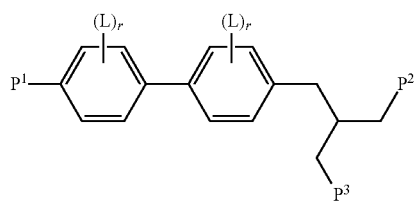

I1

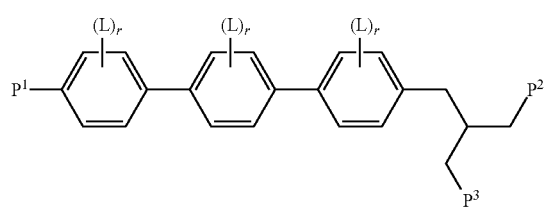

I2

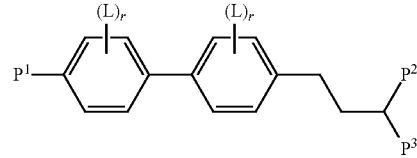

I4

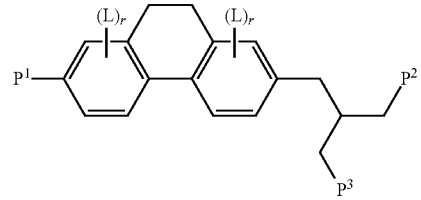

I5

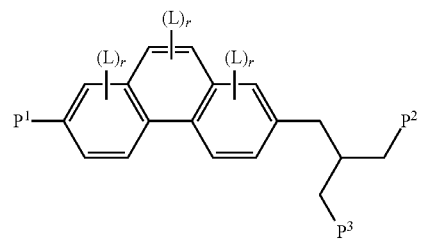

I6 wherein $P^1$, $P^2$, $P^3$ and L are as defined in claim and r is 0, 1, 2, 3 or 4.

27. The compound according to claim 24, which is of the following formula:

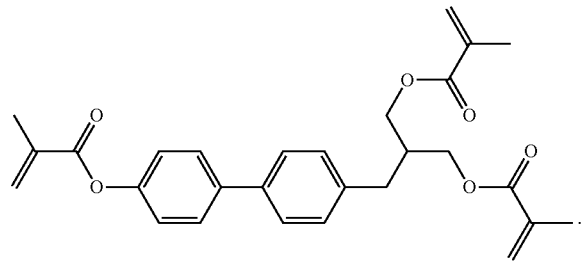 [SMILES: C=C(C)C(=O)OCC(COC(=O)C(=C)C)Cc1ccc(-c2ccc(OC(=O)C(=C)C)cc2)cc1]

28. The compound according to claim 24, wherein Sp$^2$ and Sp$^3$ denote —(CH$_2$)$_{p2}$—, in which p2 is 1, 2 or 3.

29. The compound according to claim 24, wherein Sp$^2$ and Sp$^3$ denote methylene.

30. The compound according to claim 24, wherein Sp$^4$ denotes methylene.

31. The compound according to claim 24, wherein Sp$^2$, Sp$^3$ and Sp$^4$ denote methylene.

32. A process for preparing a compound according to claim 24, by esterification or etherification of a compound, of formula II

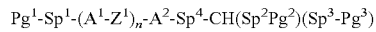

Pg$^1$-Sp$^1$-(A$^1$-Z$^1$)$_n$-A$^2$-Sp$^4$-CH(Sp$^2$Pg$^2$)(Sp$^3$-Pg$^3$)    II in which
Sp$^1$ is a spacer group or a single bond,
Sp$^2$ and Sp$^3$ denote —(CH$_2$)$_{p2}$—, in which p2 is an integer from 1 to 6,
Sp$^4$ is —(CH$_2$)$_{p4}$—, in which p4 is an integer from 1 to 6,
A$^1$, A$^2$ independently of each other, and on each occurrence identically or differently, denote: 1,4-phenylene; naphthalene-2,6-diyl; phenanthrene-2,7- diyl; or 9,10-dihydro-phenanthrene-2,7-diyl; where, in addition, one or two CH groups in these rings are optionally replaced by N, and which is optionally mono- or polysubstituted by L, $Z^1$ is selected from the group consisting of —O—, —CO—O—, —OCO—, —OCH$_2$—, —CH$_2$O—, —CF$_2$O—, —OCF$_2$—, —CH$_2$CH$_2$—, —CH=CH—, —CF=CF—, —CH=CF—, —CF=CH—, —C≡C—, and a single bond, L denotes $P^1$—, $P^1$-Sp$^1$-, F, Cl, Br, I, —CN, —NO$_2$, —NCO, —NCS, —OCN, —SCN, —C(=O)N(R$^x$)$_2$, —C(=O)Y$^1$, —C(=O)R$^x$, —N(R$^x$)$_2$, optionally substituted silyl, optionally substituted aryl or heteroaryl having 5 to 20 ring atoms, or straight-chain or branched alkyl having 1 to 25 C atoms, in which, in addition, one or more non-adjacent CH$_2$ groups may each be replaced, independently of one another, by —C(R$^{00}$)=C(R$^{000}$)—, —C≡C—, —N(R$^{00}$)—, —O—, —S—, —CO—, —CO—O—, —O—CO—, —O—CO—O— in such a way that O and/or S atoms are not linked directly to one another, and in which, in addition, one or more H atoms may be replaced by F, Cl, CN, $P^1$— or $P^1$-Sp$^1$-, $R^{00}$ and $R^{000}$ each, independently of one another, denote H or alkyl having 1 to 12 C atoms, $Y^1$ is halogen, $R^x$ denotes $P^1$—, $P^1$-Sp$^1$-, H, halogen, straight chain, branched or cyclic alkyl having 1 to 25 C atoms, wherein one or more non-adjacent CH$_2$-groups are optionally replaced by —O—, —S—, —CO—, —CO—O—, —O—CO—, —O—CO—O— in such a manner that O- and/or S-atoms are not directly connected with each other, and wherein one or more H atoms are optionally replaced by F, Cl, $P^1$— or $P^1$-Sp$^1$-, optionally substituted aryl, aryloxy, heteroaryl or heteroaryloxy having 5 to 20 ring atoms, n is 1, 2, 3 or 4

$P^1$, $P^2$, $P^3$ independently of each other denote a vinyloxy, acrylate, methacrylate, fluoroacrylate, chloroacrylate, oxetane or epoxide group, and Pg$^1$, Pg$^2$ and Pg$^3$ denote independently of each other OH or a protected hydroxyl group or a masked hydroxyl group, using corresponding acids, acid derivatives, or halogenated compounds containing a group $P^1$, in the presence of a dehydrating reagent.

* * * * *